(12) United States Patent
Erl

(10) Patent No.: US 8,799,797 B2
(45) Date of Patent: Aug. 5, 2014

(54) DISPLAY AND MANAGEMENT OF A SERVICE CANDIDATE INVENTORY

(75) Inventor: Thomas F. Erl, Richmond (CA)

(73) Assignee: Red Hat, Inc., Raleigh, NC (US)

( * ) Notice: Subject to any disclaimer, the term of this patent is extended or adjusted under 35 U.S.C. 154(b) by 1102 days.

(21) Appl. No.: 11/879,822

(22) Filed: Jul. 18, 2007

(65) Prior Publication Data

US 2008/0250386 A1 Oct. 9, 2008

Related U.S. Application Data

(60) Provisional application No. 60/807,761, filed on Jul. 19, 2006.

(51) Int. Cl.
G06F 3/048 (2013.01)
G06F 9/44 (2006.01)

(52) U.S. Cl.
USPC .......................................... 715/764; 717/114

(58) Field of Classification Search
USPC ...................................... 715/741–743; 717/10
See application file for complete search history.

(56) References Cited

U.S. PATENT DOCUMENTS

| | | | |
|---|---|---|---|
| 6,356,897 B1 * | 3/2002 | Gusack | 1/1 |
| 7,822,840 B2 * | 10/2010 | Chen et al. | 709/223 |
| 2003/0182417 A1 * | 9/2003 | Hasunuma | 709/223 |
| 2004/0187089 A1 | 9/2004 | Schulz | |
| 2005/0027495 A1 | 2/2005 | Matichuk | |
| 2005/0060657 A1 | 3/2005 | DeLuca et al. | |
| 2005/0223109 A1 | 10/2005 | Mamou et al. | |
| 2005/0256882 A1 | 11/2005 | Able et al. | |
| 2007/0265900 A1 | 11/2007 | Moore | |
| 2008/0022225 A1 | 1/2008 | Erl | |
| 2008/0028001 A1 | 1/2008 | Erl | |
| 2008/0028329 A1 | 1/2008 | Erl | |
| 2008/0028365 A1 | 1/2008 | Erl | |

OTHER PUBLICATIONS

Erl, Thomas, "Service Oriented Architecture", Prentice Hall, 2005, ISBN: 0-13-185858-0, pp. 377, 398-402, 474.
PCT Search Report and Written Opinion, PCT/US07/16406, mailed on Aug. 27, 2008, 12 pages.
PCT Search Report and Written Opinion, PCT/US07/16407, mailed on Aug. 27, 2008, 12 pages.
Erl, Thomas, "Service-Oriented Architecture", Prentice Hall, 2005, ISBN: 0-13-185858-0, pp. 398-401.
Johnston, S.: "Modeling service-oriented solutions", IBM Developer Works, Jul. 15, 2005, XP002536187, pp. 1-11. URL:http://www.ibm.com/developerworks/rational/library/jul05/johnston/.
Arsanjani, A.: "Service-oriented modeling and architecture" IBM Developer Works, Nov. 9, 2004, XP002536188, pp. 1-12. URL:http://www.ibm.com/developerworks/library/ws-soa-design1/.
PCT Search Report for PCT/US07/16443, mailed Jul. 19, 2007.
PCT Written Opinion for PCT/US07/16443, mailed Sep. 22, 2008.

(Continued)

*Primary Examiner* — Boris Pesin
*Assistant Examiner* — Matthew Ell
(74) *Attorney, Agent, or Firm* — Lowenstein Sandler LLP

(57) ABSTRACT

An apparatus, system, and method to facilitate the display and management of service candidates in a service-oriented architecture (SOA). In one embodiment, the method includes receiving a user request for an inventory of service candidates in a SOA service model, and providing a user interface displaying the service candidate inventory. The method further includes allowing user access to individual service candidates in the service candidate inventory via the user interface.

25 Claims, 47 Drawing Sheets

(56) References Cited

OTHER PUBLICATIONS

PCT International Preliminary Report on Patentability for PCT/US07/16443, mailed Jul. 19, 2007.
PCT Written Opinion for PCT/US07/16443, mailed Jul. 19, 2007.
EP Search Report for 07810640.8 mailed Jul. 29, 2009.
PCT International Preliminary Report on Patentability for PCT/US07/16407, mailed Jan. 29, 2009.
PCT International Search Report and Written Opinion for PCT/US07/16407, mailed Aug. 27, 2008.
EP Supplemental Search Report for 07810640.8, mailed Jul. 23, 2009.
PCT International Search Report and Written Opinion for PCT/US07/16406, mailed Aug. 27, 2008.
EP Supplemental Search Report for 07836156.5, mailed Jul. 29, 2009.
PCT International Preliminary Report on Patentability for PCT/US07/16406, mailed Aug. 27, 2008.
Thomas, Erl, "SOA Principles of Service Design," Prentice Hall, 2005, ISBN: 0-13-234482-3, Chapter 14 pp. 446-475.
Office Action for U.S. Appl. No. 11/879,969 mailed Jun. 25, 2010.
Office Action for U.S. Appl. No. 11/879,839, mailed Aug. 17, 2010.
Office Action of U.S. Appl. No. 11/879,969 mailed Dec. 6, 2010.
Office Action of U.S. Appl. No. 11/879,969 mailed Mar. 16, 2011.
Office Action of U.S. Appl. No. 11/879,969 mailed Aug. 31, 2011.
Office Action of U.S. Appl. No. 11/879,839 mailed Feb. 1, 2011.
Office Action of U.S. Appl. No. 11/879,839 mailed Aug. 3, 2011.
USPTO; Office Action mailed May 8, 2012 for U.S. Appl. No. 11/879,839.
USPTO; Office Action mailed Jan. 18, 2012 for U.S. Appl. No. 11/880,014.
USPTO; Office Action mailed Dec. 21, 2011 for U.S. Appl. No. 11/879,824.
Search Report for EP Appln. 07836157.3, mailed Aug. 3, 2009, 6 pages.
USPTO; Office Action mailed Jul. 16, 2012 for U.S. Appl. No. 11/879,824.
USPTO; Office Action mailed May 17, 2013 for U.S. Appl. No. 11/879,969.
USPTO; Office Action mailed Sep. 13, 2011 for U.S. Appl. No. 11/879,820.
USPTO; Office Action mailed Oct. 2, 2012 for U.S. Appl. No. 11/879,820.
USPTO; Office Action mailed Jan. 30, 2013 for U.S. Appl. No. 11/879,820.
USPTO; Office Action mailed Jun. 5, 2013 for U.S. Appl. No. 11/879,820.
USPTO; Office Action mailed Apr. 24, 2013 for U.S. Appl. No. 11/879,839.
USPTO; Office Action mailed Aug. 6, 2012 for U.S. Appl. No. 11/880,014.
USPTO; Office Action mailed Apr. 11, 2013 for U.S. Appl. No. 11/880,014.
USPTO; Office Action mailed Jan. 29, 2013 for U.S. Appl. No. 11/879,824.

\* cited by examiner

DISPLAY AND MANAGEMENT OF A SERVICE CANDIDATE INVENTORY

RELATED APPLICATIONS

The present application claims priority to U.S. Provisional Patent Application Ser. No. 60/807,761, entitled "Service-Oriented Architecture (SOA) Service Modeler System and Method," filed on Jul. 19, 2006, which is incorporated herein by reference in its entirety.

The present application is also related to co-pending, commonly assigned patent application Ser. No. 11/879,969 entitled "Service-Oriented Architecture (SOA) Modeling Tool, System, and Method," filed on Jul. 18, 2007; Ser. No. 11/879,820 entitled "Creation and Management of Service Composition Candidates for a Service Model," filed on Jul. 18, 2007; Ser. No. 11/879,824 entitled "Creation and Management of Service Candidates for a Service Model," filed on Jul. 18, 2007; Ser. No. 11/879,839 entitled "Display and Management of a Service Composition Candidate Inventory," filed on Jul. 18, 2007; and Ser. No. 11/880,014 entitled "Tracking and Integrity Enforcement of Relationships Between Service and Composition Candidates in a Service Model," filed on Jul. 18, 2007, all of which are incorporated herein by reference in their entireties.

FIELD OF THE INVENTION

Embodiments of the present invention relate to service-oriented modeling in support of a service-oriented architecture (SOA), and more specifically, to display and management of a service candidate.

BACKGROUND OF THE INVENTION

Service-oriented architecture (SOA) is an approach to building software that supports the decoupling of core business functions from their physical implementations. In SOA, software is decomposed into a number of smaller software programs called "services." These services are distinguished by the fact that the automation logic they encapsulate can be generic, potentially useful for many purposes, and thus reused, often with a broadened, enterprise-centric emphasis on long term governance and strategic benefit. A reusable service can be used by multiple parent software programs to automate multiple tasks.

As an organization builds more and more reusable services, it establishes a service inventory. When new programs are designed, the service inventory can be searched to identify existing services that can be utilized to automate a portion of a program. This spares program developers from having to build programming logic that already exists. Services can also be reused without disturbing the underlying implementations, thus reducing the potential for errors and greater testing when new functionality and processes are added. When multiple services are chosen to collectively automate a portion of an application or program, they are assembled into a service composition. A service composition is a set of services that are called upon to carry out a specific task or sub-task of a larger task.

SOA is different from past paradigms in that it is based on different design principles and a different underlying design philosophy with different design goals known as "service-orientation." For example, and in contrast to SOA, the older paradigm of object-oriented analysis and design (OOAD) defines methods and attributes so as to associate behavior and data with objects. These behaviors represent functionality a class is capable of carrying out. Class properties represent a form of predefined state data associated with the class and are expressed through the definition of attributes. Attributes for an OOAD class can also be private. On the other hand, services express behaviors as capabilities in the abstract divorced from state data. Thus, SOA, while not so limited, is particularly useful for a Web services technology platform. This is because Web services rely on stateless HTTP protocol to exchange messages. Further, a Web service contract cannot define private operations. The Web services technology platform introduces unique design considerations that are readily met by SOA design principles.

Because of the increasing value of SOA, several software manufacturers have produced SOA technology platforms. However, there are a number of common problems facing development professionals interested in building SOA technology platforms, one of which is modeling. Many developers are required to use proprietary modeling technology that is tied to a particular vendor's development platform and specific technologies. However, one of the key aspects of SOA is that it allows for services to be built with different vendor platforms to work together and be assembled and reused as part of multiple compositions.

Other developers are required to work with outdated modeling tools which were built in support of older design approaches and paradigms, such as OOAD for example. Because these tools are not designed with the unique characteristics of SOA and service-orientation in mind, their usefulness is limited. Further, these tools often require programming knowledge or technical expertise on the part of the user. However, SOA is designed to support and enforce business-driven solutions. Technical architects and developers may possess programming experience, but may not possess the necessary depth of business knowledge required to model services with quality business logic representation like that possessed by business analysts. Business analysts may not have programming experience or technical expertise, but may be better suited to model services. Thus, the sole involvement of either group can have trade-offs that can negatively impact the quality of the SOA design and any resulting physical implementation.

Some developers have also chosen to work with Web service contract modeling tools. These tools are only focused on the technical interface (i.e. service contract) of the service and do not take the composition of the services into account. Or modeling tools may be focused on a single service only without the ability to provide a multitude of services or create service compositions.

Other modeling tools may force developers to immediately design the physical implementation of a service. However when building SOA platforms, it is advantageous to first allow the conceptualization of the multitude of services and compositions before committing to physical service designs and the corresponding technical interfaces.

These problems associated with modeling tools that do not fully support the design principles and paradigms of SOA can lead to significant productivity issues, and more importantly, the design of poor quality SOA implementations.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

Figure 1:
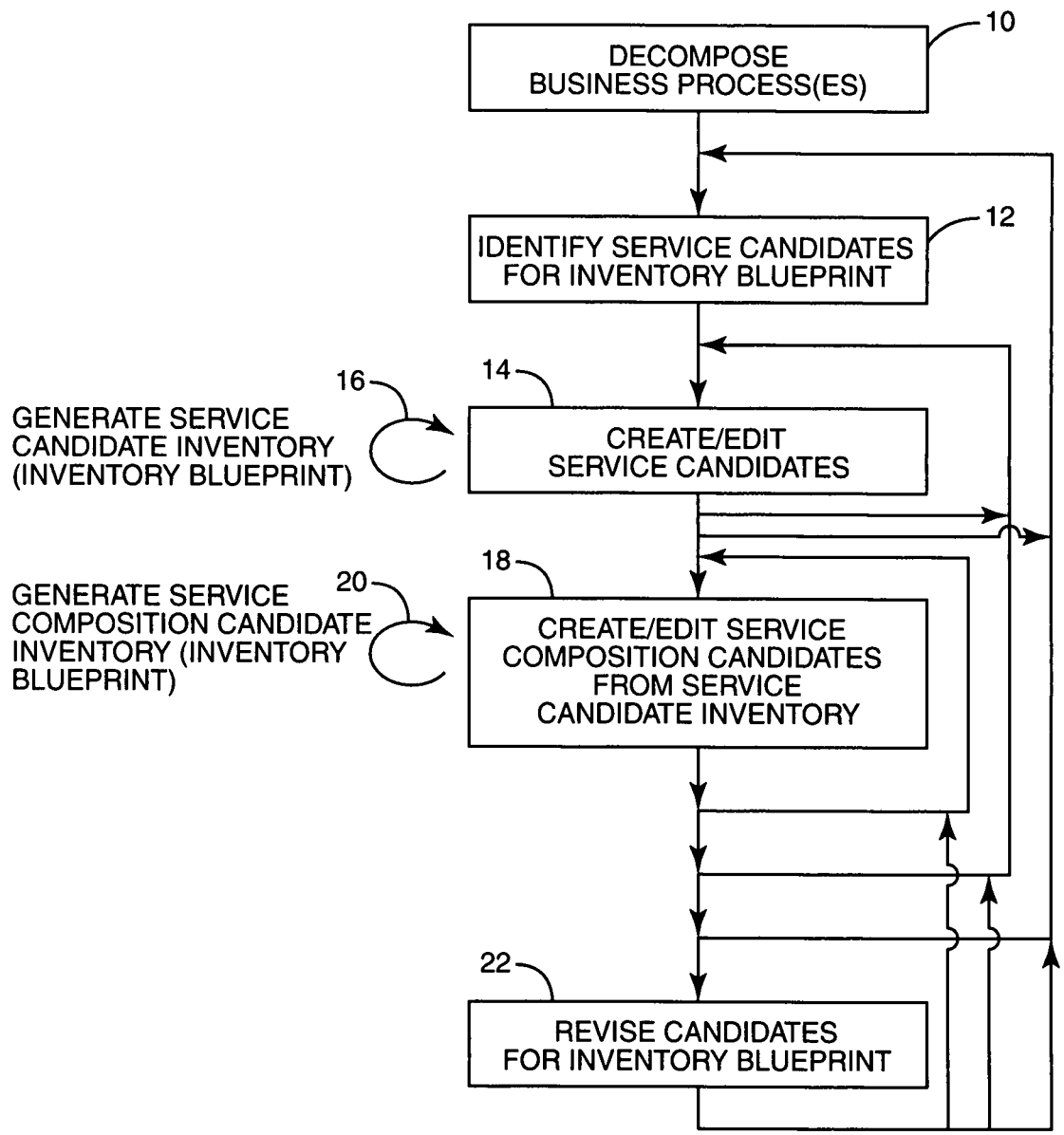
FIG. 1 depicts an exemplary service-oriented architecture (SOA) service modeling process.

Described herein is an apparatus, system, and method to facilitate the display and management of service candidates in service-oriented architecture (SOA). A service candidate is a service within a modeling context. A service candidate is modeled as having one or more operation candidates.

To facilitate display and management of service candidates, a SOA modeling tool is provided in one embodiment. The modeling tool may receive a user request for an inventory of service candidates in a SOA service model, and provide a user interface displaying the service candidate inventory. The user interface may allow user access to individual service candidates in the service candidate inventory.

The following description set forth below represents the necessary information to enable those skilled in the art to practice the invention and illustrates the best mode of practicing the invention. In the following description, numerous specific details are set forth such as examples of specific SOA principles, service-oriented components, etc. in order to provide a thorough understanding of the present invention. It will be apparent, however, to one skilled in the art that these specific details need not be employed to practice the present invention. In other instances, well known devices, systems, or methods have not been described in detail in order to avoid unnecessarily obscuring the present invention The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.), etc).

Unless specifically stated otherwise as apparent from the following discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

An "Appendix" is attached hereto that provides additional reference information, which is incorporated by reference herein in its entirety.

Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Before discussing the particular aspects of the SOA modeling tool and related processing in accordance with embodiments of the present invention, SOA and its components are briefly described first herein. SOA aims to enhance the efficiency, agility, and productivity of an enterprise by positioning services as the primary means through which solution logic is represented. Solution logic is represented in support of the realization of strategic goals associated with service-oriented computing. Service-oriented computing represents a new generation distributed computing platform. As such, it encompasses many things, including its own design paradigm and design principles, design pattern catalogs, pattern languages, a distinct architecture, and related concepts, technologies, and frameworks.

SOA involves several service-oriented components. One type of service-oriented component is a "service." A service may exist as a physically independent software program with specific design characteristics that support the attainment of the strategic goals associated with service-oriented computing. The goal of a service is to provide a set of strategic capabilities that are logically associated with each other. In this regard, a service may include one or more service-oriented operations that comprise a set of individually executable capabilities for the service. Operations in a service that are properly modeled in advance can help provide a level of abstraction that hides the underlying implementation details, thus promoting use of the service among different processes and different platforms. Service-oriented components that are not modeled can easily end up having implementation details embedded in a service contract that can lead to problems resulting from service requesters forming dependencies to implementations. The service can be called upon whenever one of its capabilities is needed. The consistent application of service-orientation design principles can lead to the creation of an inventory of services the majority of which will ideally have functional contexts that can be agnostic to any one business process to facilitate loose-coupling design goals for reusability.

Another service-oriented component in SOA is a service composition (also called a "composition"). Compositions may involve the use of an aggregate of services to perform a particular process. A composition of services may be comparable to a traditional application in that its functional scope is usually associated with the automation of a parent business process. The services in SOA may be reusable and may therefore be capable of participating in multiple service compositions.

To facilitate creation of a quality SOA design, service-oriented components are preferably modeled first as service-oriented "candidates." By first establishing service-oriented components conceptually as candidates, more thought can be given to how they can be composed repeatedly and defined prior to creating actual physical service designs. This reduces error and increases the quality of the eventual SOA design. In accordance with some embodiments of the invention, a service-oriented "candidate" can be any representation of a service-oriented component short of an actual physical implementation. The SOA modeling tool in accordance with an embodiment of the invention facilitates abstract modeling of service-oriented candidates. For example, the modeling of a service can be referred to as a "service candidate." The modeling of a service's operations can be referred to as "operation candidates." The modeling of a composition of services can be referred to as a "composition candidate." Some embodiments of the present invention facilitate SOA service candidate, operation candidate, composition candidate, and candidate inventory modeling as a method to conceptualize one or more service-oriented candidate inventories, before actually committing to physical service-oriented designs, the corresponding technical interfaces, and the underlying technology implementations.

A service-oriented candidate can be a completely abstract representation of a service-oriented component in a modeling context, or can incorporate design features in a design context as a direct or additional step from modeling. The design features may include any level of detail short of an actual implementation of the design, including but not limited to processing steps, business logic, interface requirements, expected inputs and outputs, and data structures. The SOA modeling tool can also facilitate the incorporation of design features in addition to modeling in accordance with another embodiment of the invention. The SOA modeling tool can also facilitate direct service-oriented component design without first modeling service-oriented candidates in another embodiment of the invention.

Figure 2:
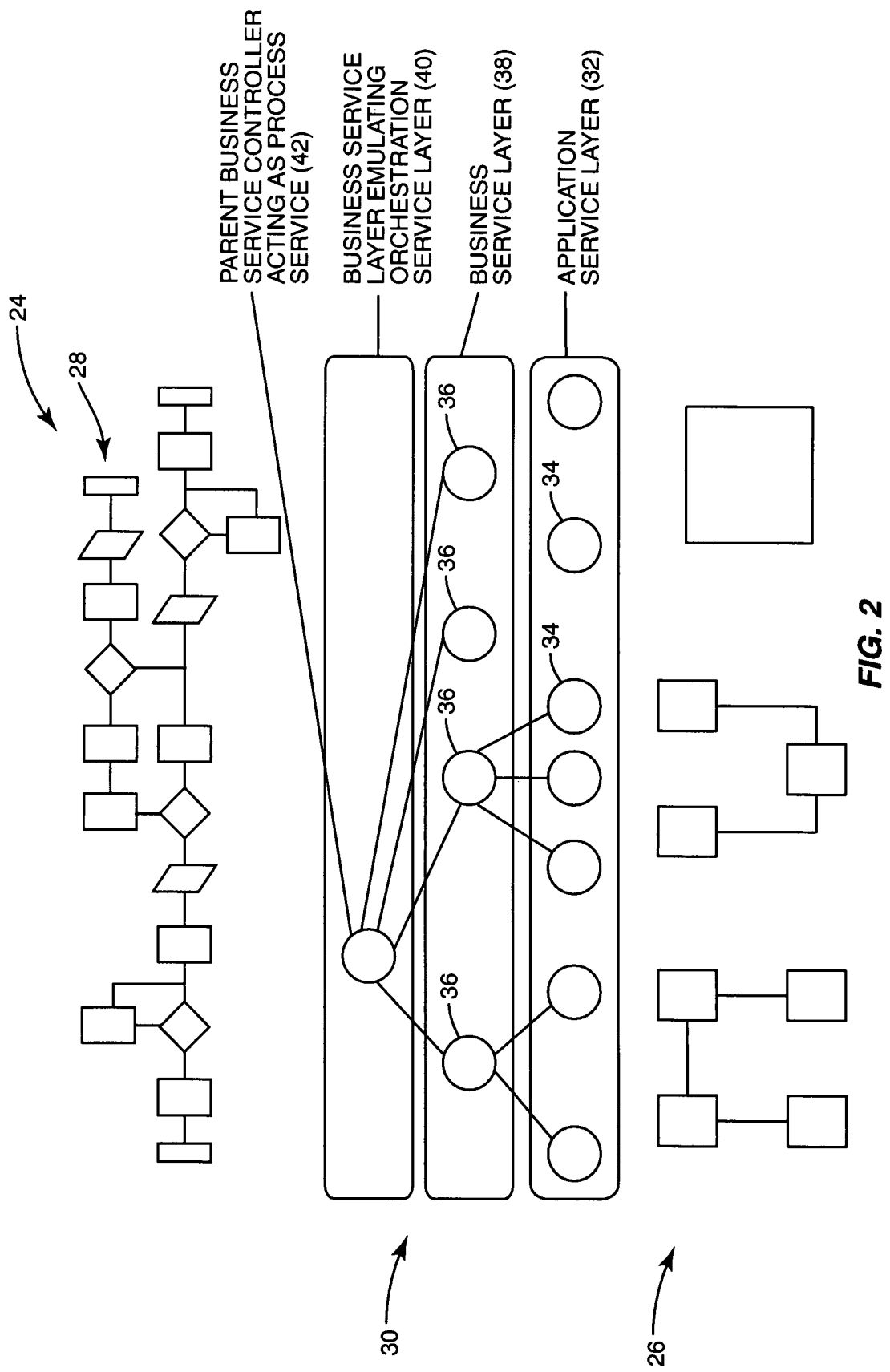
FIG. 2 depicts a typical, exemplary software architecture illustrating the service layer(s) in relation to business process and application layers.
Figure 3:
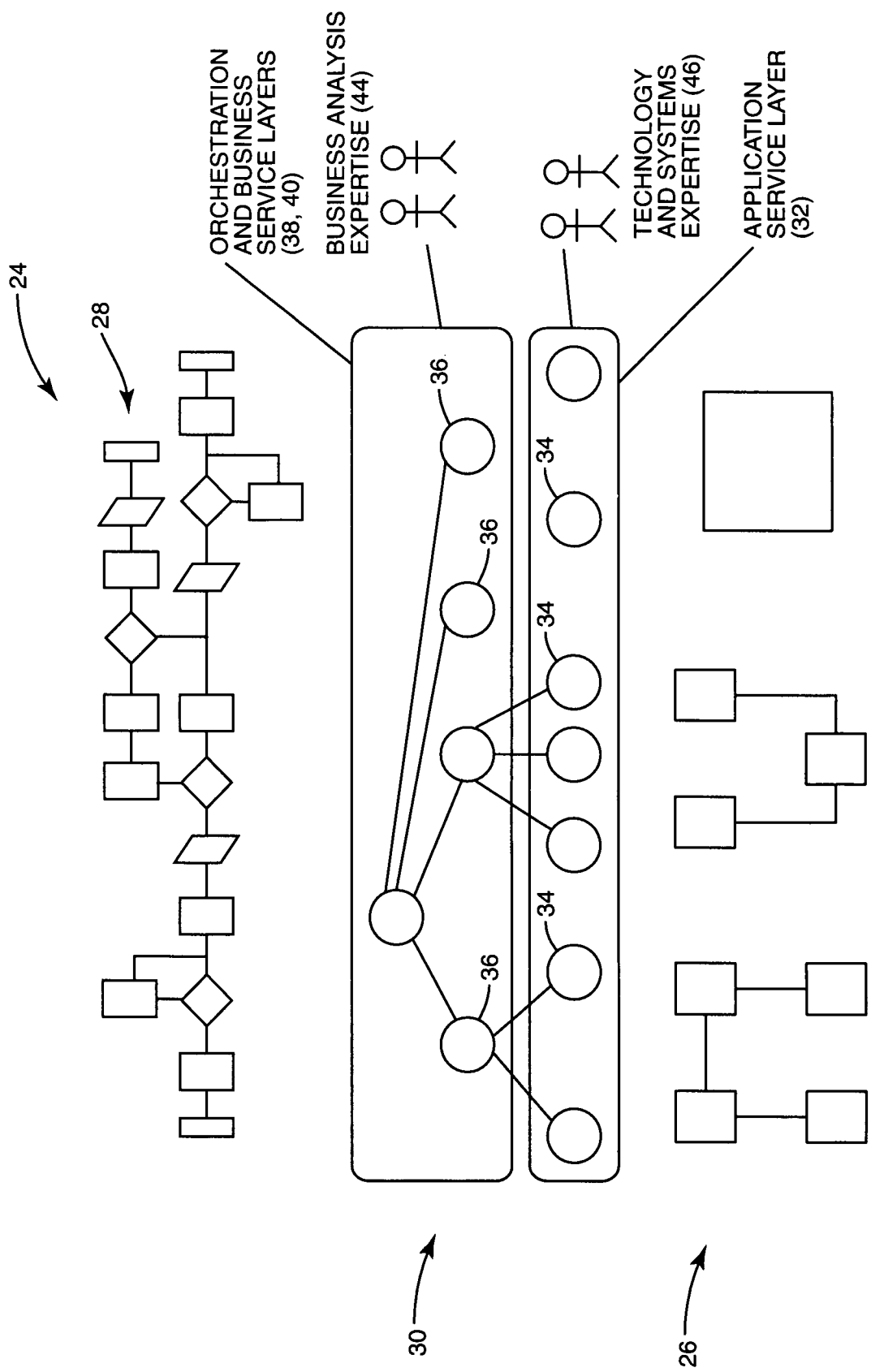
FIG. 3 depicts the exemplary software architecture of FIG. 2 further depicting the typical expertise involved in creating the service layer(s)

Embodiments of the present invention can also be used to model a SOA design involving services that encapsulate existing or legacy business software solutions and processes to a SOA. Embodiments of the present invention can also be used to model a SOA design for services that encapsulate new business processes and other logic. Before discussing the particular aspects of a SOA modeling tool to facilitate the creation and management of a SOA design project according to embodiments of the invention, FIGS. 1-3 are presented to discuss an exemplary SOA service modeling process.

FIG. 1 illustrates an exemplary SOA service modeling process. If necessary, the process involves first decomposing business processes that are to be modeled in the SOA (step 10). A documented business process can be broken down into a series of steps that can then be modeled in a SOA. The level of granularity of these series of steps may differ from the level of granularity at which the process steps were originally documented. After business processes to be modeled are decomposed into granular representations, if necessary, SOA modeling can next involve the identification of service candidates for a service inventory blueprint (step 12). Service candidates can be created having one or more operation candidates to provide a desired set of logically associated strategic capabilities for the service.

Next, service candidates can be created and edited in accordance with the identified service candidates (step 14). Repeated execution of this process of creating and editing service candidates results in the creation and gradual population of a service candidate inventory (step 16). The service candidate inventory is then available for the creation and population of compositions to carry out application layer business processes and for use and reuse in software systems, including potentially across different platforms. This is a goal of service-oriented computing. When the desired number of service candidates have been identified and created in the service candidate inventory, composition candidates can be created (step 18).

Composition candidates can next be created and edited by assigning service candidates into the composition candidate (step 18). Service candidates can be assigned to more than one composition candidate to promote reuse of service candidates in a SOA design project. Ideally, the service candidates are designed and chosen with this design goal in mind. As a result of creating and editing composition candidates, a composition candidate inventory will also be created and populated (step 20). In this manner, composition candidates can also be reused.

The SOA service modeling process may be an iterative process. Service and composition candidates may be continuously revised and modeled, and even deleted, if they do not satisfy the desired SOA design (step 22). Any service-oriented component in the SOA design project can be revised as long as certain SOA principles and paradigms are maintained. The corresponding service and composition candidate inventories are updated when revising service and composition candidates. A collection of data defining the SOA design project is referred to herein as a "SOA service model." When the SOA service model is completed, the model may be transformed into an actual SOA design implementation.

Note that the SOA service model process illustrated in FIG. 1 is an exemplary SOA modeling process. An organization may design their own SOA design projects and modeling processes to suit their individual needs. For example, organizations can also model SOA designs using a bottom-up approach, wherein service and operation candidates are first generated to create an inventory before creating composition candidates. This design approach may be well suited for modeling existing or legacy business processes in a SOA design project. Alternatively, an organization can model SOA designs using a top-down approach, where composition candidates may be identified first and service candidates created and included thereafter in the composition candidates. This design approach may be better suited for new business process designs.

FIG. 2 illustrates an exemplary software architecture 24 that further illustrates how service-oriented computing according to SOA principles. Specific implementations of software processes are included in a lower implementation layer 26. In order to provide abstraction between the implementation layer 26 and an business process logic 28, SOA layers 30 are included. The SOA layers 30 correspond to a SOA service model and contain service candidates and compositions of service candidates to accomplish strategy goals according to SOA principles. For example, an application service layer 32 may include SOA services 34. These services 34 may be called upon from compositions 36 included in a business service layer 38. A parent business process logic 40 to provide control of how information flows and compositions and their services interact, possibly between different systems, can also be provided. A parent business service controller 42, acting as a process service candidate 42, can also be included in the parent business process logic 40.

FIG. 2 provides an example of the deliberate abstraction of business logic (i.e. the top two layers 38, 40) from non-business logic (i.e. the bottom application service layer 32). The top layers 38, 40 represent business-centric services (i.e. services with a functional context based on or derived from existing business models such as business process definitions or business entity specifications). The bottom application service layer 32 represents non-business-centric services (i.e. services deliberately not derived from business models). These represent common types of services that can be modeled using some embodiments of the present invention.

When new processes are desired to be added to the software architecture 24, new composition candidates may be able to be created using existing service candidates among a service candidate inventory. In this manner, the implementation layer 26 may not need to be disturbed, thus increasing productivity and reducing errors when adding new processes and functionalities. Since other services may include operations that call upon the implementation layer 26, changes to the implementation layer 26 could require more extensive review of the software architecture 24 and/or retesting of an implementation of the software architecture 24. SOA principles promote design services to avoid disturbing the implementation layer 26.

FIG. 3 illustrates the same software architecture 24 illustrated in FIG. 2, but with the typical expertise required to model the various SOA layers 30. As illustrated, the application service layer 32 typically requires technology and system expertise 46, such as those having programming knowledge or experience. This is partly because the application service layer 32 involves interfacing with software implementations in the implementation layer 26. Part of the goals of a typical SOA may be to provide interfaces to legacy software functions into service candidates, thus requiring programming experience and knowledge of the legacy software. In a typical service inventory, the majority of services will be business-centric. In order to effectively model business-centric services, the business expertise of business analysts is essential in hands-on capacity. As discussed below, embodiments of the present invention provide a modeling tool that allows business analysts to be actively involved in the modeling process.

Figure 4:
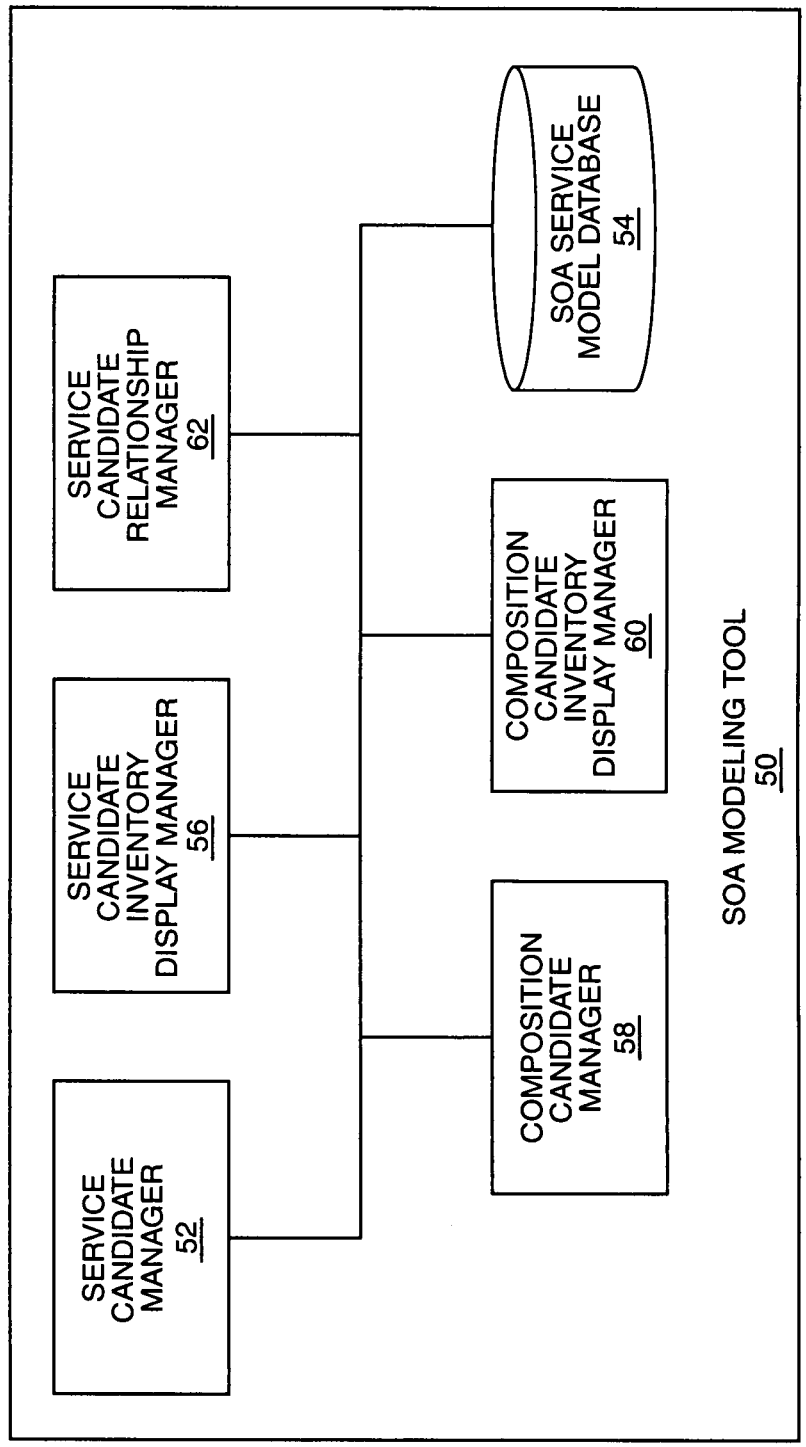
FIG. 4 depicts a block diagram of a SOA modeling tool according to one embodiment of the invention.

FIG. 4 illustrates a SOA modeling tool 50 that is provided in one embodiment of the invention to allow modeling of service-oriented components in accordance with SOA principles and paradigms. The modeling tool 50 may be used to model business centric services, non-business centric services, or a combination of the above. In one embodiment, the SOA modeling tool 50 requires no programming knowledge or expertise to use and create service-oriented candidates for a SOA service model. As discussed above, the SOA service model represents a collection of data defining an SOA design project. The SOA modeling tool 50 may be provided in the form of software executing on a machine or microprocessor-based system, hardware, firmware, or any combination of the above. According to this embodiment, the SOA modeling tool 50 may comprise several components. A service candidate manager 52 may be provided to facilitate the creation and management of service candidates for a SOA service model. An SOA service model database 54 is provided to store a SOA service model created by the SOA modeling tool 50. As service candidates are created via the service candidate manager 52, a collection of service candidates are stored in the SOA service model database 54 to create a service candidate inventory. The service candidate inventory provides a multitude of service candidates that can be assigned to composition candidates. The modeling tool 50 allows the creation and management of any number of SOA service models desired. In this regard, more than one SOA service model may be stored in the SOA service model database 54.

A service candidate inventory display manager 56 may also be provided by the SOA modeling tool 50. The service candidate inventory display manager 56 facilitates displaying the service candidate inventory to allow a user of the SOA modeling tool 50 to easily and intuitively view and select service candidates from the service candidate inventory when modeling composition candidates. Facilitating display of the service candidate inventory also allows other users and other platforms to share and reuse existing service candidates in either the same or different SOA service models.

A composition candidate manager 58 may also be provided by the SOA modeling tool 50 to facilitate the creation, modeling, and management of composition candidates. In one embodiment, two or more service candidates must exist in inventory in order to model a composition candidate. As composition candidates are created via the composition candidate manager 58, a collection of composition candidates are stored in the SOA service model database 54 to create a composition candidate inventory that can be used in a SOA service model.

A composition candidate inventory display manager 60 may also be provided by the SOA modeling tool 50. The composition candidate inventory display manager 60 facilitates displaying the composition candidate inventory to allow a user of the SOA modeling tool 50 to easily and intuitively view and select composition candidates from the composition candidate inventory. Facilitating display of the composition candidate inventory also allows other users and other platforms to share and reuse created composition candidates in either the same or different SOA service models.

A service/composition candidate relationship manager 62 may also be provided by the SOA modeling tool 50. As part of a SOA service model and modeling process, relationships are established between service-oriented candidates such as operation candidates, service candidates, and composition candidates. These relationships are provided according to SOA principles. The service/composition candidate relationship manager 62 facilitates tracking these relationships and enforcing them to maintain the integrity of the SOA service model created. For example, as will be discussed later in this application in more detail, operation candidates included in service candidates can be linked to other operation candidates and encapsulate composition candidates. The relationships can be recorded in the database 54, and displayed to the user when needed. In some embodiments, not only can the service/composition candidate relationship manager 62 track these relationships, it can ensure that these relationships are maintained to prevent a user from performing actions that would violate the SOA principles established for the SOA service model and risk the integrity of any resulting SOA design based on the SOA service model.

Figure 5:
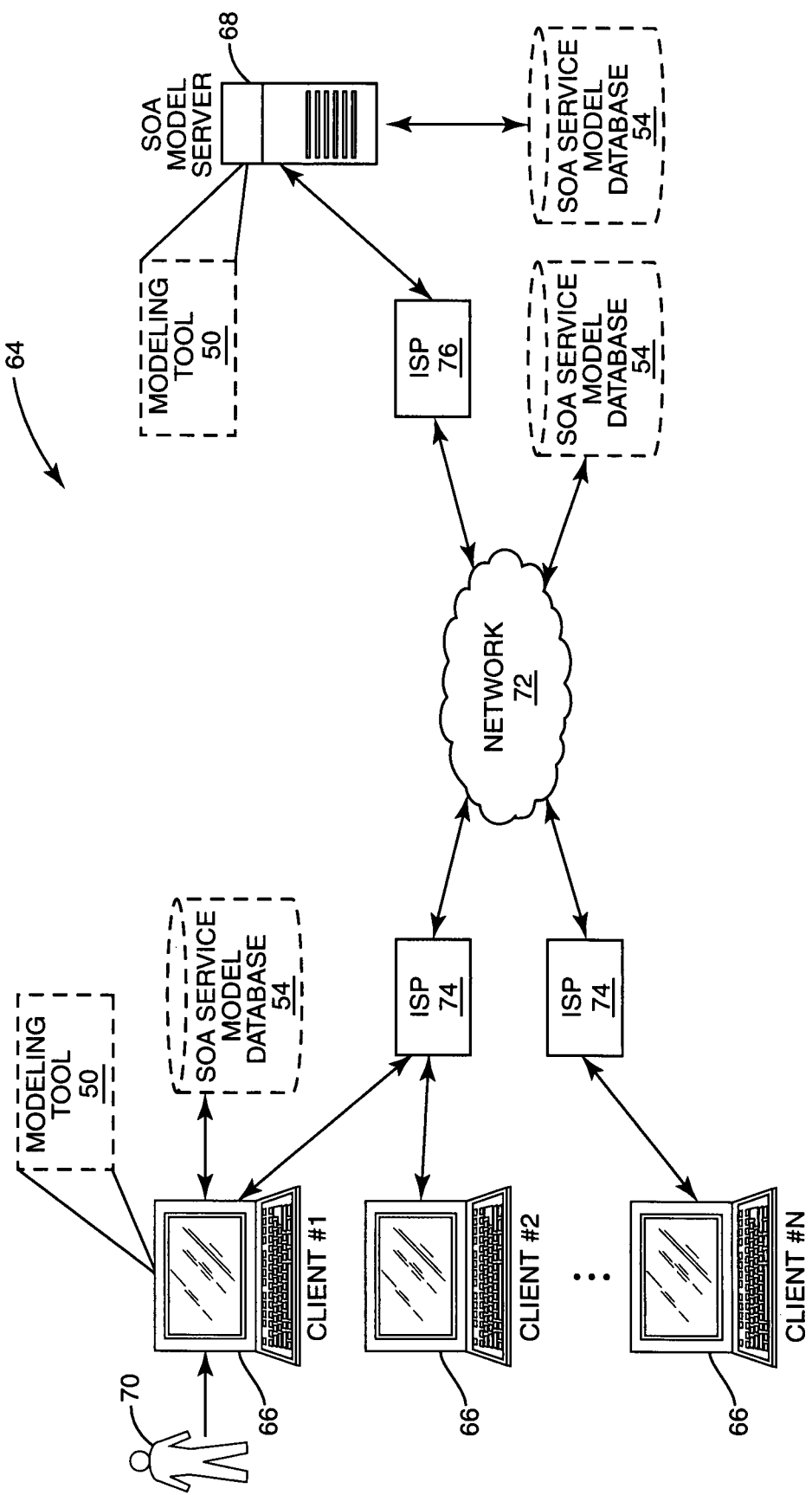
FIG. 5 depicts SOA modeling tool and database computing and networking architecture embodiments to allow one or more users, either locally or distributed among different locations, to create, store, share, and/or manipulate SOA service models and associated data locally, at a central server, using a network database, and/or in a peer-to-peer fashion.

FIG. 5 illustrates an exemplary SOA modeling tool and database computing and networking architecture 64 that may be employed to allow users to access the SOA modeling tool to create and manage SOA service models and service-oriented candidate inventory in the SOA service model database 54. The SOA modeling tool 50 is adapted to execute on a computer. The computer may be a user computer 66 or may be a server 68 located at a central location. In either case, a user 70 interacts with a user computer 66 or other interface to access the SOA modeling tool 50 to provide selections to create and manage service-oriented candidates for a SOA service model. The user 70 is not required to have any programming knowledge or expertise to use the SOA modeling tool 50. If the SOA modeling tool 50 is executing on the user's computer 66, the SOA service model database 54 may also be provided locally at the user's computer 66 as illustrated in FIG. 5.

If the SOA modeling tool 50 is executing on the server 68 or other remote location from the user 70, the user computer 66 may act as a client in a client-server architecture to access the SOA modeling tool 50. The SOA modeling tool 50 may be accessible by more than one user via the clients 66 illustrated in FIG. 5. Typically, the clients 66 will connect to the server 68 or other device that is executing the SOA modeling tool 50 over a network 72, such as a TCP/IP-based network for example, and typically through an information service provider (ISP) 74. The server 68 receives a connection request from the clients 70 over the network 72 via its ISP 76. The user 70 then provides selections and receives messages in response from the SOA modeling tool 50, via the client 66, when creating and managing service-oriented candidates. In this example, the SOA service model database 54 may located locally at the server 68, or provided as a network database hanging off the network 72 and accessible to the server 68 and/or client 66. A client-server architecture may be useful for allowing multiple users in different locations to work on the same SOA service model design and/or to provide the SOA modeling tool 50 in an application services provider (ASP) configuration. Also note that a peer-to-peer architecture can also be employed, wherein one of the clients 66 is executing the SOA service model 50 as a super peer, and one or more other clients 66 can access the SOA modeling tool via the super peer client 66.

Figure 6:
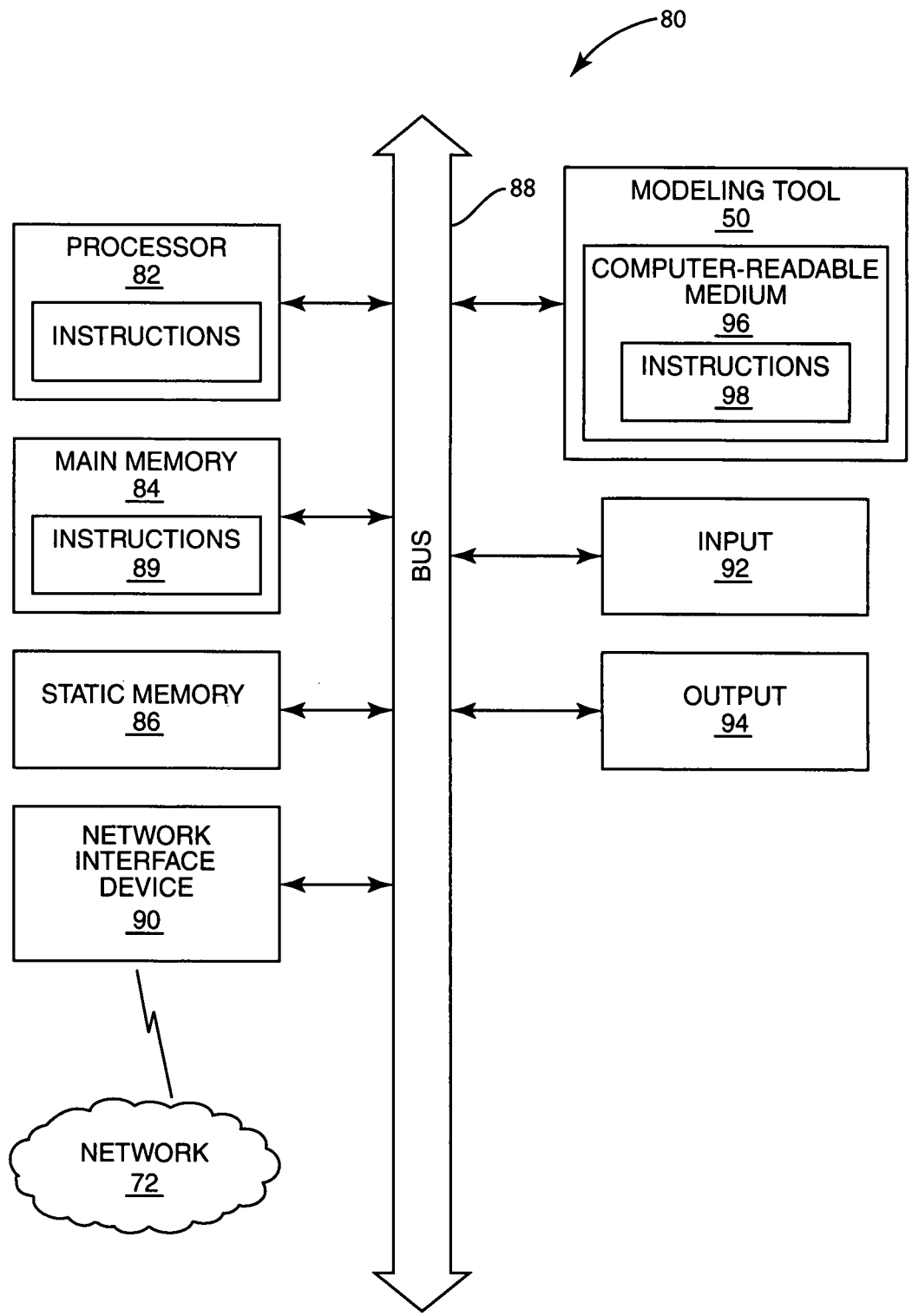
FIG. 6 illustrates a diagrammatic representation of a machine in the exemplary form of a computer system adapted to execute instructions from a computer-readable medium to perform the functions of the SOA modeling tool according to one embodiment of the invention.

FIG. 6 illustrates a diagrammatic representation of what a machine adapted to execute the modeling tool 50 (e.g. client 66, server 68) may comprise. In the exemplary form, the machine may comprise a computer system 80 within which a set of instructions for causing the machine to perform any one or more of the methodologies discussed herein may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, the server 68 or the user's computer 66.

The exemplary computer system 80 includes a processing device 82, a main memory 84 (e.g., read-only memory (ROM), flash memory, dynamic random access memory (DRAM) such as synchronous DRAM (SDRAM) or Rambus DRAM (RDRAM), etc.), and a static memory 86 (e.g., flash memory, static random access memory (SRAM), etc.), which may communicate with each other via a bus 88. Alternatively, the processing device 82 may be connected to memory 84 and/or 86 directly or via some other connectivity means.

Processing device 82 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 82 is configured to execute processing logic 89 for performing the operations and steps discussed herein.

The computer system 80 may further include a network interface device 90. It also may or may not include an input means 92 to receive input and selections to be communicated to the processing system 82 when executing instructions. It also may or may not include an output means 94, including but not limited to a video display unit (e.g., a liquid crystal display (LCD) or a cathode ray tube (CRT)), an alphanumeric input device (e.g., a keyboard), and/or a cursor control device (e.g., a mouse).

The computer system 80 may or may not include a data storage device having a machine-accessible storage medium 96 on which is stored one or more sets of instructions 98 (e.g., software) embodying any one or more of the methodologies or functions described herein. The software 98 may also reside, completely or at least partially, within the main memory 84 and/or within the processing device 82 during execution thereof by the computer system 80, the main memory 84 and the processing device 82 also constituting machine-accessible storage media. The software 98 may further be transmitted or received over the network 72 via the network interface device 90.

While the machine-accessible storage medium 96 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 7:
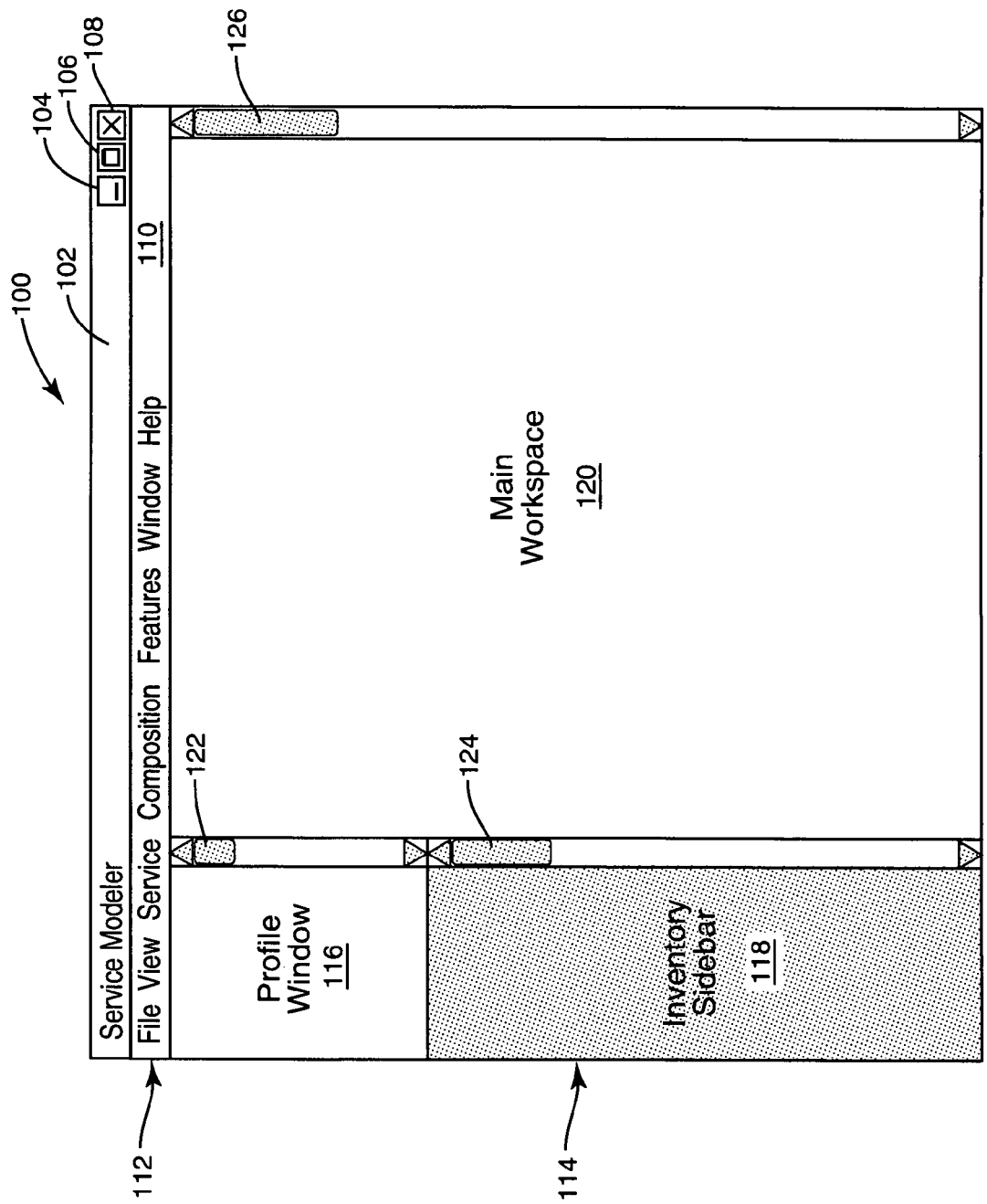
FIG. 7 is an exemplary user-interface for a SOA modeling tool according to one embodiment of the invention.

FIG. 7 illustrates an exemplary user-interface 100 that may be provided by the SOA modeling tool 50 to allow the user 70 to create and manage SOA service-oriented candidates for a SOA service model. Selections made by the user 70 and actions provided in response by the SOA modeling tool 50 are facilitated through the user-interface 100 using SOA modeling tool managerial components (e.g. those illustrated in FIG. 4). The user-interface 100 provides an intuitive and easy to use facility to allow those not having programming knowledge or expertise to use the SOA modeling tool 50 to create and manage SOA service models.

In the illustrated embodiment in FIG. 7, the user-interface 100 is provided in the form of an interface window. The user-interface 100 contains a title bar 102 that provides the name of the application, which is the "Service Modeler" in the illustrated example. Buttons 104, 106, 108 are provided for minimizing, expanding, and closing the user-interface 100. The SOA modeling tool 50 is adapted to allow the user to open multiple user-interface windows 100 to create and manage service-oriented components in either the same or different SOA service models. Thus, the user-interfaces 100 can be minimized, expanded, and closed, via buttons 104, 106, 108, as desired.

A menu bar 110 may provide menu functions 112 accessible by the user 70 of the SOA modeling tool 50 to perform actions relating to the creation and management of a SOA service model. The menu bar 110 facilitates a GUI experience familiar to the users through various commonly used applications such as Microsoft® Word®, Excel®, etc. For example, the user 70 might open a new SOA service model file using the "File" menu item. The user 70 might view service-oriented candidates in the SOA service model using the "View" menu item. The user 70 might manage service and composition candidates using the "Service" and "Composition" menu items, respectively. The user 70 can also access the "Features," "Window," and "Help," menu items to access other functions and features provided by the SOA modeling tool 50. A description of possible functions that may be included in the menu items in the menu bar 110 are provided in the "Menu Bar Reference" provided in the Appendix to this application and incorporated by reference herein in its entirety.

In order to facilitate intuitive and easy use of the SOA modeling tool 50, the user-interface 100 may be partitioned into three distinct areas. A first area is a profile window 116. The profile window 116 is a window (e.g., a read-only window) that displays a profile information summary of a chosen service or composition candidate. A second area is an inventory sidebar 118. The inventory sidebar 118 is a navigation pane that displays the inventory of service and composition candidates in a predefined sequence. The inventory sidebar 118 is located adjacent a main workspace 120, the third area. The main workspace 120 is the primary part of the user-interface 100 with which the user 70 may create and manage service-oriented candidates. The main workspace 120 is used to allow the user 70 to create service candidates, which when added, are displayed in the inventory sidebar 118 as part of a service candidate inventory. When composition candidates are modeled, the user 70 can view the inventory of service candidates in the inventory sidebar 118 without obscuring the main workspace 120. The user 70 can select one or more of the service candidates to be assigned to a composition candidate.

The user-interface 100 may also be designed to allow the user to "drag and drop" service candidates from the service candidate inventory in the inventory sidebar 118 as a convenient method of assigning service candidates to a composition candidate. Thus, the location of the inventory sidebar 118 adjacent the main workspace 120 in this exemplary user-interface 100 is particularly useful. Each of the windows and workspaces 116, 118, 120 also have scroll bars 122, 124, 126 to allow the user 70 to scroll each window independently, since information displayed in these windows 116, 118, 120 may not be able to be fully displayed in the given amount of space allowed for the windows. Further, the windows 116, 118, 120 can be resized to allow more or less space for the main workspace 120 as desired by the user 70.

Figure 8:
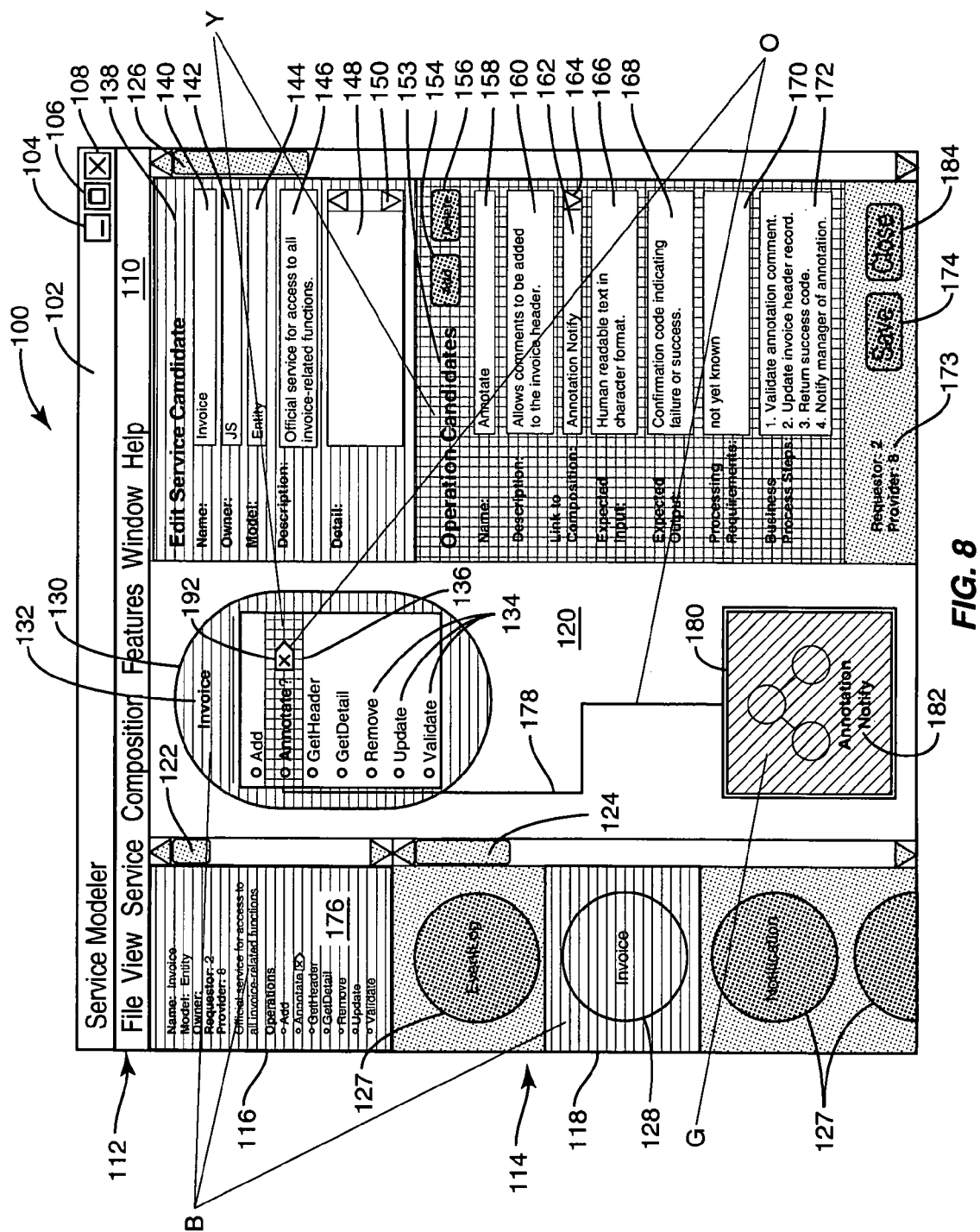
FIG. 8 illustrates the architectural components of the user-interface illustrated in FIG. 7 according to one embodiment of the invention.

FIG. 8 illustrates the user-interface 100 when a service candidate is being edited to further illustrate and describe several other aspects of the user-interface 100 that facilitate the intuitive creation and management of service-oriented candidates. In this illustration, a number of service candidates 127 have already been added and are displayed in the inventory sidebar 118. A particular service candidate 128 has been selected for editing by the user 70. This service candidate 128 is highlighted in the inventory sidebar 118. The user 70 can select this service candidate 128 for editing by accessing the "Service" menu item on the menu bar 110. Alternatively, the user 70 could click on the service candidate 128 in the inventory sidebar 118, such as with a left mouse button click, and when the cursor is over top the service candidate 128, choose to edit the service candidate 128, such by clicking the right mouse button to edit. Other actions can be performed on service candidates in the service candidate inventory 114 by selecting the desired service candidate directly from the inventory sidebar 118.

The SOA modeling tool 50 may also be adapted to provide visual indicators to easily and intuitively distinguish the various service-oriented components displayed on the user-interface 100, via the SOA modeling tool 50, to the user 70. This makes the user-interface 100 even more intuitive to the user 70 for ease of use. These visual indicators may be, for example, color codings, different shapes or different lines (e.g., solid lines, dashed lines, etc.) provided in the user-interface 100. In the illustrated example, color coding effectively and visually communicates what parts of the program are associated with specific components. The user-interface 100 illustrated in FIG. 8 shows these various colors using distinct markings. While the drawings of the present application do not show color, distinct markings are illustrated to represent color. In one embodiment, service candidate-related data and symbols are shown in blue, signified by the markings indicated by the 'B' symbol. Composition candidate-related data and symbols are green, signified by the markings indicated by the "G' symbol. Operation candidate-related data and symbols within a service candidate are yellow, signified by the markings indicated by the 'Y' symbol. Relationships between the operation candidates are lines and symbols in orange, signified by the 'O' symbol. The visual indicator markings illustrated in the figures or any other visual indicators may be used by the modeling tool 50 on the user-interface 100 to distinguish the various service-oriented components and their relationships from each other, if desired.

In this example of FIG. 8, the "Invoice" service candidate is being edited. Although the SOA modeling tool 50 is capable of providing numerous functions that are discussed fully in this application, the example of editing a service candidate in the user-interface 100 is next discussed to provide examples of the features that can be further provided in the user-interface 100 by the SOA modeling tool 50.

A service candidate symbol 130 representing the service candidate is provided in the main workspace 120. The service candidate name 132 is provided in the service candidate symbol 130. The service candidate is illustrated as containing operation candidates 134. The operation candidates 134 have been previously added and assigned to the service candidate 130. One operation candidate, the "Annotate" operation candidate 136, is highlighted as currently being edited in the user-interface 100.

The service candidate 130 is being edited via an "Edit Service Candidate" area 138 (e.g. form) displayed in the main workspace 120. A "Name" field 140 is provided to allow the user 70 to name the service candidate. An "Owner" field 142 allows a particular user to indicate ownership of a service candidate in case multiple users are accessing the SOA service model to signify the owner and/or to enforce editing rules that may be present in the SOA modeling tool 50. A particular classification may be associated with the service candidate 130 in a "Model" field 144. Common classifications may include the business-centric and non-business-centric designations described earlier in FIGS. 2 and 3 in association with service layers. A "Description" field 146 allows a short description of the service candidate 130 to be defined. This is the description that is displayed in the profile window 116. A "Details" box 148 allows the user to add more details about the service candidate 130. A scroll bar 150 can be provided in case the details provided expand outside the size of the "Details" box 148.

In a similar fashion, an "Operation Candidates" area 153 (e.g. form) is displayed in the main workspace 120 when editing a service candidate. Since more than one operation candidate can be added to a service candidate, "Add" and "Delete" buttons 154, 156 are provided to allow the user 70 to add and delete operation candidates for a service candidate, as desired. A "Name" field 158, "Description" field 160, "Expected Input" field 166, "Expected Output" field 168, "Processing Requirements" field 170, and "Business Process Steps" field 172 allow the user to provide textual information for operation candidates to store in the SOA service model. This information may be used to explain the purpose and functionality of the operation candidate and to explain algorithms and workflow logic of its functionality including the sequence and further details of its relationships and to facilitate design and implementation information during the modeling process that will be useful when implementing the SOA service model. The SOA modeling tool 50 may also be used to define actual service-oriented components as opposed to their candidates.

The "Link to Composition" or "Encapsulate Composition" drop down box 162 allows the user to associate an existing composition candidate to the currently displayed operation candidate thereby communicating the fact that this operation candidate is linked to and encapsulates the selected composition candidate. For example, the "Annotate" operation candidate 136 is signified as being linked to or encapsulating the "Annotation Notify" composition candidate 180. When executed, the "Annotate" operation candidate 136 can therefore place the "Invoice" service candidate into controller role, meaning that it encapsulates the logic required to carry out an entire composition. This is signified by a relationship line 178 in the main workspace to provide the user 70 a convenient and easy method to see this relationship. How an operation candidate that is linked to a composition candidate can carry out its composition logic can be described in the business process steps 172 field.

The "Requestors" and "Providers" counters 173 are displayed to signify tracked relationships between operation candidates in the service candidates added to a composition candidate. In the service candidate 130 illustrated in FIG. 8, the "Annotate" operation candidate 136 acts as the requestor of two other services as part of its participation in the "Annotate Notify" composition candidate. Thus, the "Requestor" count is displayed as "2" in the user-interface 100. Note that the "Requestor" count for a given service candidate represents the sum of all requester relationships of all the service candidate's operation candidates. The "Provider" count is displayed as "8" in the user-interface 100, meaning that the service candidate is being reuse eight times within other composition candidates. Providing information to the user 70 as to the number of relationships between service candidates can inform the user 70 whether a service candidate is being adequately used in the SOA service model and/or if the service candidate is being overused. If so, the user 70 may chose to remodel service candidates to provide a more balanced SOA service model. This feedback, provided via the user-interface 100, can also help the user 70 better plan and establish a suitable infrastructure for the services. For example, a service that is expected to encounter a high amount of reuse may require special deployment considerations, such as isolated implementation, clustering, and data replication.

When the user 70 desires to save the current inputs in the service and/or operation candidate areas 138, 153, a "Save" button 174 can be selected. Information 176 entered for the service candidate may be updated and displayed in the profile window 116 in response. The user 70 can continue to provide selections for the service candidate 130 until done. When done, the user 70 selects a "Close" button 184, as opposed to the "Save" button 174, which will save the selections in the SOA service model database 54 and close the user-interface 100.

Figure 9:
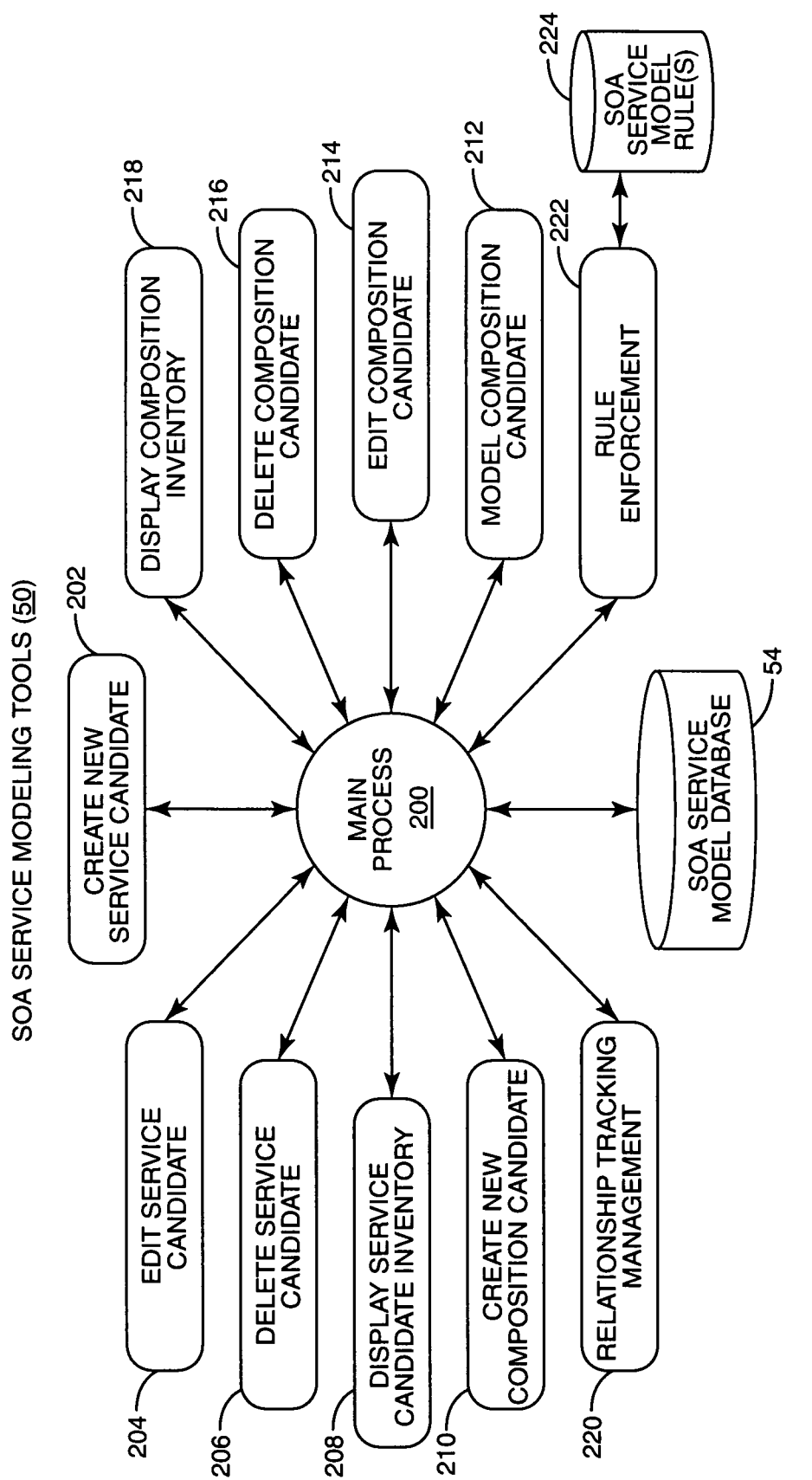
FIG. 9 illustrates processes that may be employed in the SOA modeling tool to facilitate service modeling and/or the operation of the SOA modeling tool user-interface illustrated in FIGS. 7 and 8, according to one embodiment of the invention.

FIG. 9 illustrates various other functions that may be provided by the SOA modeling tool 50 to facilitate the creation and management of service-oriented candidates according to SOA principles. The SOA modeling tool 50 may provide a main process 200 that controls the overall processing. As the user 70 provides input via the user-interface 100, the main process 200 accesses the particular function needed to respond to the user 70.

The capabilities of the SOA modeling tool 50 include capabilities relating to service and composition candidates. In regard to service candidates, the SOA modeling tool 50 may include a create new service candidate process 202. In response, a new service candidate can be created by creating a new service candidate profile record and adding the service candidate to the service candidate inventory in the SOA service model database 54. The service candidate profile record is stored in the SOA service model database 54 associated with any links or relationships to other candidates. The SOA modeling tool 50 may also include an edit service candidate process 204. In response, the service candidate profile record can be revised and updated in the SOA service model database 54. The SOA modeling tool 50 can also include a delete service candidate process 206. In response, the selected service candidate profile record to be deleted is deleted in the SOA service model database 54. The SOA modeling tool 50 can also include a display service candidate process 208. In response, the service candidate profile record is accessed from the SOA service model database 54 and displayed on the user-interface 100.

In regard to composition candidates, the SOA modeling tool 50 can include a create new composition candidate process 210. In response, a new composition candidate is created by creating a new composition candidate profile record and adding the composition candidate to the composition candidate inventory in the SOA service model database 54. The composition candidate profile record is stored in the SOA service model database 54 associated with any links or relationships to other candidates. The SOA modeling tool 50 can include a model composition candidate process 212. Service candidates from the service candidate inventory are assigned to the composition candidate to define relationships between operation candidates in the service candidates. The SOA modeling tool 50 can be used to edit an existing composition candidate 214. In response, the composition candidate profile record can be revised and updated in the SOA service model database 54. The SOA modeling tool 50 can also include a delete composition candidate process 216. In response, the composition candidate profile record is deleted in the SOA service model database 54. The SOA modeling tool 50 can include a display composition candidate process 218. In response, the composition candidate profile record is accessed from the SOA service model database 54 and displayed on the user-interface 100.

The SOA modeling tool 50 can also provide a relationship tracking process 220 to track relationships between the service-oriented candidates according to SOA principles. The SOA modeling tool 50 can also include a SOA model relationship integrity enforcement process 222 that enforces SOA service mode rules 224 to enforce the integrity of the relationships between service-oriented candidates. Because the SOA modeling tool 50 allows the manipulation of service-oriented candidates, the enforcement of SOA principles and relationships can be provided to ensure the integrity of the SOA service model and any SOA implementation based on the SOA service model.

Exemplary user interface provided by the SOA modeling tool 50 and corresponding processes will now be discussed in more detail. Processes discussed herein may be performed by processing logic that may comprise hardware (e.g., circuitry, dedicated logic, programmable logic, microcode, etc.), software (such as instructions run on a processing device), or a combination thereof. In one embodiment, processes are performed by SOA modeling tool 50 of FIG. 1.

Figure 10:
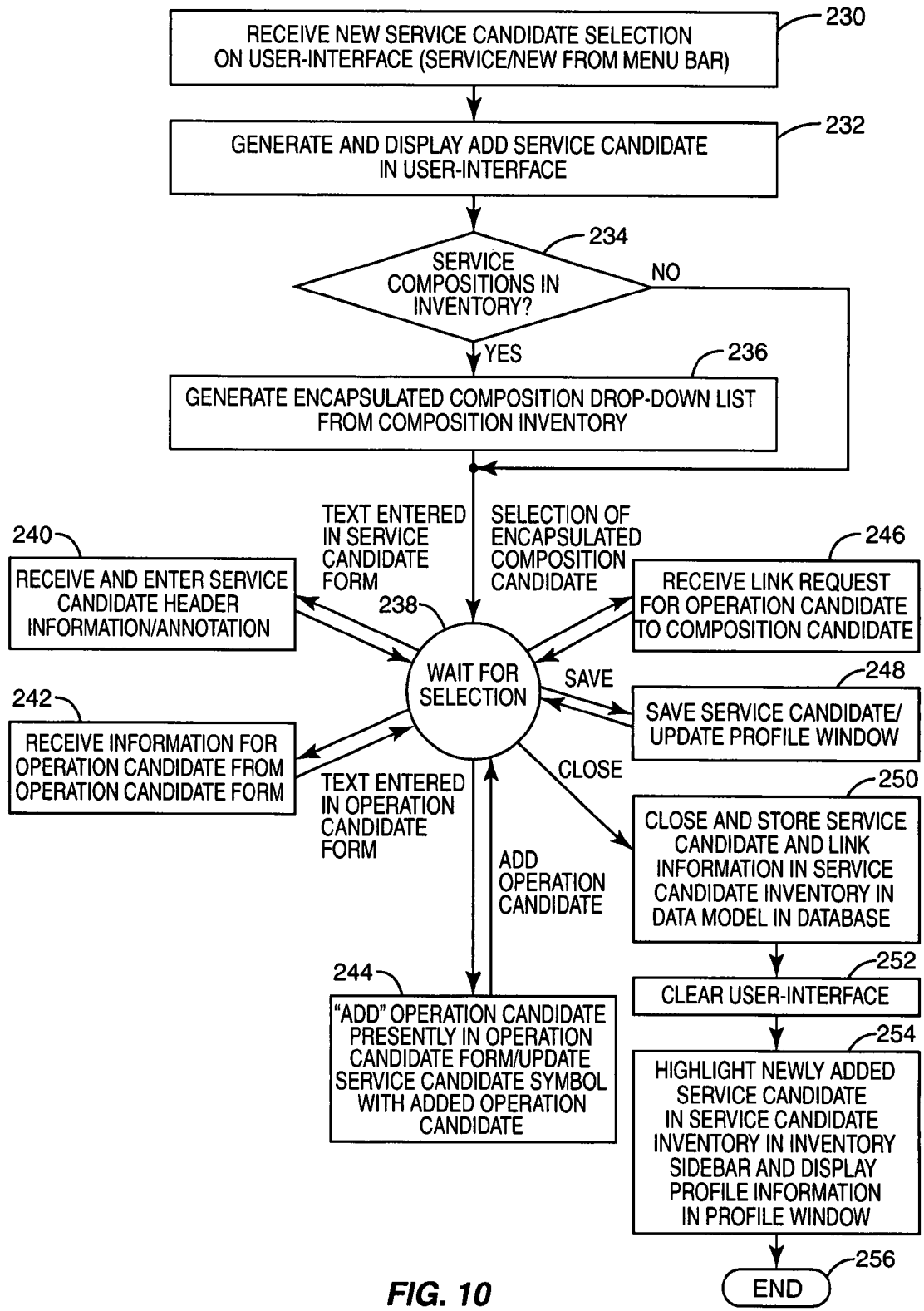
FIG. 10 illustrates an add service candidate process that may be performed by the SOA modeling tool according to one embodiment of the invention.
Figure 11:
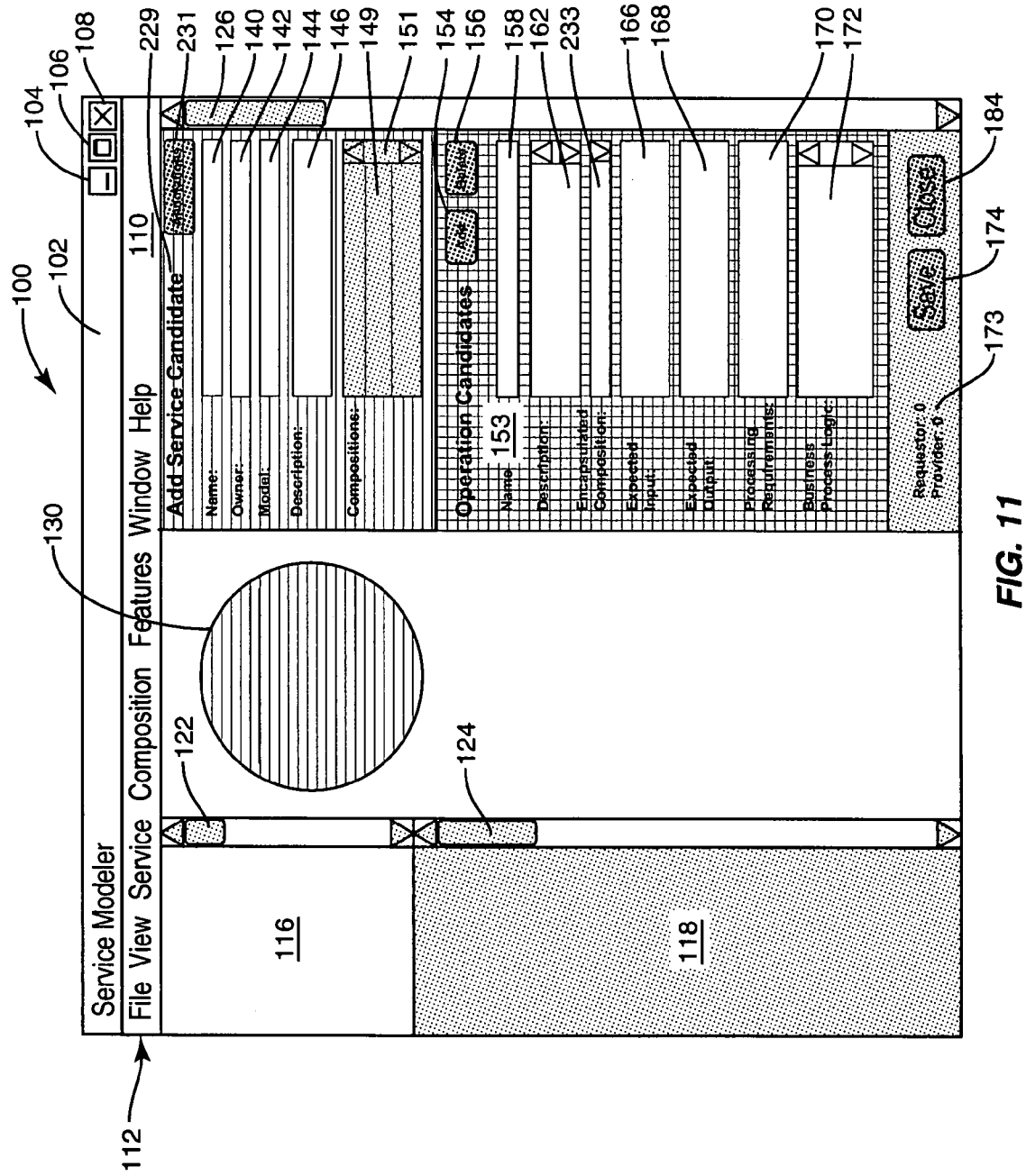
FIG. 11 is an exemplary user-interface illustrating the add service candidate form and operation candidates form on the user-interface according to one embodiment of the SOA modeling tool.
Figure 12:
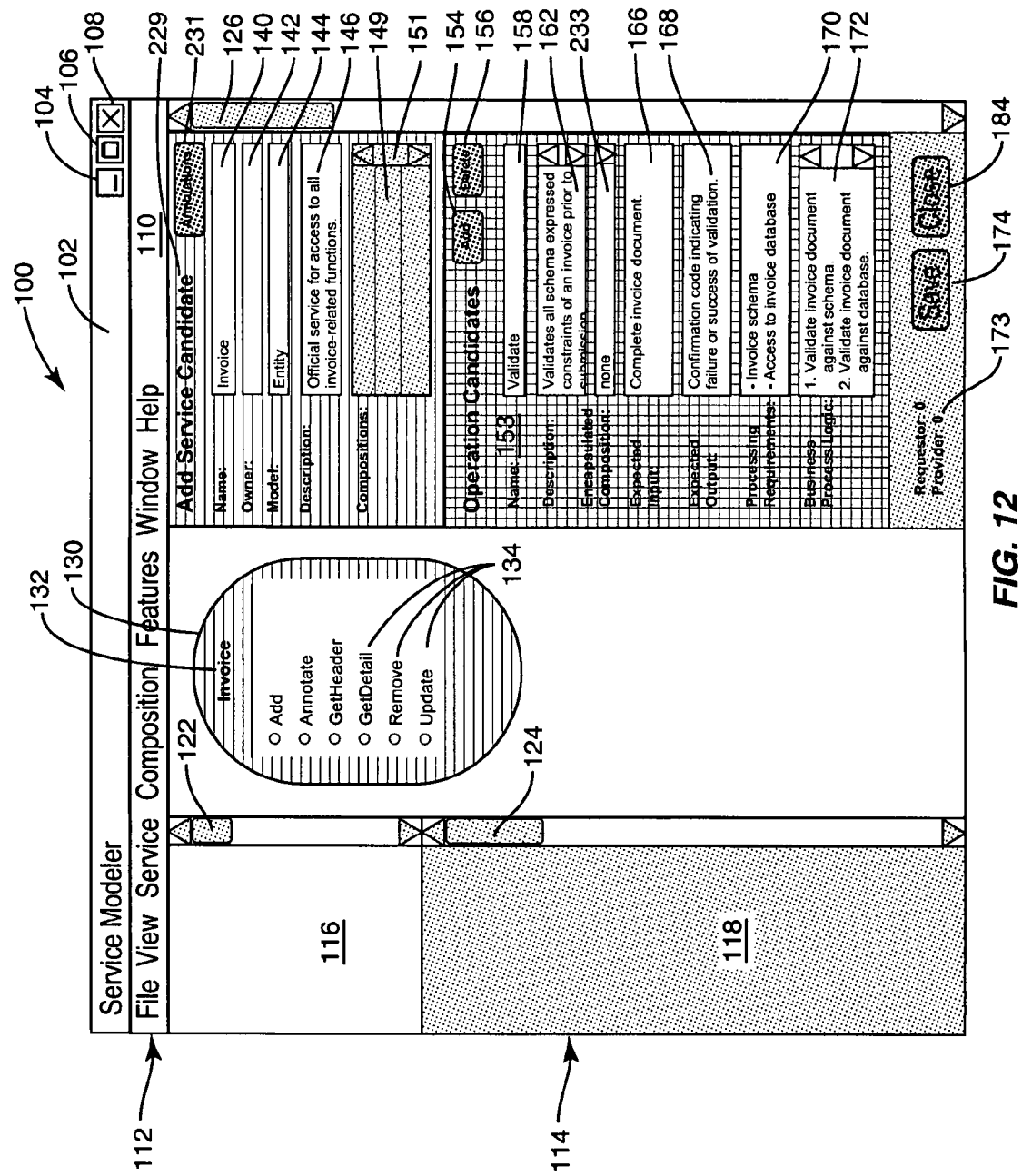
FIG. 12 is an exemplary user-interface illustrating the added service candidate and its operation candidates according to one embodiment of the add new service candidate process.
Figure 13:
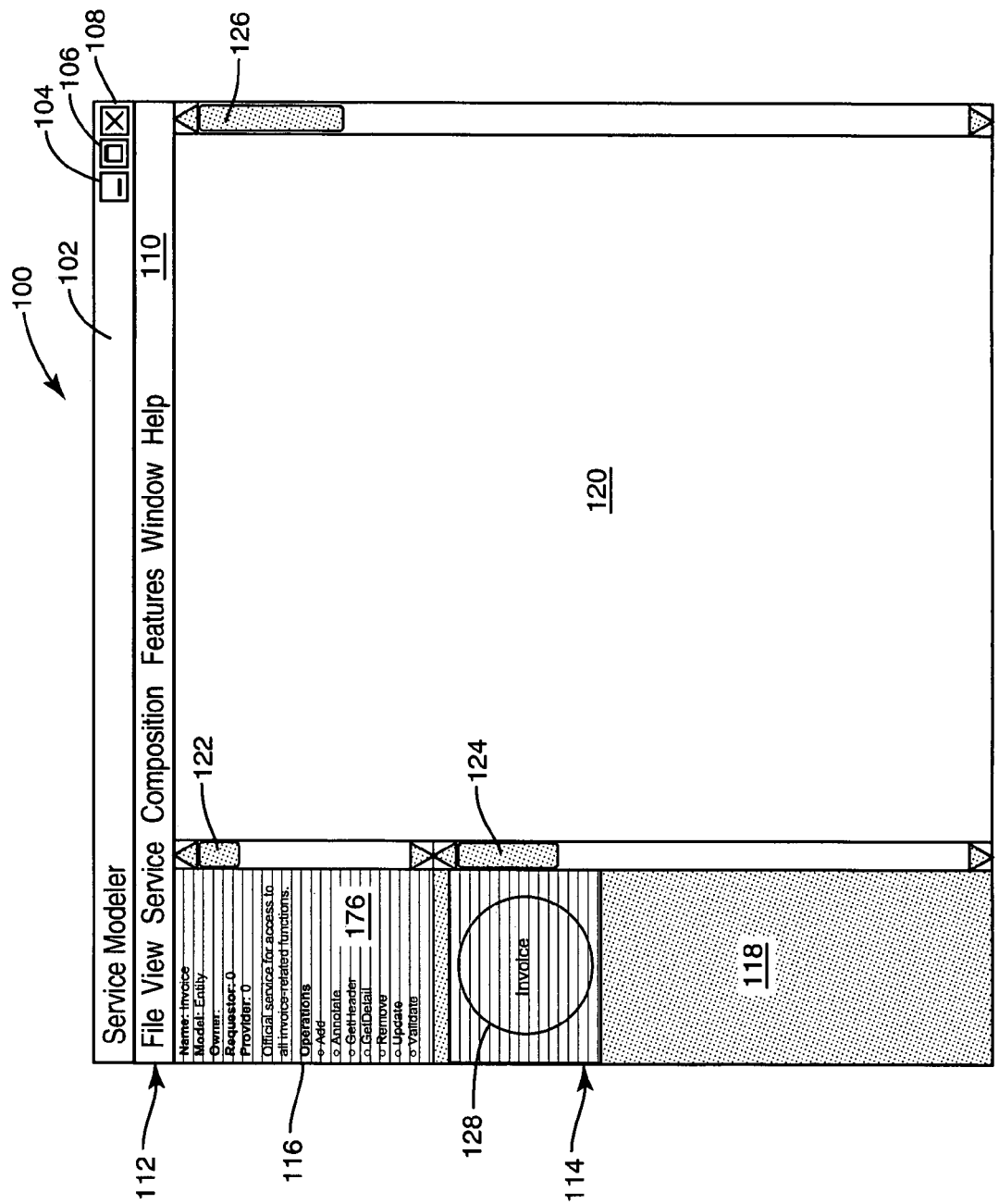
FIG. 13 is an exemplary user-interface illustrating the inventory sidebar and profile window containing an added service candidate in a service candidate inventory according to one embodiment of the add service candidate process.

FIG. 10 illustrates an exemplary create or add new service candidate process 202 (see FIG. 9) that includes some of the possible functions that may be performed, via the modeling tool 50, by the service candidate manager 52 (see FIG. 4). New service candidates can be added to a service candidate inventory in the SOA service model database 54. FIGS. 11-13 illustrate exemplary views of the user-interface 100 when adding a new service candidate. FIGS. 10-13 will be discussed with reference to each other.

As illustrated in FIG. 10, a new service candidate is added to the SOA service model in response to the SOA modeling tool 50 receiving a new service candidate selection from the user-interface 100 (step 230). The user 70 may select the "Service/New" menu item from the menu bar 110 to add a new service candidate. Alternatively, the user 70 could also place a selection device (e.g. mouse) pointer on a non-occupied part of the inventory sidebar 118 (e.g. mouse right button click) and select an "Add Service" operation from a pop-up menu (not shown). Other methods may be provided via the user-interface 100 to allow the user 70 to select to add a new service candidate. In response to this selection, the SOA modeling tool 50 may perform the add service candidate process 202 (see FIG. 9), such as exemplified by the process illustrated in FIG. 10, to allow the user 70 to add a service candidate in the service candidate inventory 114. The SOA modeling tool 50 generates a new service candidate profile record and displays a user interface having an "Add Service Candidate" area 229 and an "Operation Candidates" area 153 in the main workspace 120 to receive information for new service candidate profile record. These areas 153, 229 are shown in the exemplary user-interface 100 illustrated in FIG. 11. The modeling tool 50 displays these areas 153, 229 to prepare for receiving service candidate profile record information from the user 70 regarding the new service candidate. A service candidate symbol 130 is also added in the main workspace 120 to visually represent the service candidate and any added operation candidates 134 in response to user 70 selections.

Prior to receiving user 70 selections for the new service candidate, the modeling tool 50 also determines if there are any compositions in inventory (FIG. 10, decision 234). If so, the modeling tool 50 includes these composition candidates in an "Encapsulated Composition" drop-down list 230 in the "Operation Candidates" area 153, as illustrated in the exemplary user-interface 100 in FIG. 11 (FIG. 10, step 236). This is because as part of adding a new service candidate, the user 70 can choose to encapsulate or link an operation candidate added to the service candidate to a composition candidate. An operation candidate added for the new service candidate may represent a function that encapsulates other services, thereby placing the service candidate into the role of composition controller. The "Encapsulated Composition" drop-down list 230 provides a convenient method to make the composition candidate inventory available to the user 70 for encapsulating a composition candidate. Only one operation candidate can be linked to a composition candidate. Therefore, only unlinked composition candidates are placed in the "Encapsulated Composition" drop-down menu list 230.

The modeling tool 50 then waits for a selection on the user-interface 100 from the user 70 (step 238). The user 70 can choose to enter service candidate header information for the new service candidate profile record in the "Add Service Candidate" area 229 on the user-interface 100, as illustrated in the exemplary user-interface 100 in FIG. 12. FIG. 12 illustrates an exemplary new "Invoice" service candidate being added. In response, the modeling tool 50 receives and enters the service candidate header information in the new service candidate profile record (FIG. 10, step 240). The user 70 can also choose to provide additional, ad hoc comments and file attachments to be linked to the new service candidate by clicking the "Annotations' button 231. In response, the modeling tool 50 may display a word processing document that is permanently linked to the service candidate profile record.

The user 70 can also add operation candidates to the new service candidate by filling out the fields 158-172 in the "Operation Candidates" area 153 (FIG. 10, step 242), as illustrated in the exemplary user-interface 100 in FIG. 12. The user 70 can add operation candidates to the new service candidate by clicking the "Add" button 154 in the "Operation Candidates" area 153. In response, the modeling tool 50 adds the operation candidates to the service candidate profile record (FIG. 10, step 244). As operation candidates are added to the new service candidate, their names 134 appear within the service candidate symbol 130 in the main workspace 120 to provide the user 70 a visual representation of the new service candidate (FIG. 10, step 244). The service candidate symbol 130 is automatically expanded by the modeling tool 50 as operation candidates 134 are added to the service candidate. For example, the new "Invoice" service candidate illustrated in FIG. 12 contains six operation candidates: "Add," "Annotate," "GetHeader," "GetDetail," "Remove," and "Update."

If an operation candidate added to the new service candidate represents a function that encapsulates other services, thereby placing the new service candidate into the role of a composition controller, the user 70 can link an added operation candidate 134 in the new service candidate to a composition candidate. The user 70 provides this request, via the "Link to Composition" or "Encapsulated Composition" drop-down list 230 illustrated in the exemplary user-interface 100 in FIG. 12, to select the composition candidate to link to the operation candidate. The "Encapsulated Composition" drop-down list 230 was previously populated by the modeling tool 50 (FIG. 10, step 236) with an available composition candidate from the composition candidate inventory. In response, the SOA modeling tool 50 links the operation candidate to the composition candidate selected by the user 70 in the "Encapsulated Composition" drop-down list 230 (FIG. 10, step 246), thereby establishing this service candidate as the controller of the composition. The modeling tool 50 also visually indicates that the operation candidate is linked to a composition candidate by placing an "Expand" symbol (⊠) beside the operation candidate in the service candidate symbol 130 (illustrated in FIG. 8). This expand symbol allows the user 70 to later drill-down into composition candidates by revealing encapsulated compositions within operations of service candidates that may be part of different composition candidates in which they do not act as the composition controllers.

The modeling tool 50 also updates the "Requestors" and "Providers" counters 173 on the user-interface 100, as illustrated in FIG. 12. These counters 173 are updated by the creation of relationships in the main workspace 120 when modeling a composition candidate. These counters 173 are initially set to zero when a new service candidate is added, since relationships with the operation candidates have not yet been added in a composition candidate. The "Requestor" count represents the number of relationships for which the service candidate initiates contact with another service candidate, called the "Provider."

At any time, the user 70 can save the current selections for the service candidate header information and the operation candidates 134 added to the service candidate by selecting the "Save" button 174. In response, the SOA modeling tool 50 saves the service candidate header information and operation candidates 134 in the new service candidate profile record in the SOA service model database 54 (FIG. 10, step 248). However, the "Add Service Candidate" area 229 is not closed. The profile window 116 displays the new service candidate profile record information 176 added thus far by the user 70, as illustrated in the exemplary user-interface 100 in FIG. 13. The user 70 can continue to make selections for the new service candidate until finished. The "Save" button 174 is provided to allow the user 70 to save changes for a new service candidate profile record at any time as information is added. The profile window 116 is updated with any changed new service candidate profile information 176 after each save.

When the user 70 has completed providing information for the new service candidate profile record, the user can choose the "Close" button 184. In response, the modeling tool 50 stores the new service candidate profile record in the SOA service model database 54 in case the user 70 did not previously save the new service candidate profile record via the "Save" button 174 (FIG. 10, step 250). The added service candidate is included in the service candidate inventory in the SOA service model database 54. The main workspace 120 is cleared (FIG. 10, step 252). As illustrated in the exemplary user-interface 100 in FIG. 13, the new service candidate profile record information 176 is updated in the profile window 116 (FIG. 10, step 250), and the new service candidate is visually added to the service candidate inventory 114 displayed in the inventory sidebar 118 with the new service candidate highlighted 128 (FIG. 10, step 254).

Figure 14:
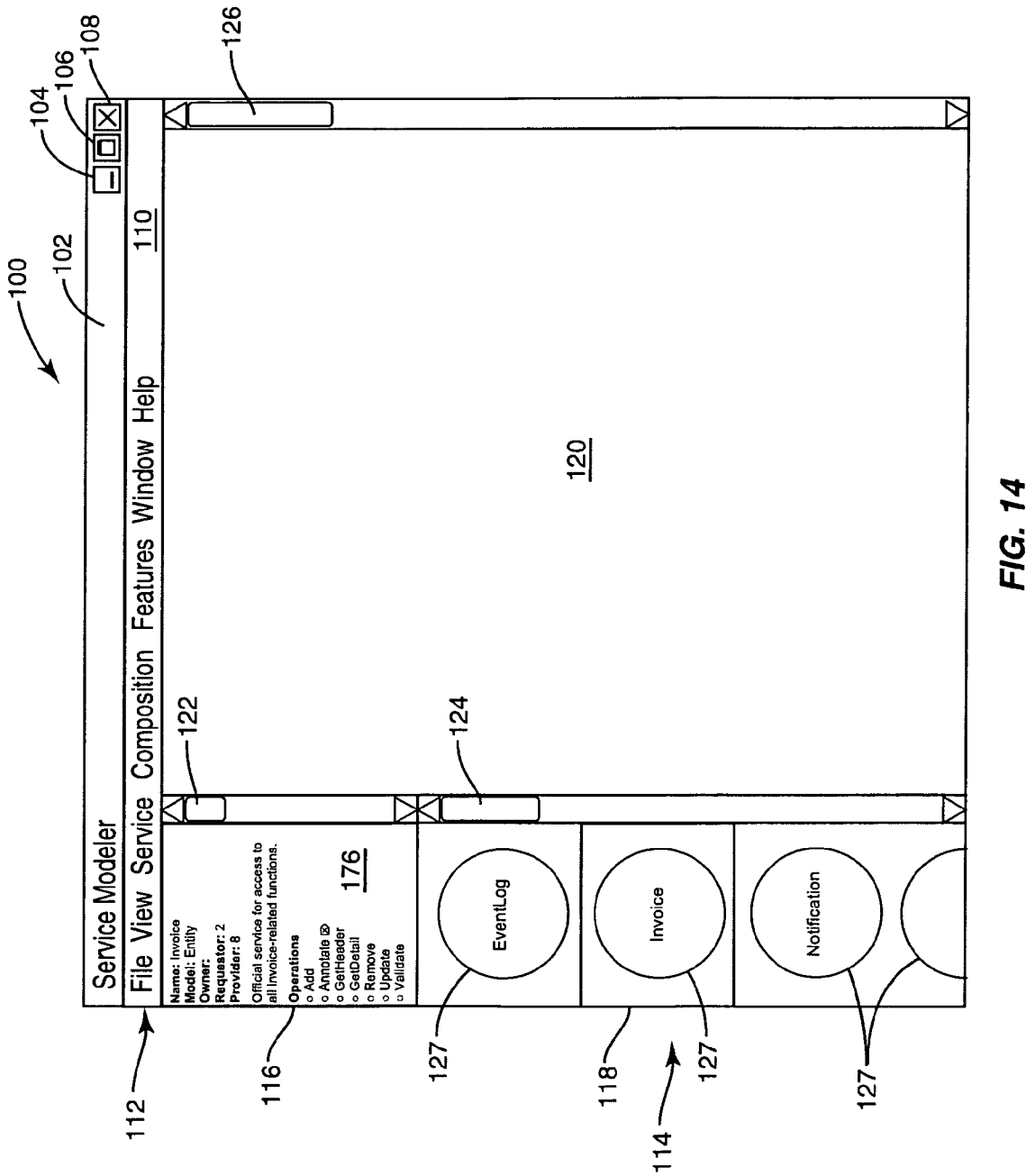
FIG. 14 is an exemplary user-interface illustrating multiple service candidates contained in the inventory sidebar as being stored in a service candidate inventory in a SOA service model according to one embodiment of the SOA modeling tool.

The user 70 can choose to edit an existing service candidate in the service candidate inventory stored in the SOA service model database 54. For example, the user-interface 100 illustrated in FIG. 14 illustrates the service candidate inventory 114 in the inventory sidebar 118. The user 70 can choose to edit a service candidate in the service candidate inventory by clicking and highlighting the desired service candidate 128. The inventory sidebar 118 provides a convenient representation and method to select a service candidate for editing. Alternatively, the user 70 could choose to select a service candidate for editing by choosing the "Service/Edit" feature from the menu bar 110. Other methods may be provided by the modeling tool 50 via the user-interface 100. In response, the SOA modeling tool 50 may perform an edit service candidate process, such as exemplified by the process illustrated in FIG. 15, to allow the user 70 to edit an existing service candidate in the service candidate inventory 114.

Figure 15:
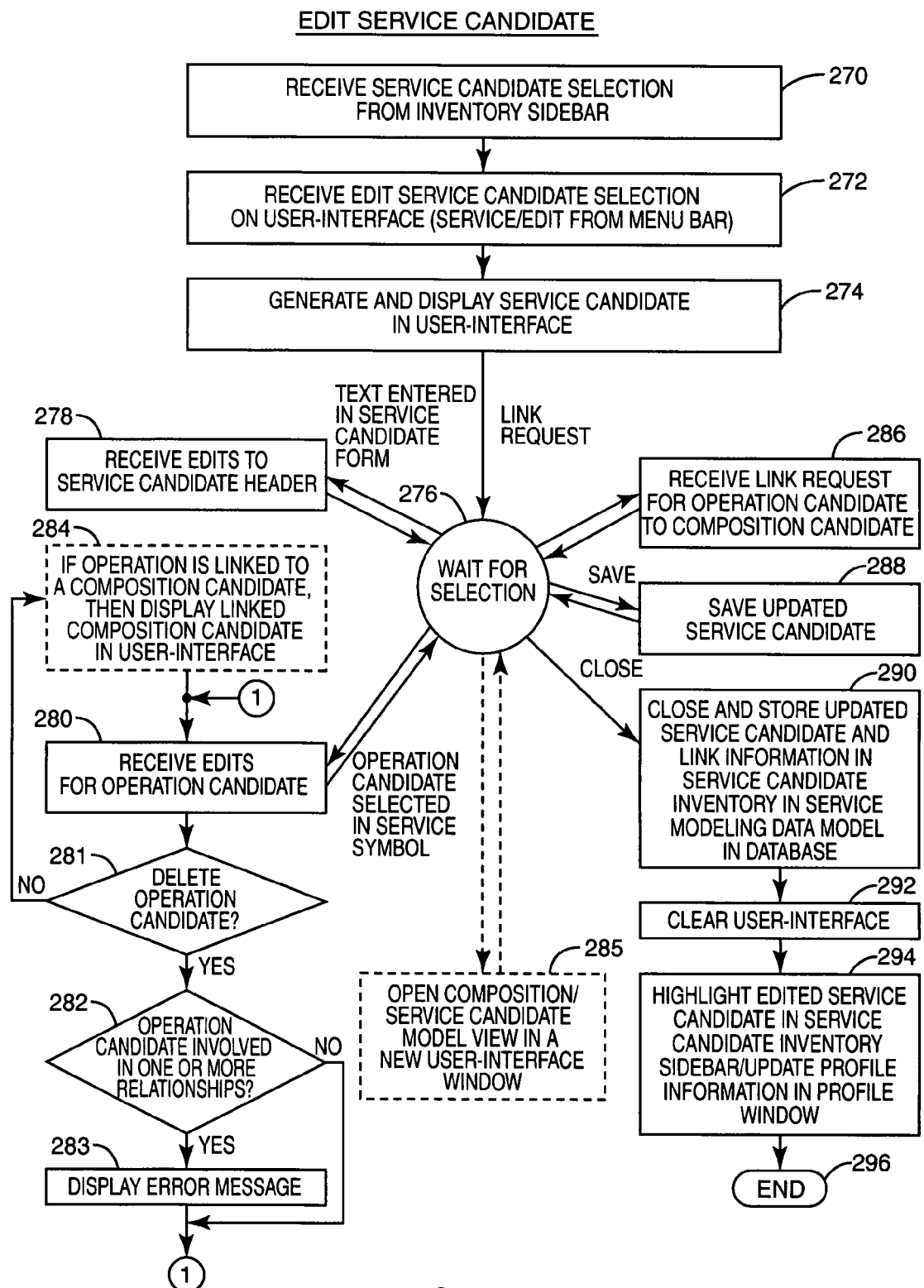
FIG. 15 illustrates an edit service candidate process that may be performed by the SOA modeling tool according to one embodiment of the invention.
Figure 16:
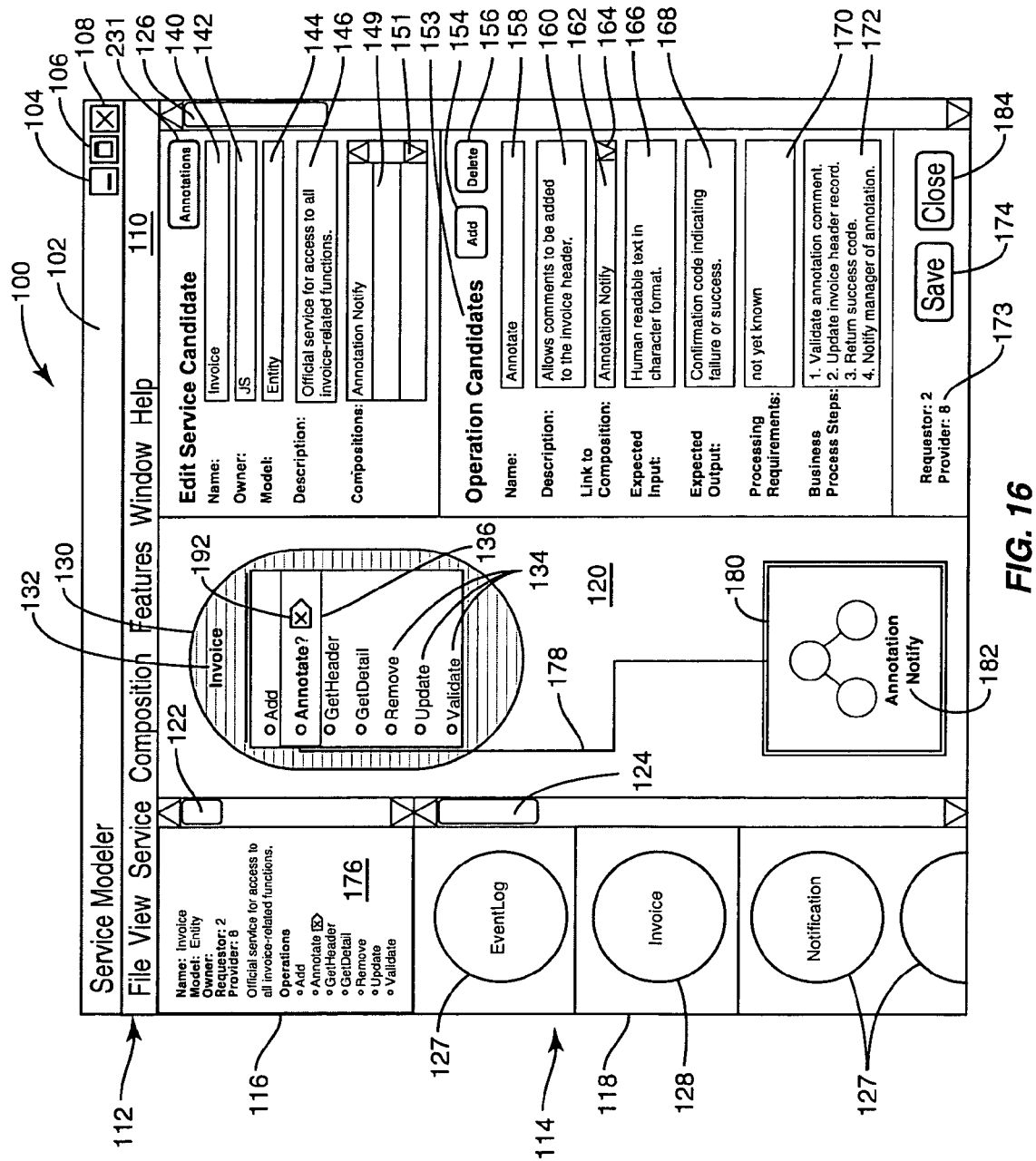
FIG. 16 is an exemplary user-interface illustrating an edit service candidate form according to one embodiment of the edit service candidate process.

FIG. 15 illustrates an exemplary edit service candidate process 204 (see FIG. 9) that includes some of the possible functions that may be performed, via the modeling tool 50, by the service candidate manager 52 (see FIG. 4) to edit an existing service candidate in the service candidate inventory in the SOA service model database 54. As illustrated in FIG. 15, the modeling tool 50 receives a selection to edit a service candidate, such as from the inventory sidebar 118 (step 270), or the menu bar 110, for example (step 272). In response, the modeling tool 50 generates and displays an "Edit Service Candidate" area 153 in the main workspace 120 on the user-interface 100, as illustrated in the exemplary user-interface 100 in FIG. 16. The existing service candidate profile record information for the service candidate to be edited is displayed in the user-interface 100. The modeling tool 50 then waits for a selection on the user-interface 100 from the user 70 (FIG. 15, step 276). The user 70 can choose to edit service candidate header information for the service candidate profile record in the "Edit Service Candidate" area 138. In response, the modeling tool 50 receives and enters the edited service candidate header information in the service candidate profile record (FIG. 15, step 278). The user 70 can also choose to add or edit any previously provided ad hoc comments and/or file attachments linked to the service candidate by clicking the "Annotations' button 297, as illustrated in FIG. 16.

The user 70 can also edit operation candidates for the service candidate by editing the fields 158-172 in the "Operation Candidates" area 153 (FIG. 10, step 242), as illustrated in the exemplary user-interface 100 in FIG. 12. The user 70 can add or delete operation candidates to the new service candidate by clicking the "Add" or "Delete" buttons 154, 156 in the "Operation Candidates" area 153. Or, the user 70 can edit a previously added operation candidate by selecting the operation candidate 134 to be edited in the service candidate symbol 130. In response, the modeling tool 50 receives and processes the edits for the operation candidates to the service candidate profile record (FIG. 15, step 280). As operation candidates are edited for the service candidate, changes appear within the service candidate symbol 130 in the main workspace 120 to provide the user 70 a visual representation of the current operation candidates 134 for the service candidate. The service candidate symbol 130 is automatically expanded or de-expanded by the modeling tool 50 as operation candidates 134 are added or deleted for the service candidate. The modeling tool 50 updates the service candidate profile record in the SOA service model database 54 in response to any edits.

Figure 17:
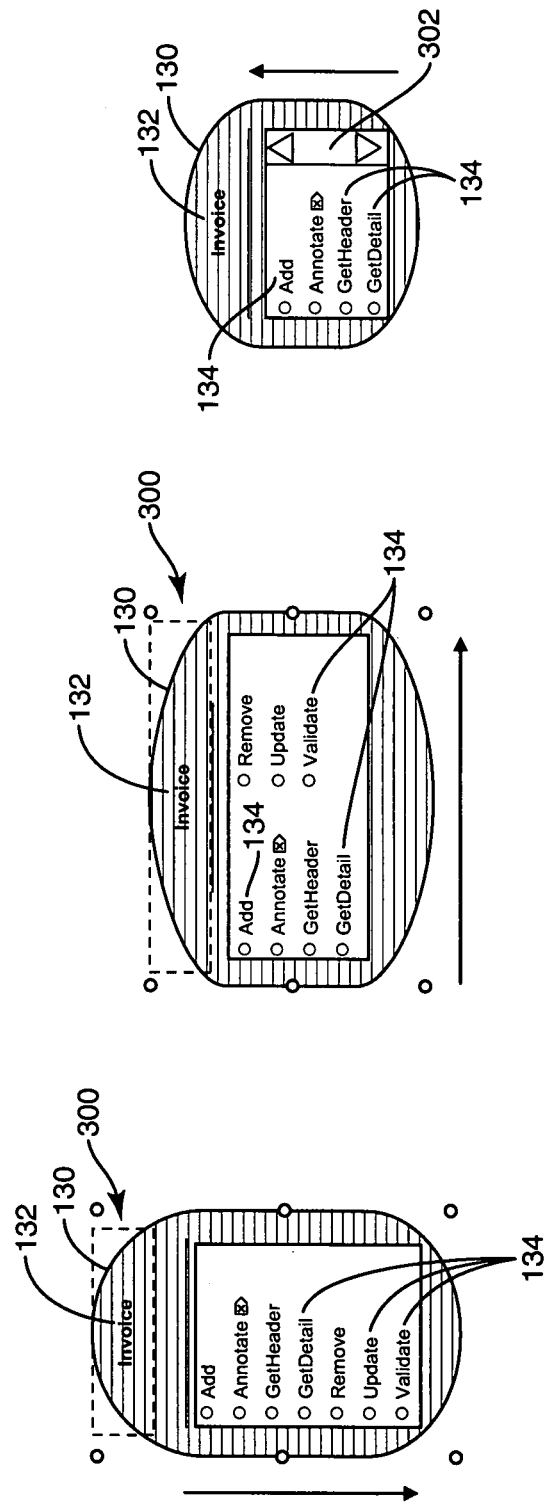
FIG. 17 illustrates alternative views of a service candidate symbol illustrating a service candidate and its operation candidates according to one embodiment of the SOA modeling tool.

FIG. 17 illustrates exemplary view configurations of the service candidate symbol 130 for viewing operation candidates 134 in a service candidate, such as would be performed by a user 70 when editing an existing service candidate. The service candidate symbol 130 can be vertically expanded via expansion links 300. If the service candidate symbol 130 is expanded horizontally, additional column(s) for operation candidates 134 are included. Alternatively, if there are a larger number of operation candidates 134 that can be displayed in the service candidate symbol 130 for the size and orientation selected, a scroll bar 302 may be included in the service candidate symbol 130 by the modeling tool to allow the user 70 to scroll and review all the operation candidates 134 for a given service candidate.

If a selected operation candidate in the service candidate is to be deleted (FIG. 15, decision 281), the modeling tool 50 determines if the operation candidate to be deleted is involved in one or more relationships with other service candidates (FIG. 15, decision 282). If so, an error message is displayed on the user-interface 100 (FIG. 15, step 283), because an operation candidate cannot be deleted if it is linked to another service candidate as either a provider or requestor. The relationship must first be removed according to the SOA service modeler rules.

The user 70 can add or edit a controller link between an operation candidate and a composition candidate. In the case of adding a controller link between an operation candidate and a composition candidate, the user 70 selects the operation candidate 134 to be edited. The user 70 then provides the request, via the "Encapsulate Composition" or "Link to Composition" drop-down box 162 illustrated in the exemplary user-interface 100 in FIG. 16, to select the composition candidate to link to the operation candidate. Alternatively, the user 70 can remove or edit an existing link to the operation candidate, thereby removing or changing the controller status. In response, the SOA modeling tool 50 adds or edits the controller link for the operation candidate to the composition candidate in the service candidate profile record (FIG. 15, step 286).

Any updates to the main workspace 120 to show or remove a linked composition candidate 180 are also made by the modeling tool 50 on the user-interface 100 and in the service candidate profile record (FIG. 15, step 286). The modeling tool 50 also updates whether the operation candidate is linked to a composition candidate by placing or removing the "Expand" symbol (⊠) beside the operation candidate 134. The user 70 can also double-click the composition candidate symbol 180, if desired, to open a corresponding composition candidate model view (illustrated in FIGS. 29-32) in a user-interface window 100 (FIG. 15, step 285).

At any time, the user 70 can save the current selections for the edited service candidate header information and the operation candidates and any links to a composition candidate by selecting the "Save" button 174. If the user 70 attempts to navigate away from the "Edit Service Candidate" area 138 before edits are saved, the modeling tool 50 will prompt the user 70, via the user-interface 100, to save the edits to the service candidate profile record first before allowing the navigation. In response, the modeling tool 50 saves any edits to the service candidate header information and operation candidates in the new service candidate profile record in the SOA service model database 54 (FIG. 15, step 288). However, the "Edit Service Candidate" area 138 is not closed. The profile window 116 displays the edited service candidate profile record information 176 edited thus far by the user 70, as illustrated in the exemplary user-interface 100 in FIG. 16. The user 70 can continue to make selections for the new service candidate until finished. The "Save" button 174 is provided to allow the user 70 to save changes for an edited service candidate profile record at any time as information is edited. The profile window 116 is updated with any changed service candidate profile information 176 after each save.

When the user 70 has completed editing information for the service candidate profile record, the user can choose the "Close" button 184. In response, the modeling tool 50 stores the edited service candidate profile record in the SOA service model database 54 in case the user 70 did not previously save the edited service candidate profile record via the "Save" button 174 (FIG. 15, step 290). The main workspace 120 is cleared (FIG. 15, step 292). As illustrated in the exemplary user-interface 100 in FIG. 18, the service candidate profile record information 176 for the edited service candidate is updated in the profile window 116 (FIG. 15, step 294). The service candidate 128 is visually highlighted and displayed in the service candidate inventory in the inventory sidebar 118 to indicate the service candidate just edited (FIG. 15, step 294).

Figure 18:
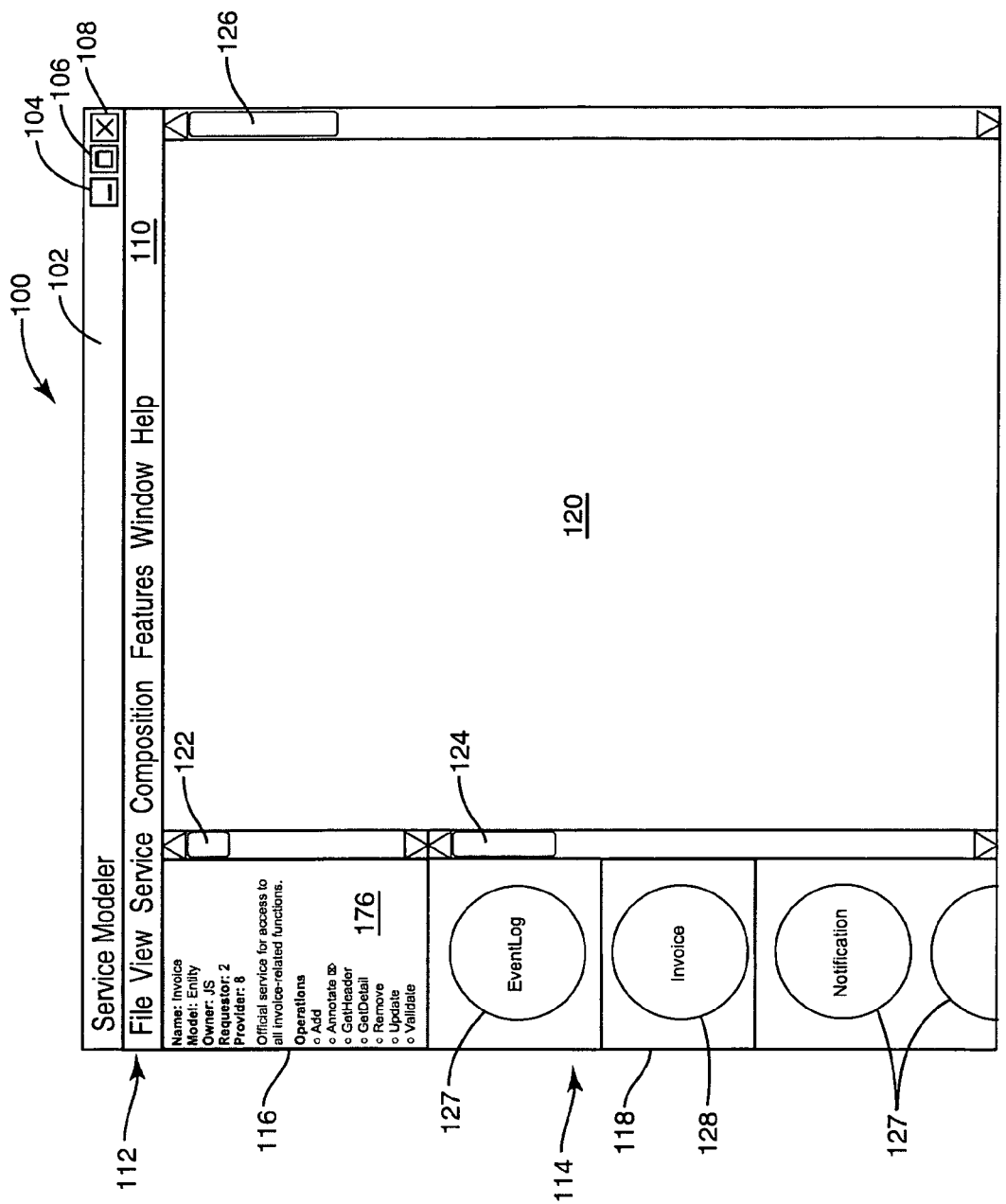
FIG. 18 is an exemplary user-interface illustrating a edited service candidate stored in the service candidate inventory after being edited according to one embodiment of the edit service candidate process.

The user 70 can also choose to delete an existing service candidate in the service candidate inventory stored in the SOA service model database 54. For example, the user-interface 100 shown in FIG. 18 illustrates the service candidate inventory 114 in the inventory sidebar 118. The user 70 can choose to delete a service candidate in the service candidate inventory by clicking and highlighting the desired service candidate 128. The inventory sidebar 118 provides a convenient representation and method to select a service candidate for deletion. Alternatively, the user 70 could choose to select a service candidate for deletion by choosing the "Service/Delete" feature from the menu bar 110. Other methods may be provided by the modeling tool 50 via the user-interface 100. In response, the SOA modeling tool 50 may perform the delete service candidate process 206, such as exemplified by the process illustrated in FIG. 19, to allow the user 70 to delete an existing service candidate in the service candidate inventory.

Figure 19:
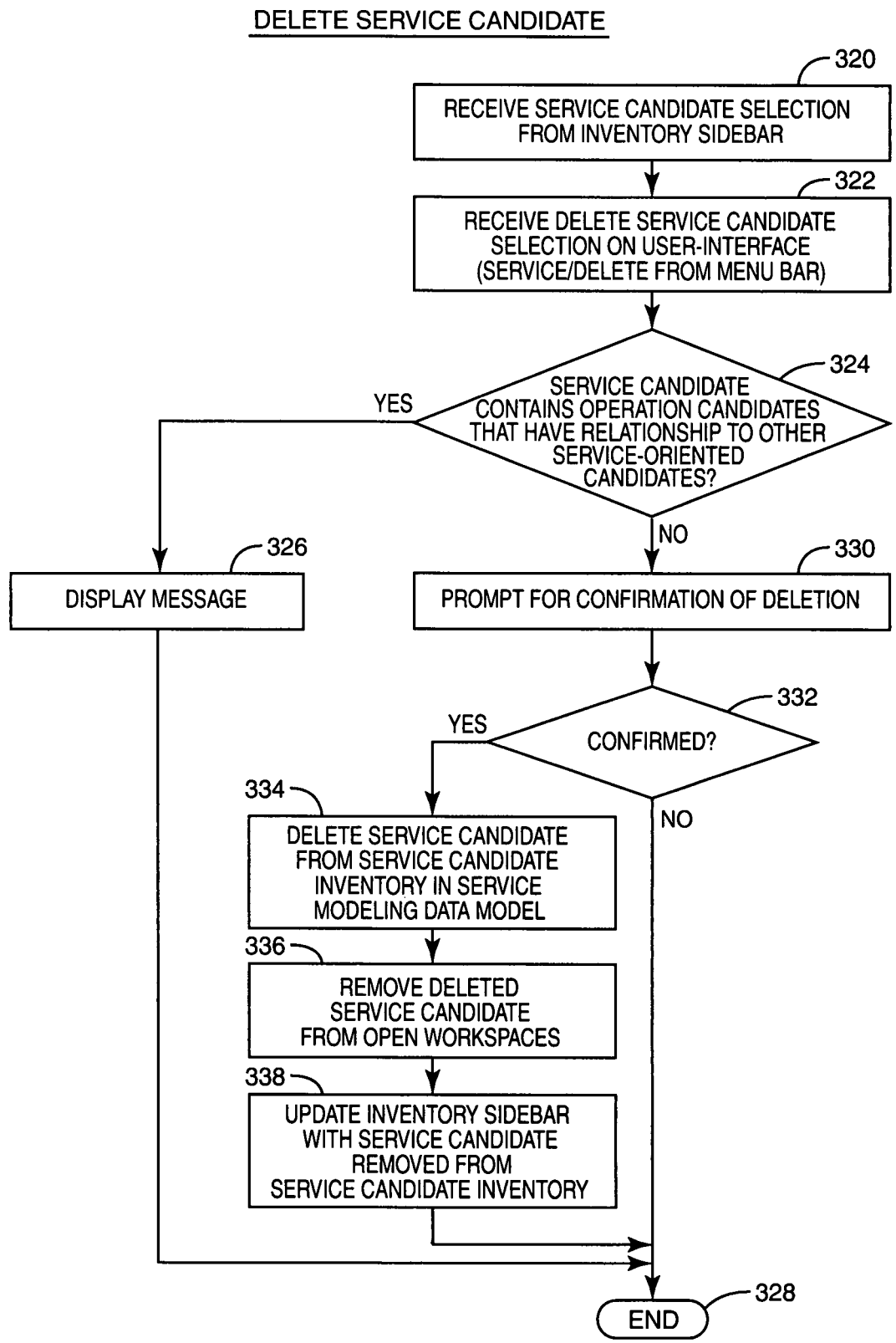
FIG. 19 illustrates a delete service candidate process that may be performed by the SOA modeling tool according to one embodiment of the invention.

FIG. 19 illustrates an exemplary delete service candidate process 206 (see FIG. 9) that includes some of the possible functions that may be performed, via the modeling tool 50, by the service candidate manager 52 (see FIG. 4) to delete a service candidate in a service candidate inventory stored in the SOA service model database 54. As illustrated in FIG. 19, the modeling tool 50 receives a selection to delete a service candidate, such as from the inventory sidebar 118 (step 320), or the menu bar 110 (step 322), for example. In response, the modeling tool 50 determines if any of the service candidate's operation candidates have relationships with other service-oriented candidates, such as service or composition candidates (decision 324). If so, the modeling tool 50 generates an error message to the user 70, via the user-interface 100, since SOA principles require that relationships between service and composition candidates be enforced to preserve the integrity of the SOA service model. An exemplary error message displayed may be: "Operation [X] of the service candidate [Y] has relationships within the following compositions(s) and cannot deleted." The service candidate cannot be deleted until the relationship(s) to the other service-oriented candidate(s) are first removed (edited). The service candidate manager 52 may call upon the service/composition relationship manager 62 (see FIG. 4) to provide this functionality and enforcement.

Figure 20:
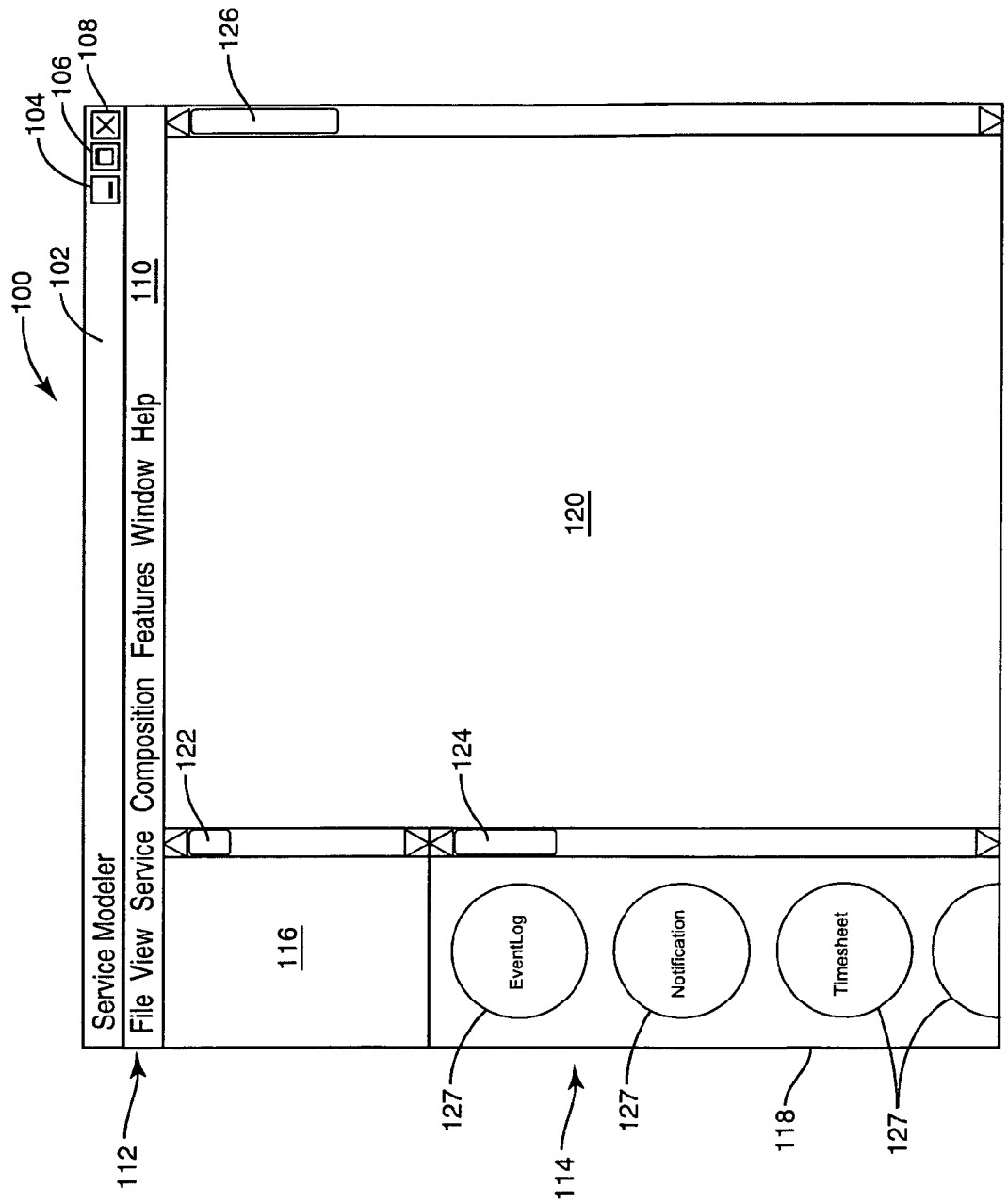
FIG. 20 is an exemplary user-interface illustrating the service candidate inventory with a service candidate having been deleted from the service candidate inventory according to one embodiment of the delete service candidate process.

If the service candidate to be deleted contains operation candidates that do not have relationships to other service-oriented candidates, the deletion will be allowed. The modeling tool 50 may prompt the user 70, via the user-interface 100, to confirm the deletion request (step 320). If confirmed (decision 322), the modeling tool 50 deletes the service candidate selected for deletion from the service candidate inventory in the SOA service model database 54 (step 334). The modeling tool 50 updates the inventory sidebar 118 to remove the deleted service candidate from the displayed service candidate inventory 114 (step 336). This is illustrated by example in the user-interface 100 in FIG. 20, where the "Invoice" service candidate previously appearing in the service candidate inventory 114 in the user-interface 100 of FIG. 18 no longer appears in the inventory sidebar 118. The modeling tool 50 also removes the deleted service candidate from any other opened user-interface windows 100 (step 338).

Figure 21:
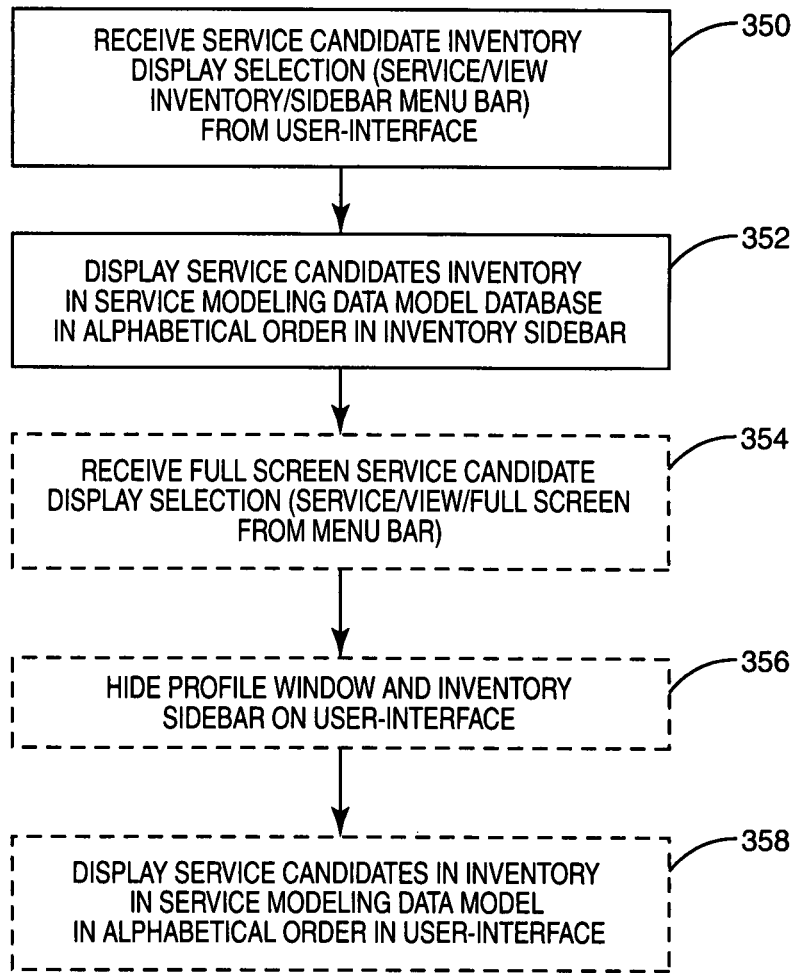
FIG. 21 illustrates a display service candidate inventory process that may be performed by the SOA modeling tool according to one embodiment of the invention.
Figure 22:
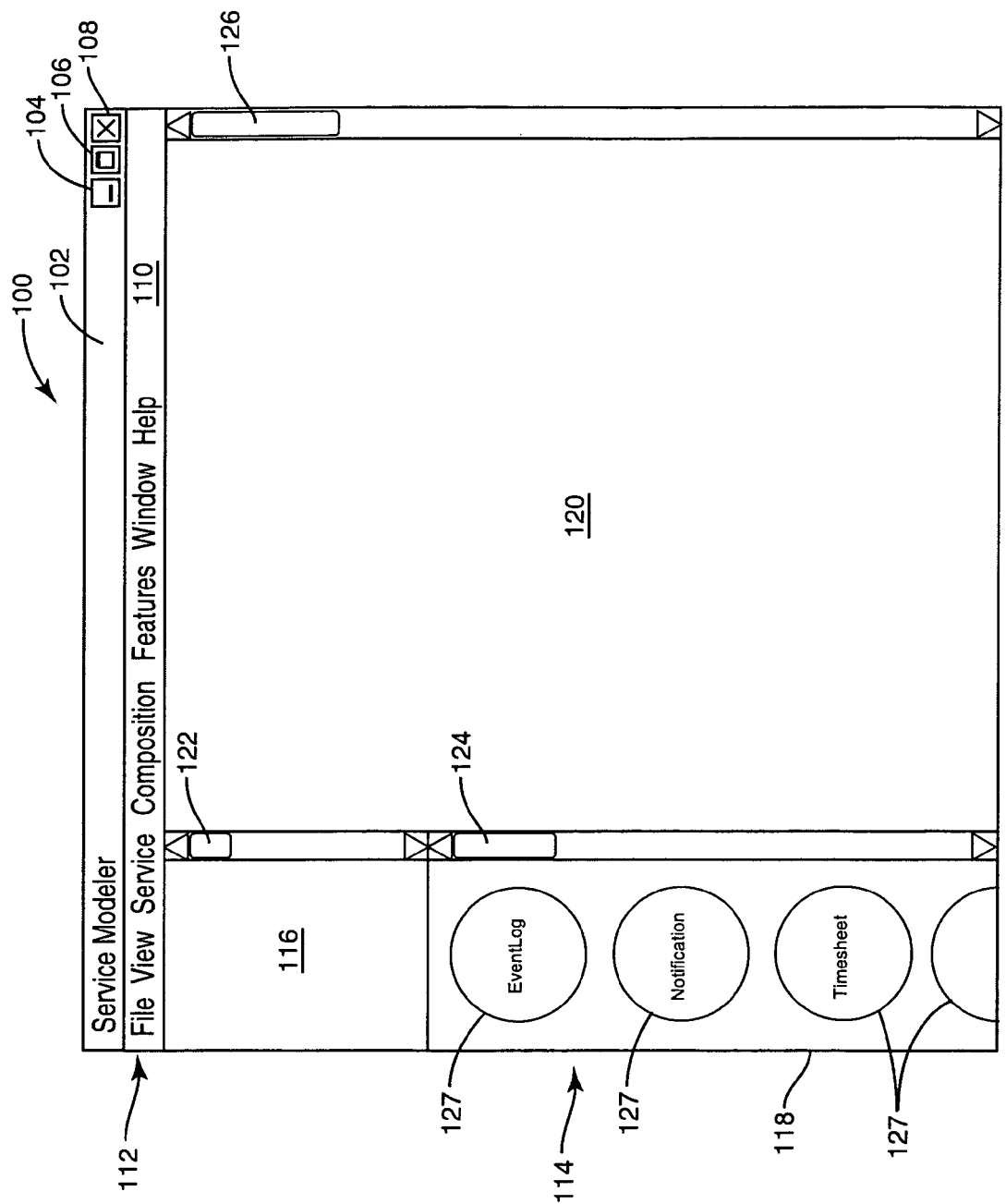
FIG. 22 is an exemplary user-interface illustrating the displayed service candidate inventory according to one embodiment of the display service candidate inventory process.
Figure 23:
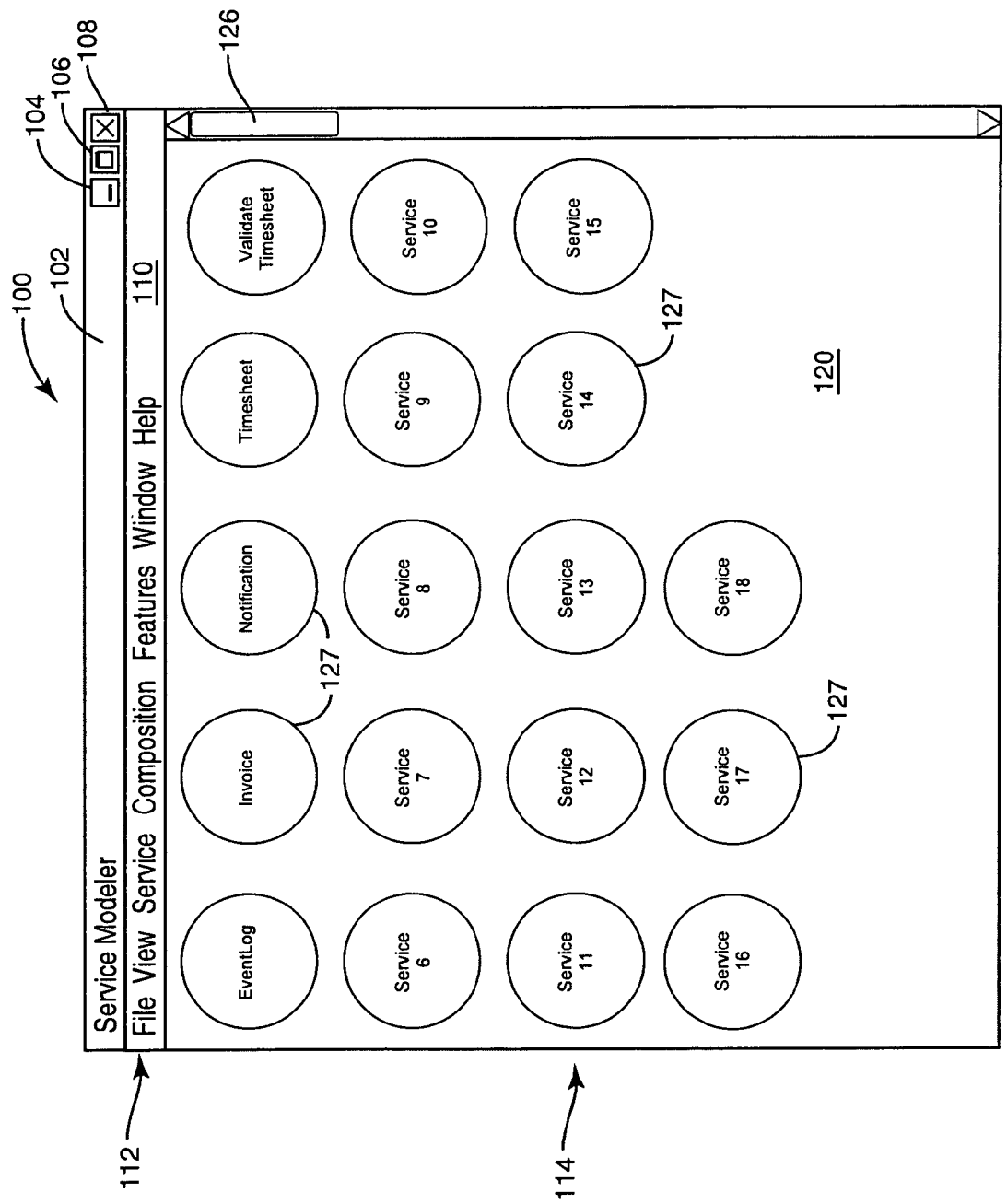
FIG. 23 is an exemplary user-interface illustrating the service candidate inventory displayed in full view according to one embodiment of the display service candidate inventory process.
Figure 24:
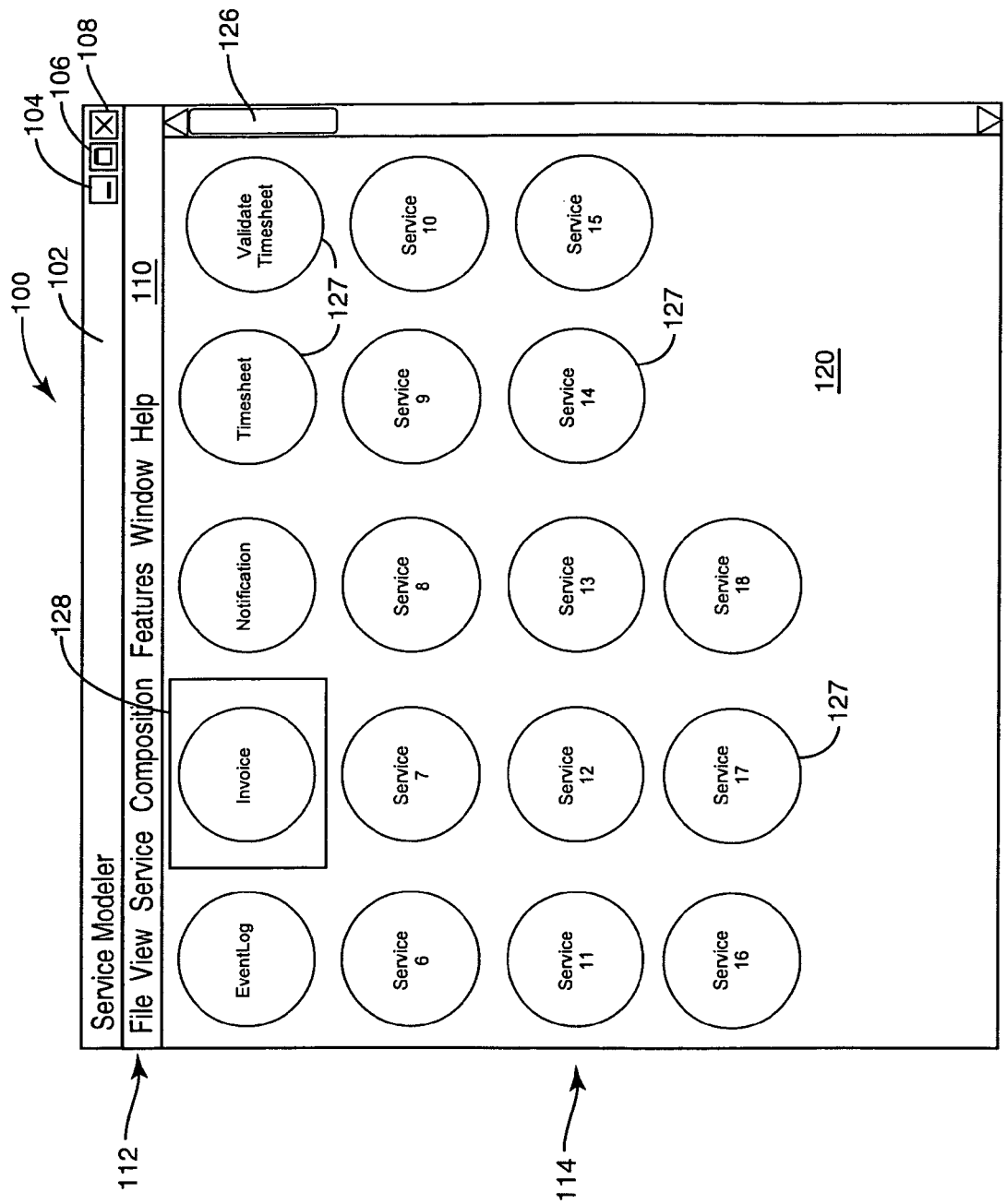
FIG. 24 is an exemplary user-interface illustrating a service candidate being selected among the service candidate inventory displayed in full view according to one embodiment of the SOA modeling tool.

The user 70 can also choose to display a service candidate inventory stored in the SOA service model database 54 to view and choose service candidates for editing and other functions associated with building a SOA service model and service candidate inventory. FIG. 21 illustrates an exemplary display service candidate inventory process 208 (see FIG. 9) that includes some of the possible functions that may be performed, via the modeling tool 50, by the service candidate inventory display manager 56 (see FIG. 4) to display service candidate inventories stored in the SOA service model database 54. FIGS. 22-24 illustrate exemplary display views of the service candidate inventory on the user-interface 100 when displaying a service candidate inventory. FIGS. 21-24 will be discussed with reference to each other.

As illustrated in FIG. 21, the modeling tool 50 receives a selection to display a service candidate inventory, such as from the inventory sidebar 118 (step 320), or by selection from menu bar 110, such as by a "Service/View/Inventory" menu item selection (step 350). In response, the SOA modeling tool 50 displays the service candidate inventory 114 in the inventory sidebar 118, as illustrated by example in the user-interface 100 in FIG. 22 (decision 352). The default display setting may be to display the service candidate inventory 114 in alphabetical order by service candidate name 132 in the inventory sidebar 118, as illustrated in FIG. 22. The user 70 is then free to select any service candidate among the service candidate inventory 114 to display, edit, or delete, as desired. The inventory sidebar 118 provides a convenient and easy to use method of displaying and viewing the service candidate inventory 114 and making selections in the same regard without affecting the main workspace 120.

If the user 70 desires to display more service candidates from the service candidate inventory than can be shown at any given time in the inventory sidebar 118, the modeling tool 50 may provide for the ability of the service candidate inventory 114 to be displayed in full screen view. In this regard, the user 70, via a selection made to the user-interface 100, would request the modeling tool 50 to display the service candidate inventory 114 in full screen or view (step 354). This selection may be made from a selection on the menu bar 110, such as a "Service/View/Full Screen" menu item selection (step 354). Alternatively, a pop-up menu (not shown) may provide this option when the user selects a non-occupied part of the inventory sidebar 118 with their selection device (e.g. mouse) and a selection of a full view menu item. Other methods may be provided to allow the user to select the full view display option for the service candidate inventory 114.

In response to a full view selection, the SOA modeling tool 50 hides the profile window 116 and inventory sidebar 118 on the user-interface 100 to provide for a larger main workspace 120 to display the service candidate inventory 114 (step 356). The modeling tool 50 then displays the service candidate inventory 114 in the main workspace 120, as illustrated in the user-interface 100 in FIG. 23. Again, the default is to display the service candidate inventory 114 in alphabetical order by service candidate name 132. As illustrated in FIG. 24, the user 70 can then select, such as by clicking on, the desired service candidate 128 from the displayed service candidate inventory 114 to perform the desired action, such as displaying, editing, and deleting the selected service candidate 128, for example.

Figure 25:
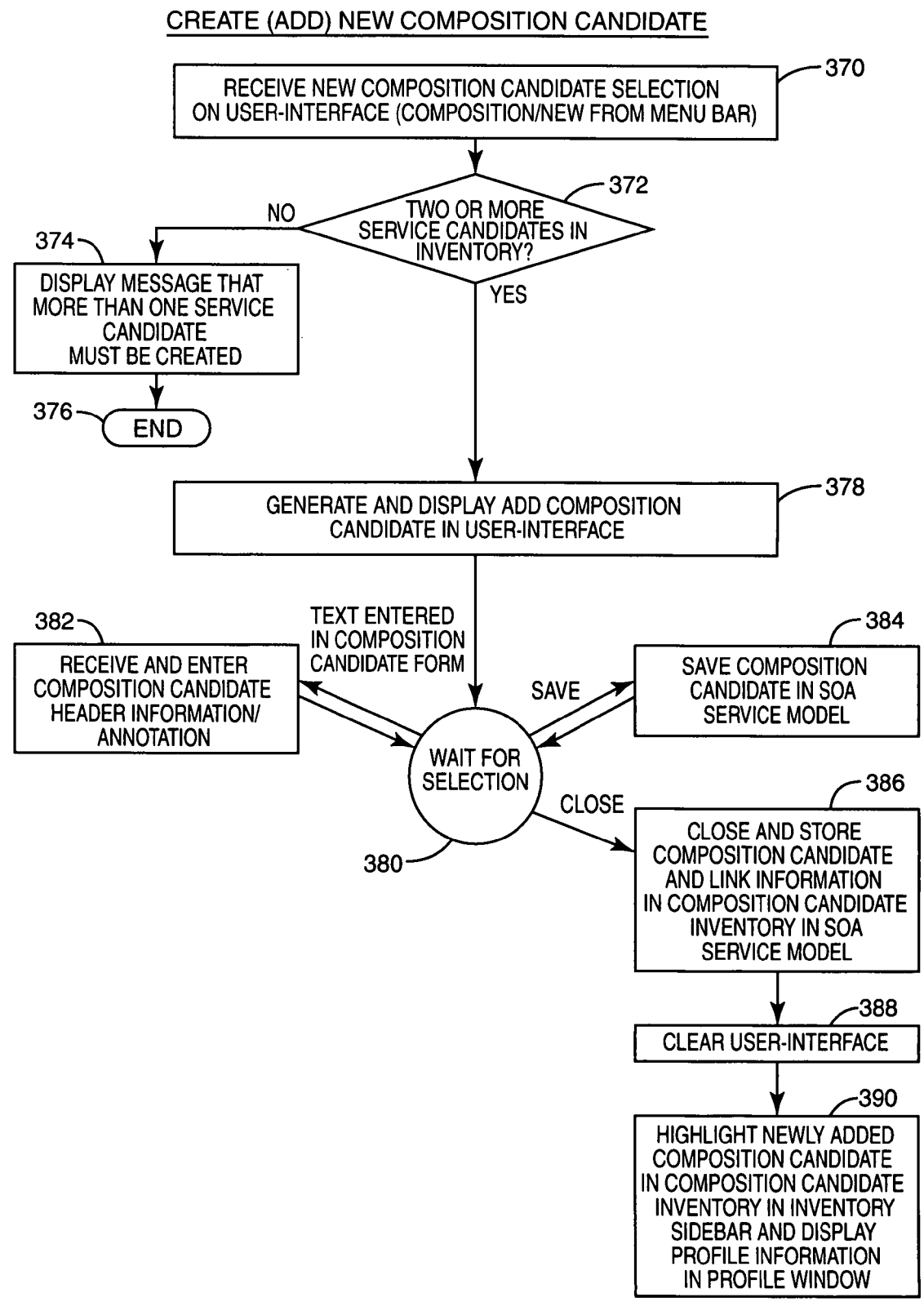
FIG. 25 illustrates an add composition candidate process that may be performed by the SOA modeling tool according to one embodiment of the invention.
Figure 26:
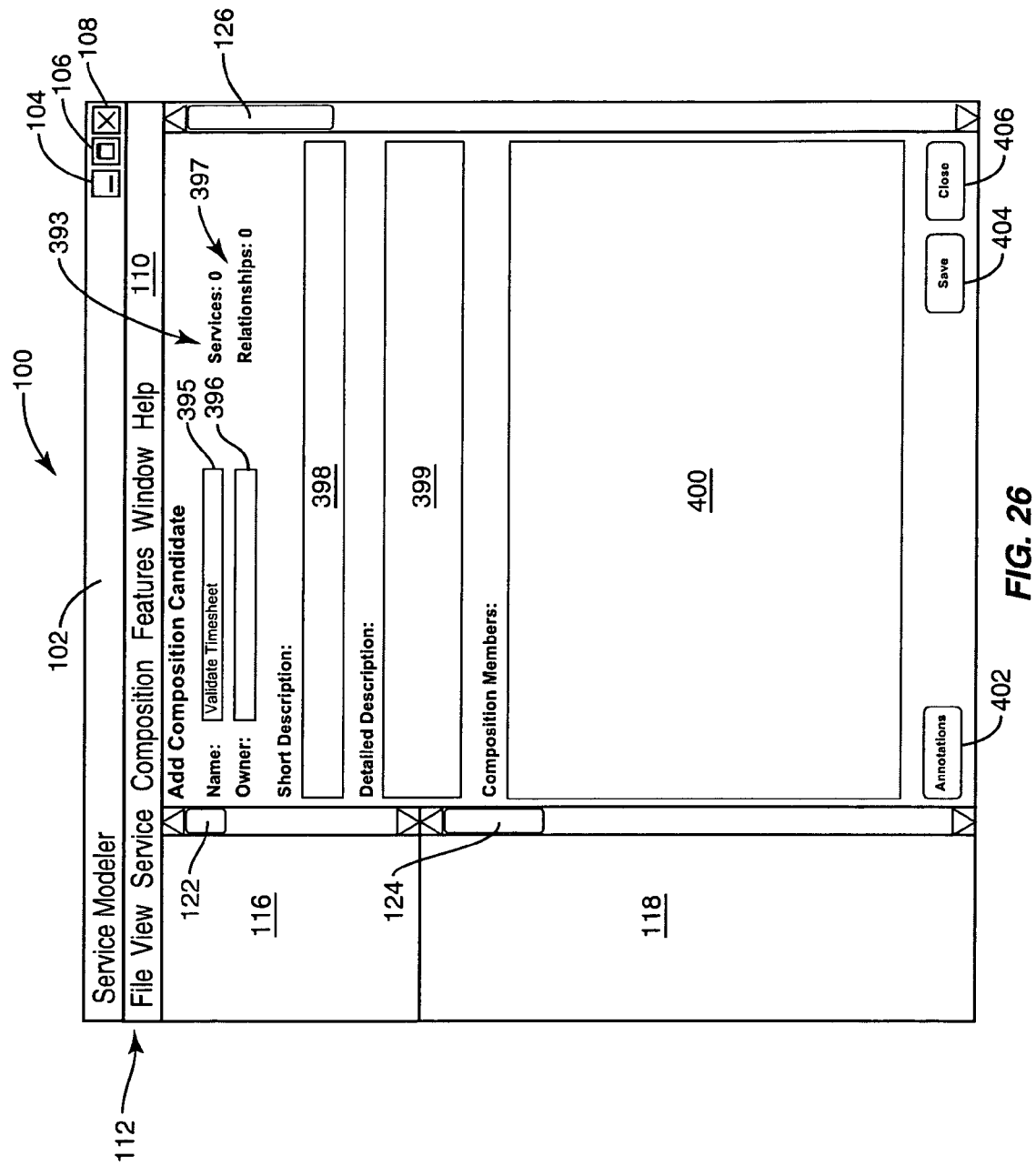
FIG. 26 is an exemplary user-interface illustrating the add composition candidate form according to one embodiment of the add composition candidate process.
Figure 27:
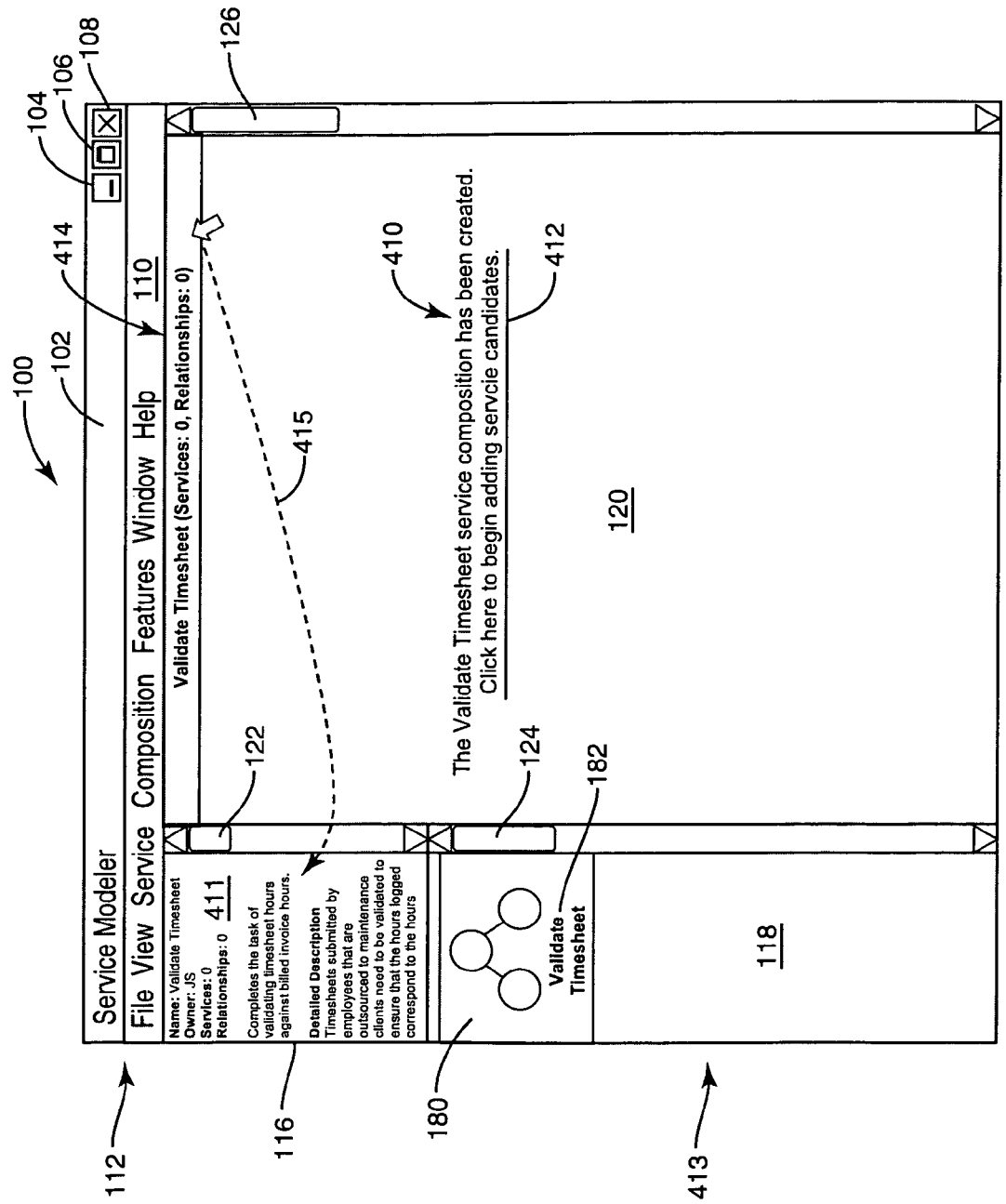
FIG. 27 is an exemplary user-interface illustrating the ability to add service candidates to a composition candidate according to one embodiment of the add composition candidate process.

FIG. 25 illustrates an exemplary create or add a new composition candidate process 210 (see FIG. 9) that includes some of the possible functions that may be performed, via the modeling tool 50, by the composition candidate manager 58 (see FIG. 4). Once two or more service candidates have been added, a new composition candidate can be added to a composition candidate inventory in the SOA service model database 54. FIGS. 26-27 illustrate exemplary views of the user-interface 100 when adding a new composition candidate. FIGS. 25-27 will be discussed with reference to each other.

As illustrated in FIG. 25, a new composition candidate is added to the SOA service model in response to the SOA modeling tool 50 receiving a new composition candidate selection from the user-interface 100 (step 370). The user 70 may select the "Composition/New" menu item from the menu bar 110 to add a new composition candidate. Alternatively, the user 70 could also place a selection device (e.g. mouse) pointer on a non-occupied part of the inventory sidebar 118 to select an "Add Composition" operation from a pop-up menu (not shown). Other methods may be provided, via the user-interface 100, to allow the user 70 to select to add a new composition candidate. In response to this selection, the modeling tool 50 determines if two or more service candidates exist in the service candidate inventory (decision 372). If not, a message is displayed that more than one service candidate must be created first (step 374), since a composition candidate is an aggregate of services, meaning two or more. The display message could be: "A service composition candidate can only be created if more than one service candidate exists in the service inventory." Note that the user 70 could request to add service candidates at this point and, the modeling tool 50 could generate a separate user-interface 100 in this regard.

Once two or more service candidates exist in the service candidate inventory, the SOA modeling tool 50 can generate a new composition candidate profile record and display an "Add Composition Candidate" area 393 (e.g. form) in the main workspace 120 to receive information for new composition candidate profile record. An example of an "Add Composition Candidate" area 393 is illustrated in the exemplary user-interface 100 illustrated in FIG. 26. The modeling tool 50 displays this area 393 to prepare for receiving composition candidate profile record information from the user 70 regarding the new composition candidate.

The modeling tool 50 then waits for a selection on the user-interface 100 from the user 70 (step 380). The user 70 can choose to enter composition candidate header information for the new composition candidate profile record in the "Add Composition Candidate" area 393 on the user-interface 100, as illustrated in the exemplary user-interface 100 in FIG. 26. FIG. 26 illustrates an exemplary new "Validate Timesheet" composition candidate being added. The composition candidate profile record information can include a composition candidate name in a composition candidate name field 395, an owner of the composition candidate in an owner field 396, a short description of the composition candidate in a short description field 398, and a detailed description of the composition candidate in the detailed description field 399.

Note that the contents of the short description field 398 are displayed in the composition profile window. This information identifies the added composition candidate. The user 70 can provide information in these fields that may also facilitate the SOA modeling tool 50 creating a composition component design and implementation as well (FIG. 25, step 382).

"Services" and "Relationships" counters 397 can also be displayed in the user-interface 100 to the user 70. Initially, these counters are both zero since relationships between operation candidates in the added service candidates have not been modeled for the composition candidate. A read-only composition members area 400 may be provided and updated by the modeling tool 50 with any service candidates added to the composition candidate. Initially, there will not be any service candidates in the composition members area 400 since no service candidates have been added. The user 70 can also choose to provide additional, ad hoc comments and/or file attachments to be linked to the new composition candidate by clicking the "Annotations" button 402. In response, the modeling tool 50 may display a dedicated word processing document for adding comments that is permanently linked to the composition candidate profile record.

At any time, the user 70 can save the current selections for the composition candidate header information added to the composition candidate by selecting the "Save" button 404. In response, the modeling tool 50 saves the composition candidate header information in the new composition candidate profile record in the SOA service model database 54 (FIG. 25, step 384). However, the "Add Composition Candidate" area 393 (e.g. form) is not closed. The profile window 116 displays a new composition candidate profile record information 411 added thus far by the user 70, as illustrated in the exemplary user-interface 100 in FIG. 27. The user 70 can continue to make selections for the new composition candidate until finished. The "Save" button 404 is provided to allow the user 70 to save changes for a new composition candidate profile record at any time as information is added. The profile window 116 is updated with any changed new service candidate profile information 411 after each save.

When the user 70 has completed providing information for the new composition candidate profile record, the user can choose a "Close" button 406. In response, the modeling tool 50 stores the new composition candidate profile record in the SOA service model database 54 in case the user 70 did not previously save the new composition candidate profile record via the "Save" button 404 (FIG. 25, step 386). The added composition candidate is included in the composition candidate inventory in the SOA service model database 54. The main workspace 120 is cleared (FIG. 25, step 388). As illustrated in the exemplary user-interface 100 in FIG. 27, the new composition candidate profile record information 411 is updated in the profile window 116 (FIG. 25, step 390). The new composition candidate is visually added to the composition candidate inventory 413 by being displayed in the inventory sidebar 118 with the new composition candidate 180 highlighted (FIG. 25, step 390). As illustrated in FIG. 27, the modeling tool 50 may display a message 410 in the main workspace 120 to confirm to the user 70 that the composition candidate 180 has been created. A link 412 may also be provided that the user 70 can select to allow the immediate adding of service candidates to the new composition candidate 180.

Figure 28:
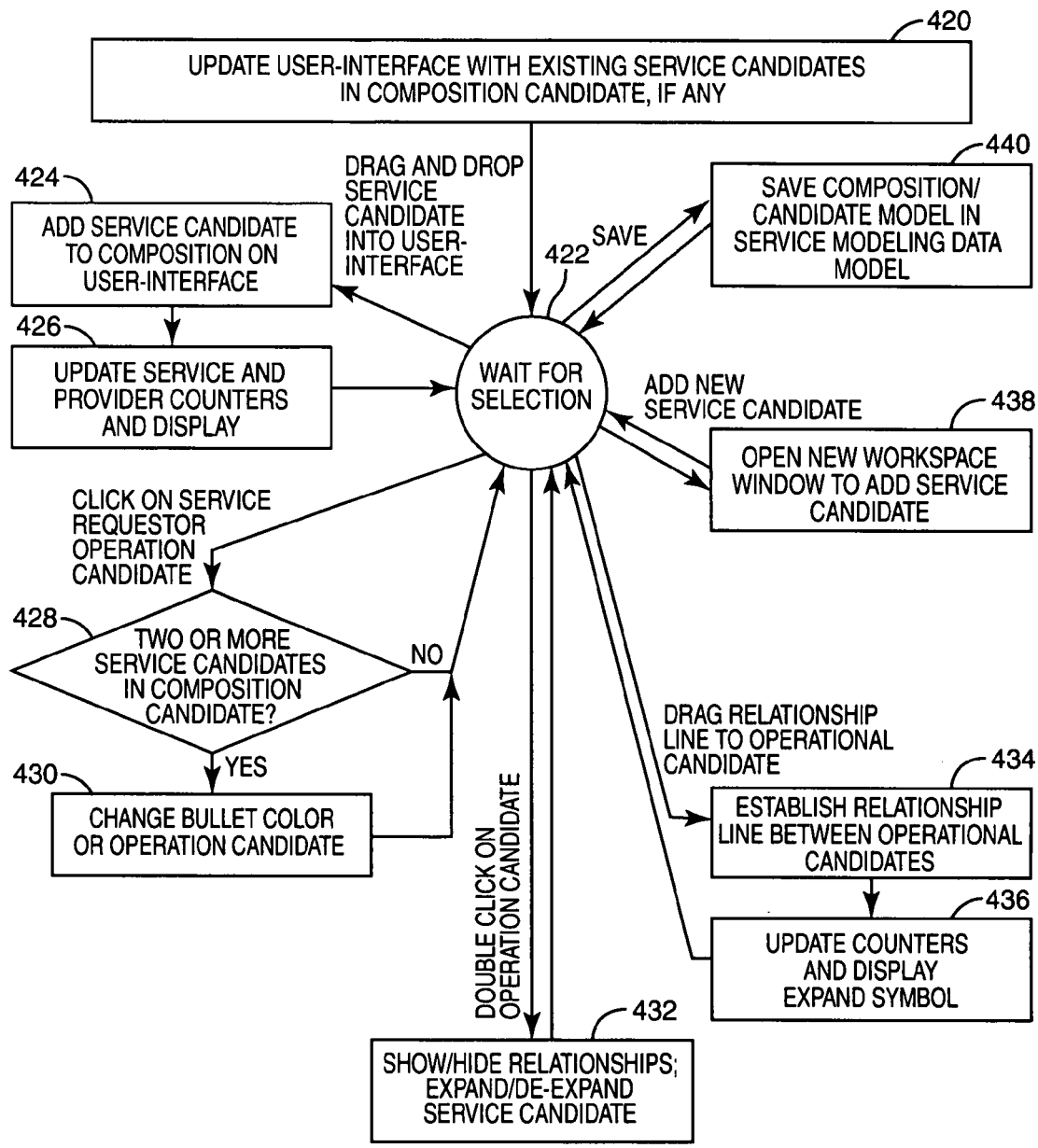
FIG. 28 illustrates a model composition candidate process that may be performed by the SOA modeling tool according to one embodiment of the invention.

Once the composition candidate profile record has been created, the composition candidate can be modeled in the SOA service model. Modeling the composition candidate includes adding two or more service candidates to the composition candidate and providing relationships between operation candidates within the added service candidates. FIG. 28 illustrates an exemplary model composition candidate process 212 (see FIG. 9) that includes some of the possible functions that may be performed, via the modeling tool 50, by the composition candidate manager 58 (see FIG. 4) to model a composition candidate. FIGS. 29-34 illustrate exemplary views of the user-interface 100 when modeling a composition candidate. FIGS. 28-34 will be discussed with reference to each other.

Figure 29:
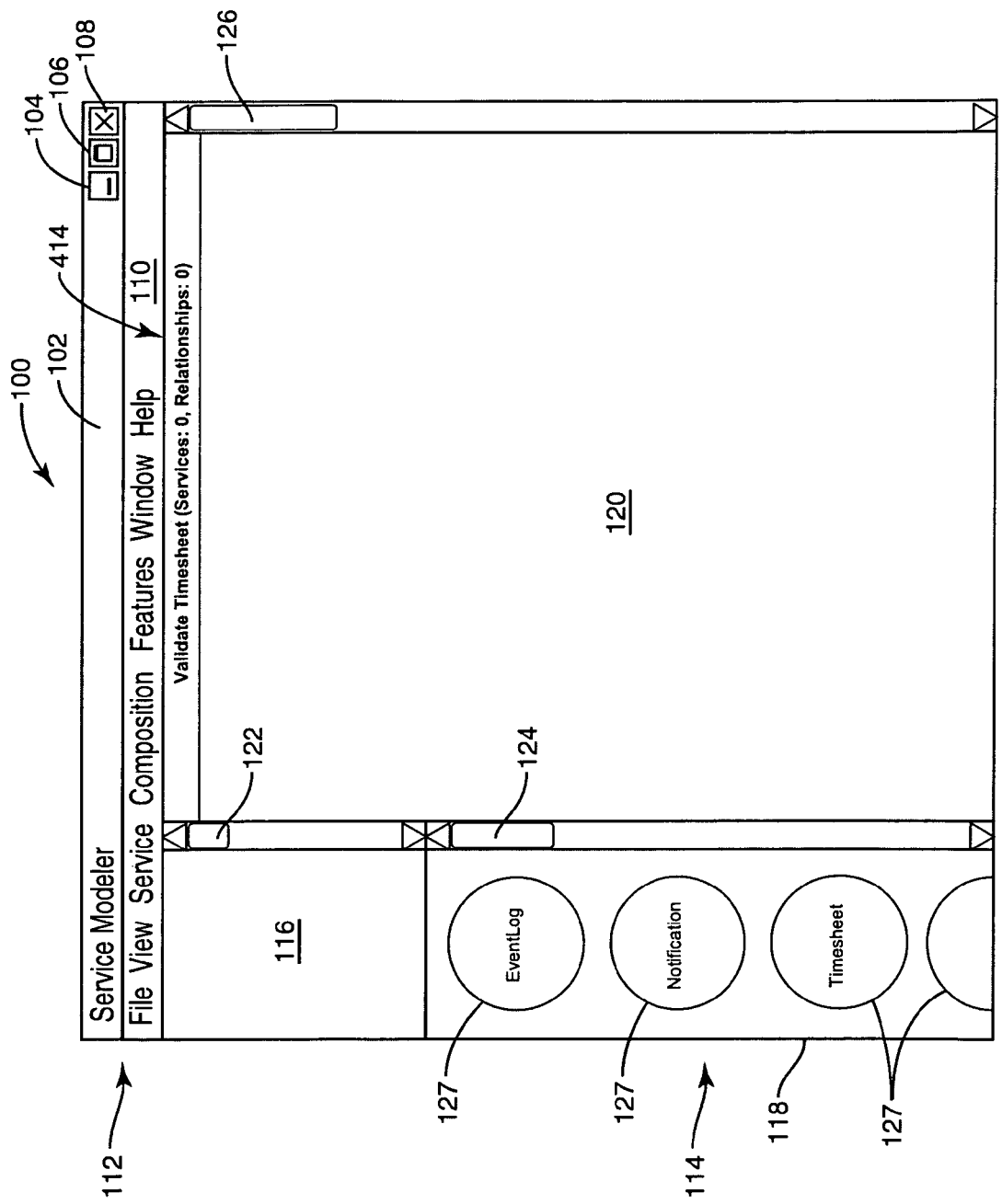
FIG. 29 is an exemplary user-interface illustrating a model composition candidate main workspace to begin adding service candidates to the composition candidate according to one embodiment of the model composition candidate process.

As illustrated in FIG. 28, the SOA modeling tool 50 updates the main workspace 120 to begin modeling with the service candidate inventory 114 in the inventory sidebar 118 to allow the user 70 to choose which service candidates will be added to the composition candidate (step 422). FIG. 29 illustrates an example of the user-interface 100 in this regard. The modeling tool 50 provides a composition candidate title bar to provide the name of the composition candidate being modeled and the "Services" and "Relationships" counters 414. Initially, these counters will be zero since no service candidates have yet been added to the composition candidate.

Figure 30:
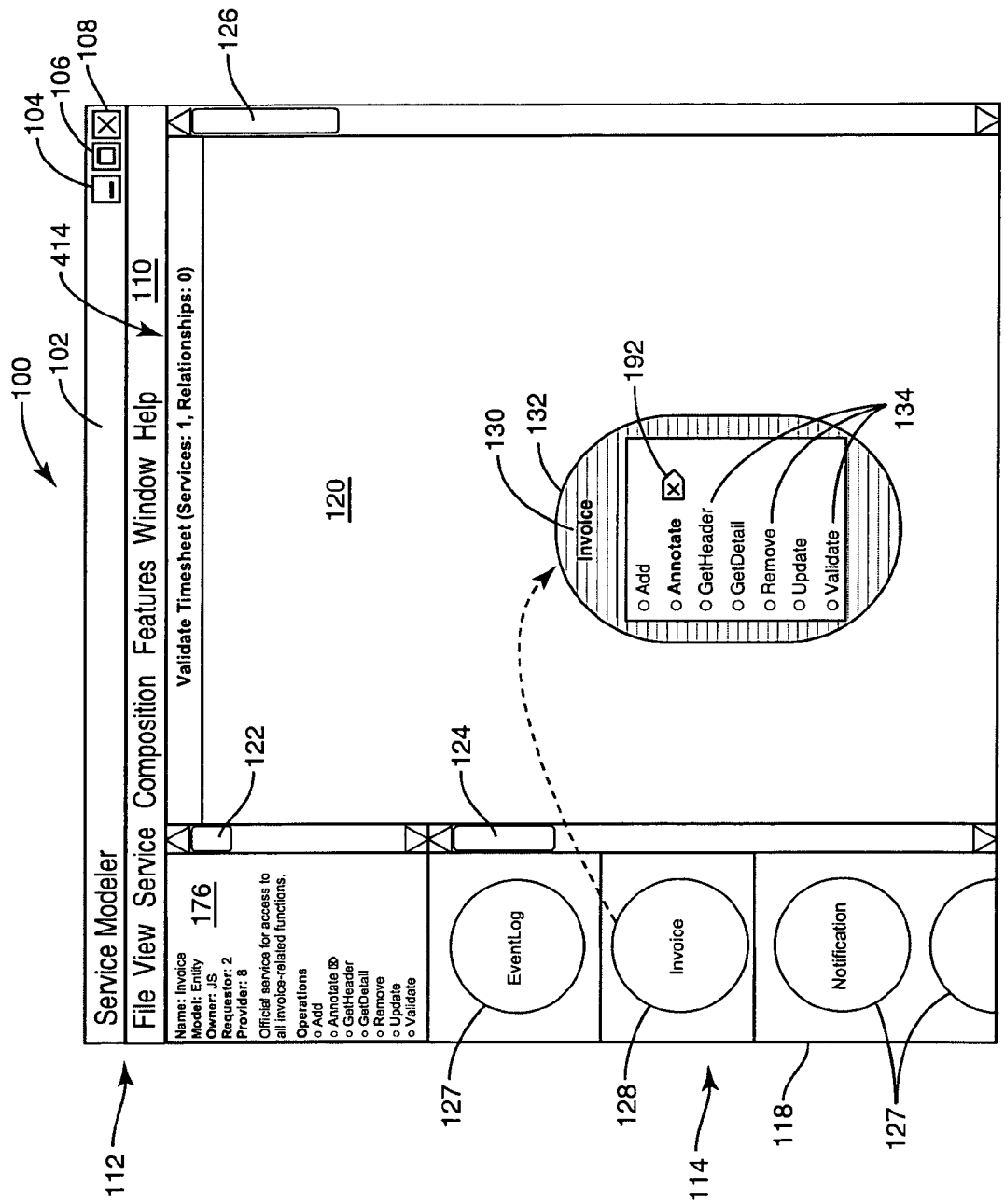
FIG. 30 is an exemplary user-interface illustrating the dragging and dropping of existing service candidates from the service candidate inventory to the composition main workspace to add the service candidate to the composition candidate according to one embodiment of the model composition candidate process.
Figure 31:
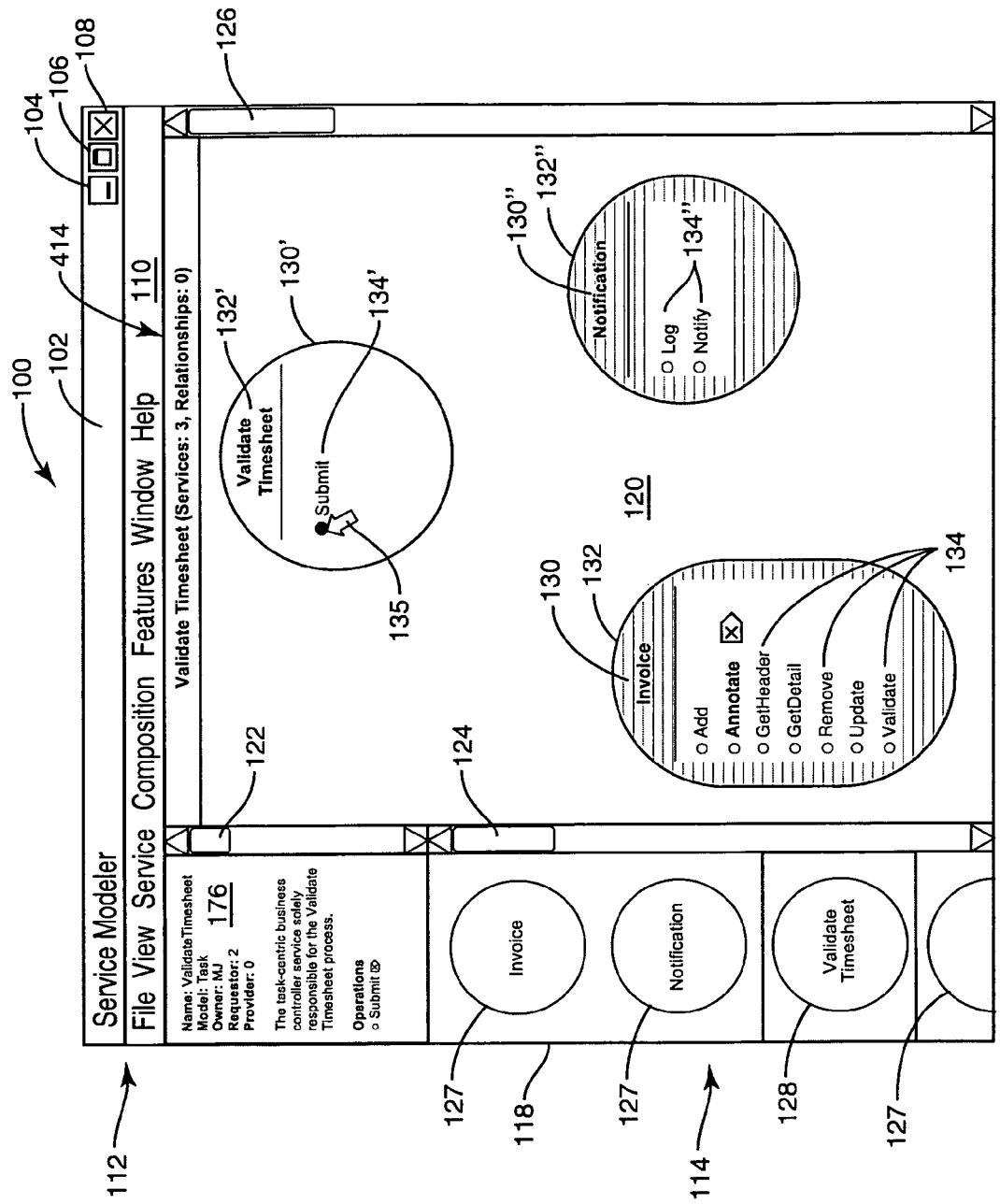
FIG. 31 is an exemplary user-interface illustrating multiple service candidates having been added to the composition candidate according to one embodiment of the model composition candidate process, wherein an operation candidate of a service candidate added to the composition candidate has been selected as a service candidate requestor within the composition candidate.

The modeling tool 50 then waits for a selection on the user-interface 100 from the user 70 (FIG. 28, step 424). The user 70 can choose to add service candidates from the service candidate inventory 114 to the composition candidate. In response, the modeling tool 50 adds the service candidate to the composition candidate and provides a visual representation of the added service candidate 130 in the main workspace 120 (FIG. 28, step 426). FIG. 30 illustrates a user-interface 100 example showing an added service candidate 130 to the composition candidate during modeling. One method to add service candidates is for the user 70 to select the desired service candidate to add from the service candidate inventory 114 in the inventory sidebar 118. The user 70 can then drag and drop the service candidate over to the adjacent main workspace 120 as illustrated in FIG. 30. In this manner, the user-interface 100 provides a convenient and easy to use method of adding service candidates to the composition candidate. After the service candidate is added, the modeling tool 50 will increment the "Services" counter and update the "Services" counter 414 as illustrated in example user-interface 100 of FIG. 30 (FIG. 28, step 428). FIG. 31 illustrates an exemplary user-interface 100 showing three service candidates added to the composition candidate. The "Services" counter is '3.'

Figure 32:
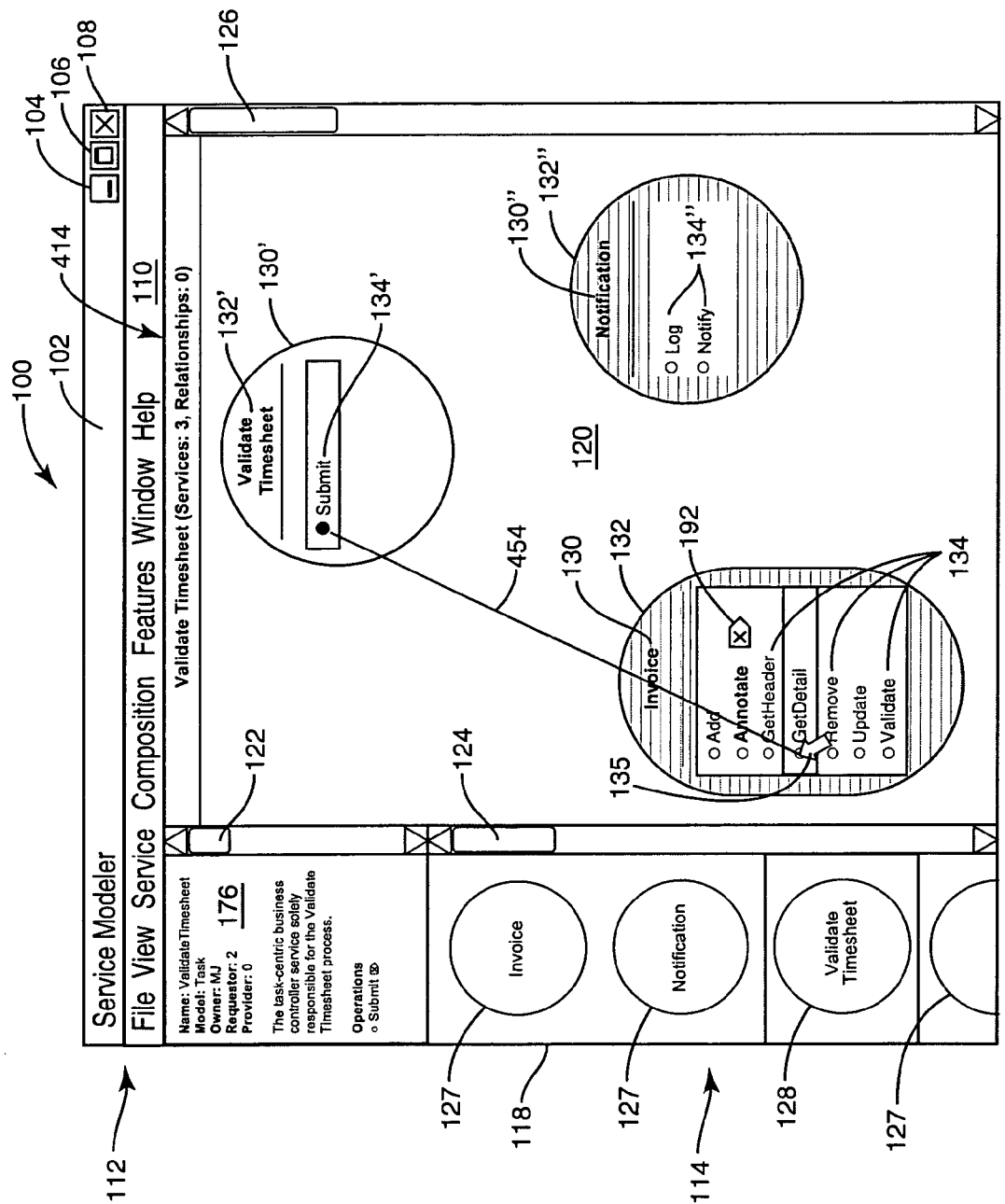
FIG. 32 is an exemplary user-interface illustrating establishing a relationship among operations in service candidates added to a composition candidate according to one embodiment of the model composition candidate process.
Figure 33:
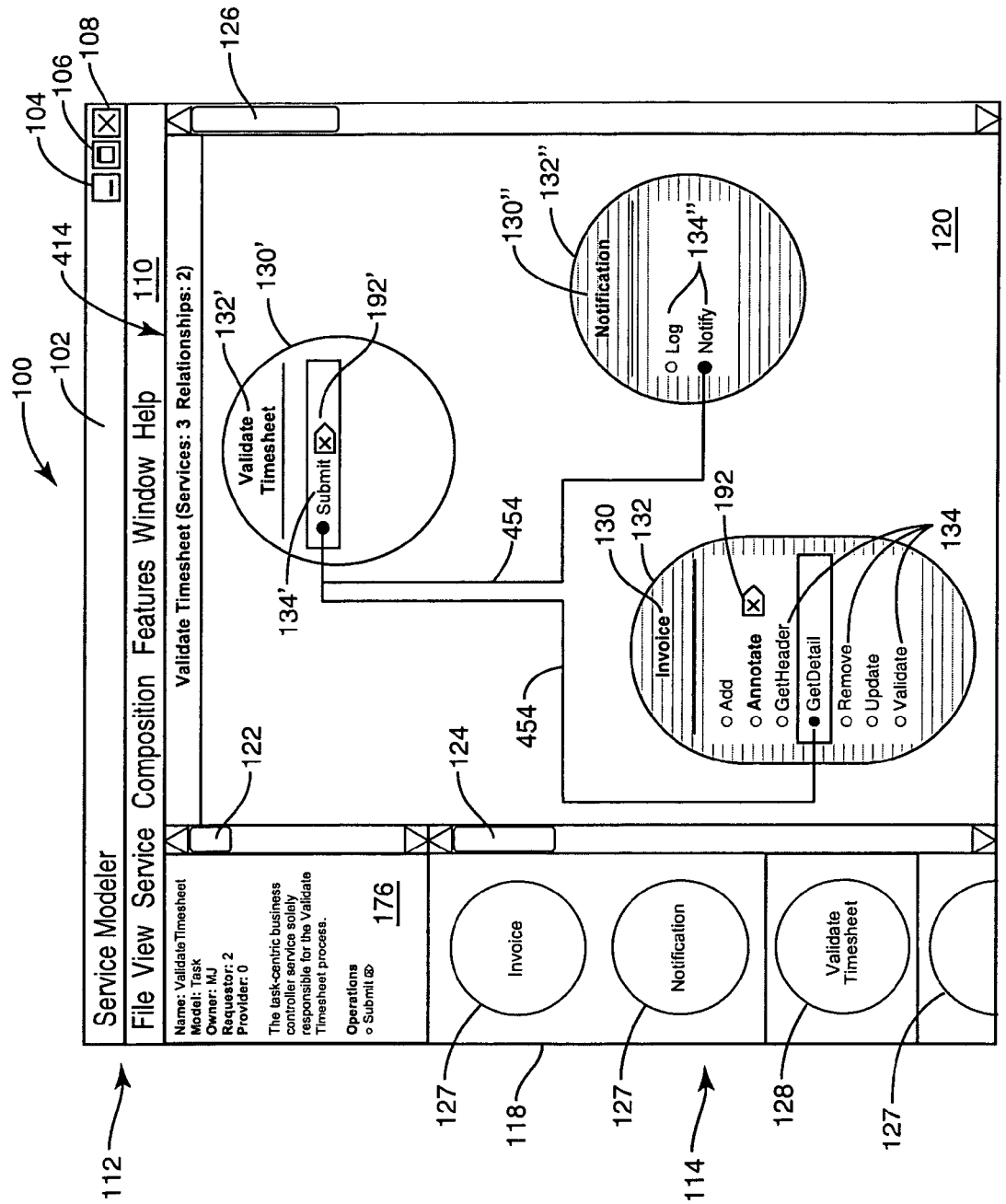
FIG. 33 is an exemplary user-interface illustrating established relationships among operation candidates in service candidates added to a composition candidate according to one embodiment of the model composition candidate process.

After two or more service candidates are added to the composition candidate, relationships can be established. The user 70 can first click on an operation candidate in an added service candidate to be a requestor operation candidate within the composition candidate. If there are two or more service candidates added to the composition candidate (FIG. 28, step 430), the modeling tool 50 can change the color of the operation candidate selected as the requestor to an orange color or to some other differentiating visual indicator to signify to the user 70 that the operation is now participating in a relationship. FIG. 32 provides a user-interface 100 example that shows the "Submit" operation candidate in the "Validate Timesheet" service candidate selected to be the requestor. The user then drags a relationship line 454 formed by the modeling tool 50 from the requestor to a different service candidate's operation candidate that is now considered the provider. In the example of FIG. 32, the relationship line 454 is dragged to the "GetDetail" operation candidate as a service provider. In response, a relationship is established between the two operation candidates (FIG. 28, step 438). The bullet of the provider operation candidate is also turned orange, or to some other visual indicator to signify the relationship, via the modeling tool 50. Both the requestor and provider operation candidate names are highlighted in yellow, as illustrated in FIG. 33. After the user 70 releases the selection device, the relationship line 454 may be automatically adjusted so that it consists of only horizontal and vertical lines that do not overlap with the service candidates symbols 130 in the main workspace 120. Each relationship to a service candidate as a provider or requestor increments the composition candidate's corresponding "Providers" and "Requestors" counters. The counters are then updated in the user-interface 100 (FIG. 28, step 436) (i.e. "Services" and "Relationships" counters 411, "Providers" and "Requestors" counters in the profile information 176 in profile window 116). The "Expand" symbol (⊠) is displayed beside the requestor candidate in its service candidate symbol 130 and in the corresponding operation candidate listed in the profile window 116 (FIG. 28, step 436). The user 70 can then proceed to add other relationships between added service candidates.

The modeling tool 50 also allows the user 70 to create new service candidates during modeling of a composition candidate. This function may be desired if the user 70 has decided that certain service candidates should be added to the service candidate inventory first, before continuing to model the composition candidate. In response, the modeling tool 50 will create a new user-interface 100 and workspace 120 for the user 70 to add new service candidates (FIG. 28, step 438). The discussion above under the "Add Service Candidate" section is applicable for the user 70 to add service candidates. The added service candidates will be updated in the service candidate inventory 114 in the composition candidate modeling user-interface 100 so that they can be added to the composition candidate, if desired.

At any time, the user 70 can save the current selections for the composition candidate, such as by selecting the "File/Save" menu item from the menu bar 110. In response, the modeling tool 50 saves the composition candidate in the SOA service model database 54 (FIG. 28, step 440). For example, the modeled relationships and the layout of the composition candidate is stored in the SOA service model database 54. The modeling tool may store the X, Y coordinates of the service candidate symbols 130 to store the layout of the composition candidate. If the user 70 attempts to navigate away from the current user-interface 100 before changes are saved, the modeling tool 50 may prompt the user 70, such as with a dialog box via the user-interface 100, to save the changes to the composition candidate before allowing the navigation. The main workspace scroll bar 126 allows for infinite expansion of the main workspace 120. The modeling tool also allows the scroll bar 126 to be selected by hovering the selection device over the scroll bar 126.

Figure 34:
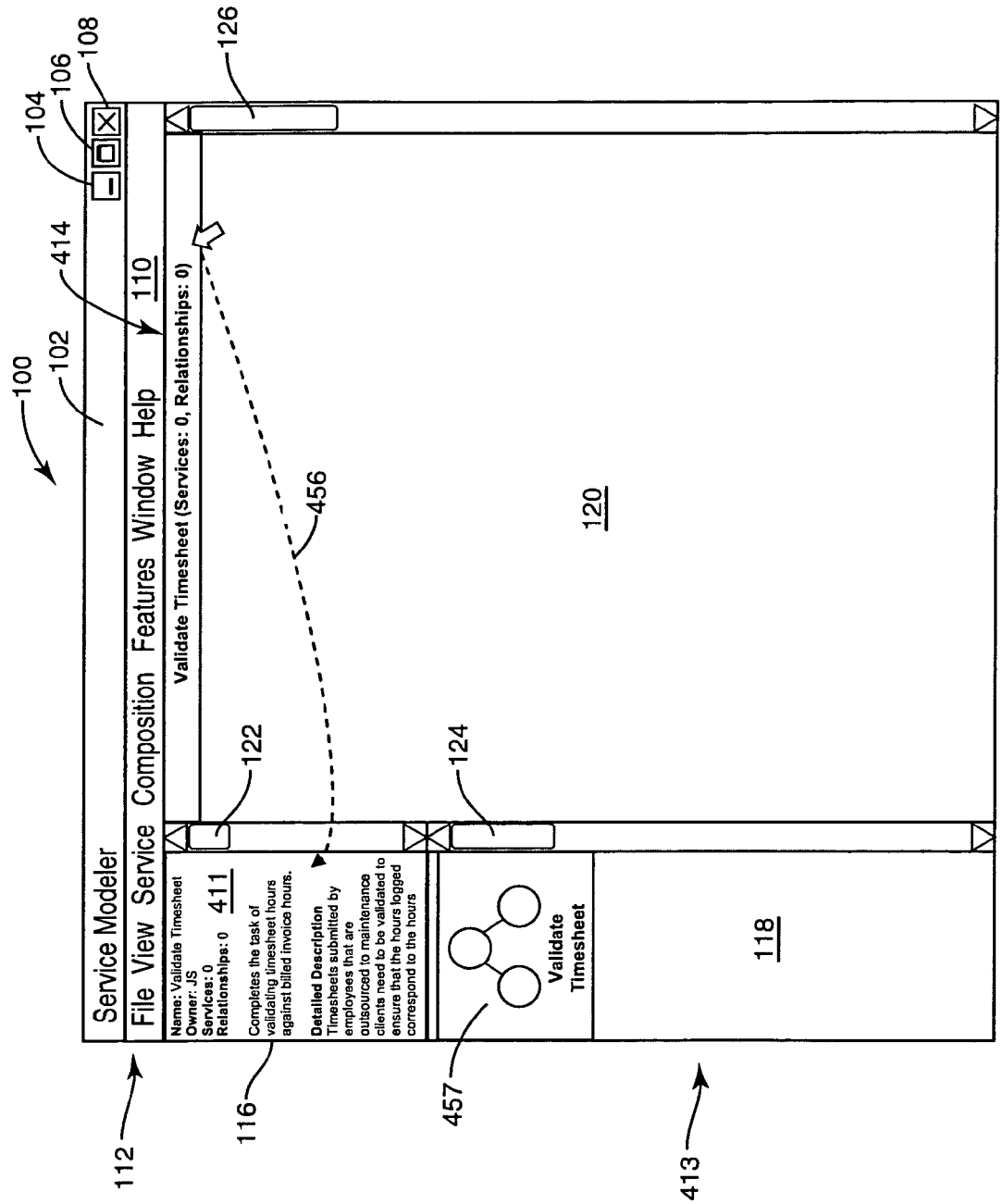
FIG. 34 is an exemplary user-interface illustrating a composition candidate profile in response to the user selecting a composition candidate title bar on the SOA modeling tool according to one embodiment of the invention.

The user 70 can also choose to edit an existing composition candidate in the composition candidate inventory stored in the SOA service model database 54. For example, the user-interface 100 shown in FIG. 34 illustrates the composition candidate inventory 413 in the inventory sidebar 118. The user 70 can choose to edit an existing composition candidate in the composition candidate inventory 413 by clicking and highlighting the desired composition candidate. The inventory sidebar 118 provides a convenient representation and method to select a composition candidate for editing. Alternatively, the user 70 could choose to select a composition candidate for editing by choosing the "Composition/Edit" feature from the menu bar 110. Other methods may be provided by the modeling tool 50 via the user-interface 100. In response, the SOA modeling tool 50 may perform an edit composition candidate process, such as exemplified by the process illustrated in FIG. 35, to allow the user 70 to edit an existing composition candidate in the composition candidate inventory 413.

Figure 35:
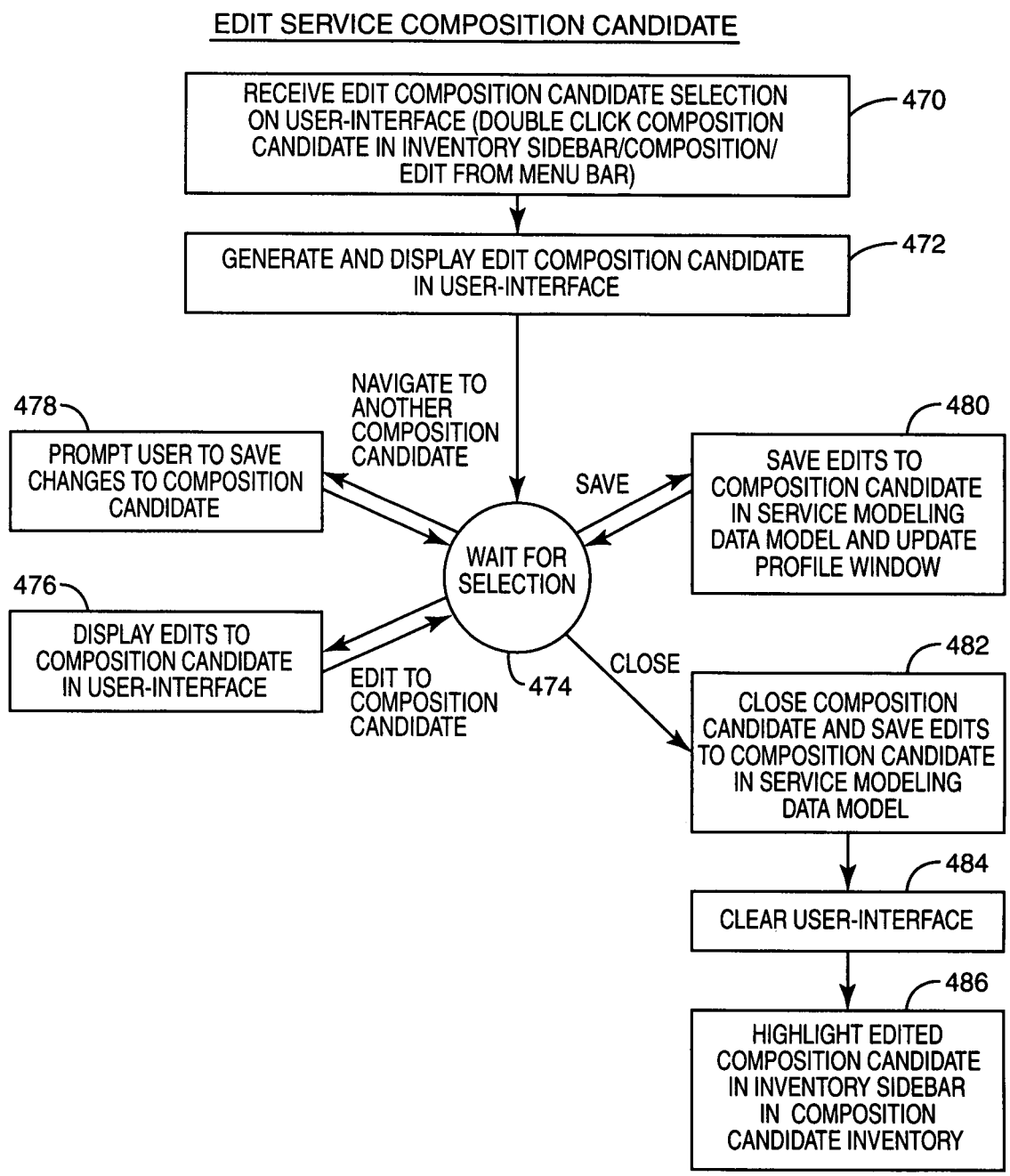
FIG. 35 illustrates an edit composition candidate process that may be performed by the SOA modeling tool according to one embodiment of the invention.
Figure 36:
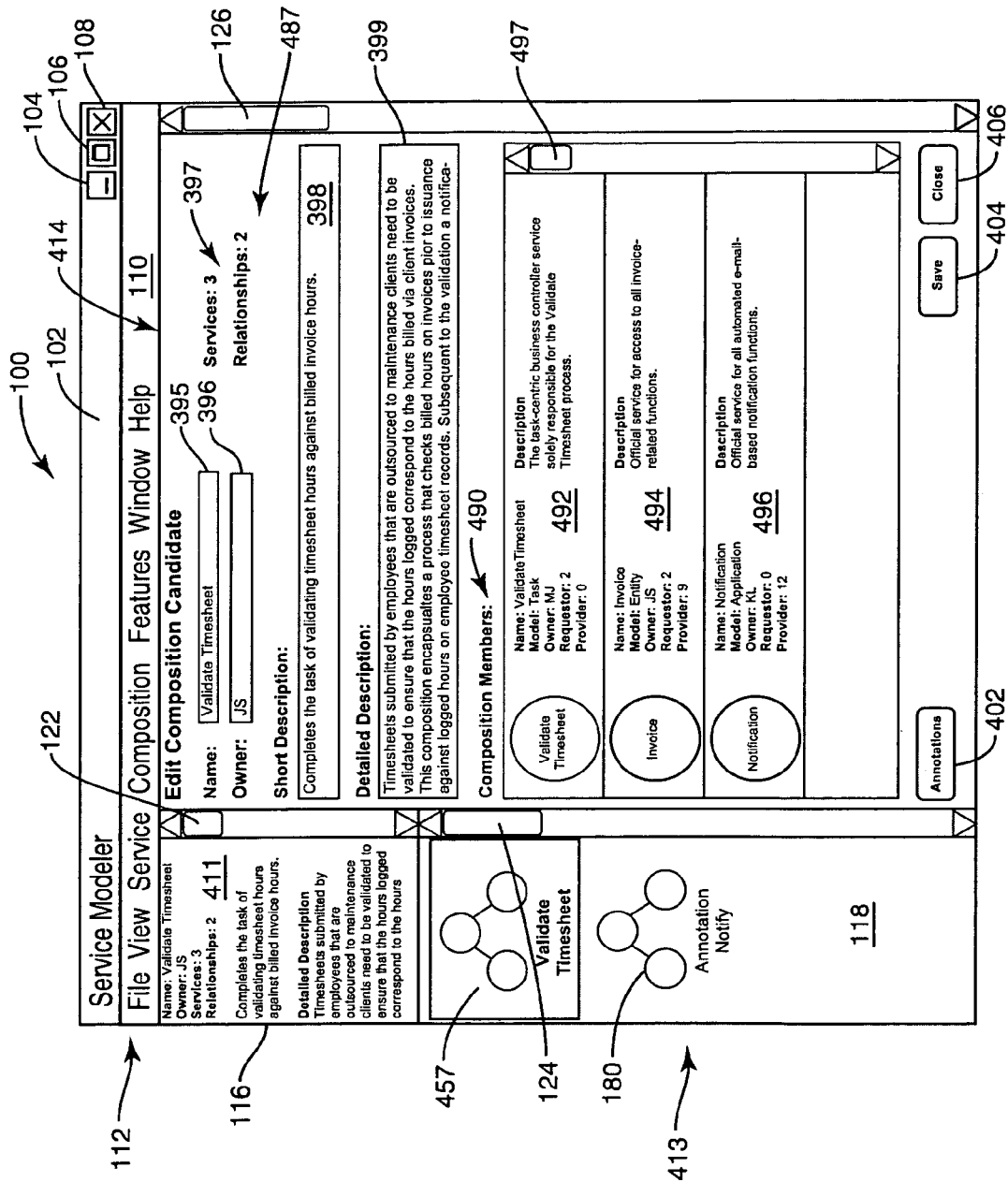
FIG. 36 is an exemplary user-interface illustrating the edit composition candidate form according to one embodiment of the edit service candidate process.

FIG. 35 illustrates an exemplary edit composition candidate process 214 (see FIG. 9) that includes some of the possible functions that may be performed, via the modeling tool 50, by the composition candidate manager 58 (see FIG. 4) to edit an existing composition candidate in the composition candidate inventory. As illustrated in FIG. 35, the modeling tool 50 receives a selection to edit a composition candidate, such as from the inventory sidebar 118 (step 270) or the menu bar 110, for example (step 470). In response, the modeling tool 50 generates and displays an "Edit Composition Candidate" area 487 (e.g. form) in the main workspace 120 on the user-interface 100, as illustrated in the exemplary user-interface 100 in FIG. 36. The existing composition candidate profile record information for the composition candidate to be edited is also displayed in the user-interface 100. The modeling tool 50 also updates the "Services" and "Relationships" counters 397 on the user-interface 100, as illustrated in FIG. 36. A composition members area 490 lists all of the service candidates 492, 494, 496 that are part of the composition candidate selected to be edited. The modeling tool 50 highlights the service candidate designated as the controller per the field value in the "Encapsulated Composition" drop-down list 230 of the "Operation Candidates" area 153 (see for example, FIG. 11).

The modeling tool 50 then waits for a selection on the user-interface 100 from the user 70 (FIG. 35, step 474). The user 70 can choose to edit composition candidate header information for the composition candidate profile record in the "Edit Composition Candidate" area 487. In response, the modeling tool 50 receives and enters the edited composition candidate header information in the composition candidate profile record (FIG. 35, step 476). The user 70 can also choose to add or edit any previously provided ad hoc comments and/or file attachments linked to the composition candidate by clicking the "Annotations' button 402, as illustrated in FIG. 36.

At any time, the user 70 can save the current selections for the edited composition candidate header information by selecting the "Save" button 404. If the user 70 attempts to navigate away from the "Edit Composition Candidate" area 487 before edits are saved, the modeling tool 50 will prompt the user 70, via the user-interface 100, to save the edits to the composition candidate before allowing the navigation (FIG. 35, step 478). In response, the modeling tool 50 saves any edits to the composition candidate header information in the composition candidate profile record in the SOA service model database 54 (FIG. 35, step 480). However, the "Edit Composition Candidate" area 487 is not closed. The profile window 116 displays the edited composition candidate profile record information 411 edited thus far by the user 70, as illustrated in the exemplary user-interface 100 in FIG. 36. The user 70 can continue to make selections for the composition candidate until finished. The "Save" button 404 is provided to allow the user 70 to save changes for an edited composition candidate profile record at any time as information is edited. The profile window 116 is updated with any changed composition candidate profile record information 411 after each save.

Figure 37:
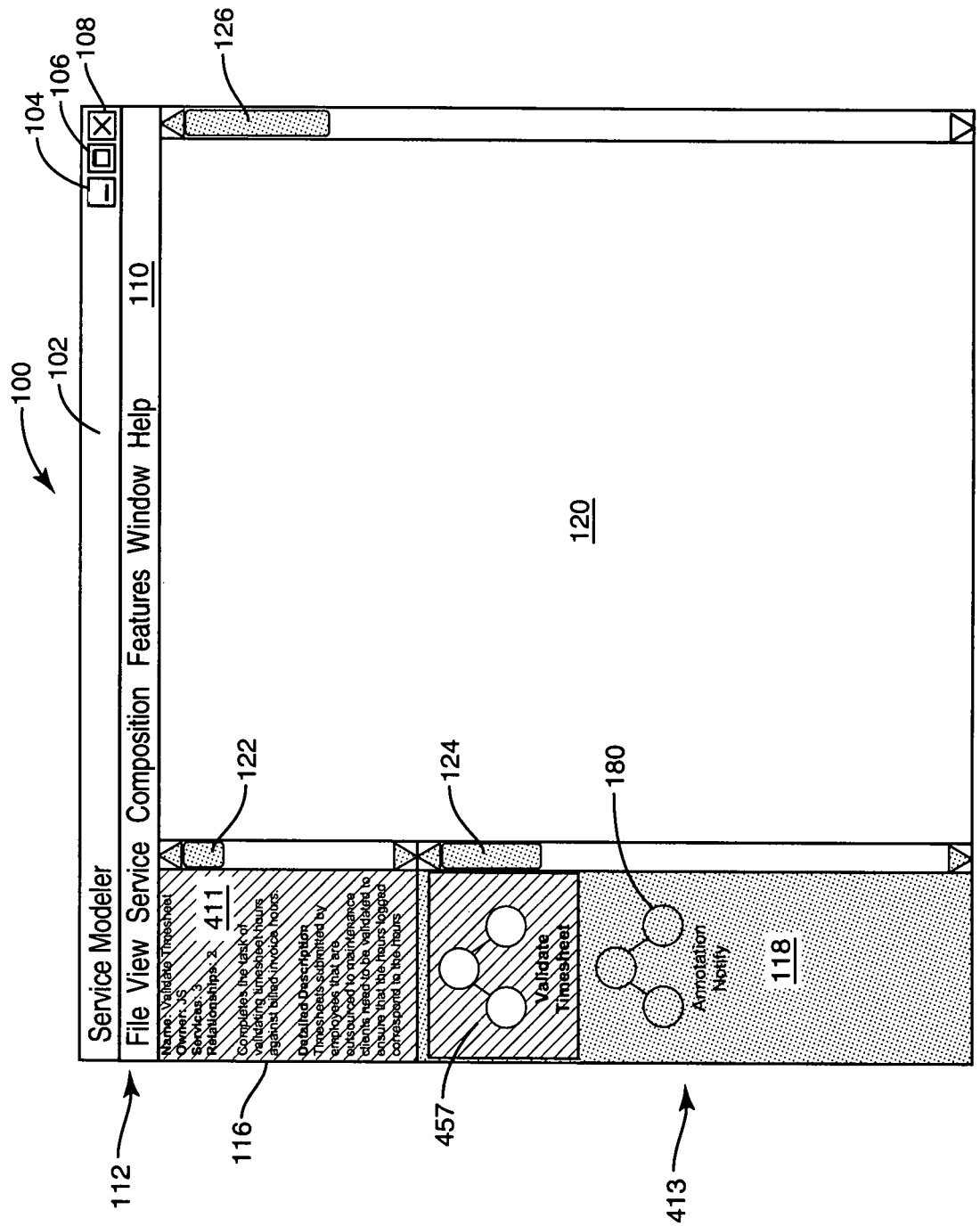
FIG. 37 is an exemplary user-interface illustrating the composition candidate profile and the composition candidate inventory after the composition candidate has been edited according to one embodiment of the edit service candidate process.

When the user has completed editing information for the composition candidate profile record, the user can choose the "Close" button 406. In response, the modeling tool 50 stores the edited composition candidate profile record in the SOA service model database 54 in case the user 70 did not previously save the edited composition candidate profile record via the "Save" button 404 (FIG. 35, step 482). The main workspace 120 is cleared (FIG. 15, step 484). As illustrated in the exemplary user-interface 100 in FIG. 18, the composition candidate profile record information 411 for the edited composition candidate is updated in the profile window 116 (FIG. 35, step 486). The service candidate 128 is visually highlighted and displayed in the composition candidate inventory 413 in the inventory sidebar 118, as illustrated in FIG. 37, to indicate the composition candidate just edited (FIG. 35, step 486).

The user 70 can choose to delete an existing composition candidate in the composition candidate inventory stored in the SOA service model database 54. For example, the user-interface 100 illustrated in FIG. 37 illustrates the composition candidate inventory 413 in the inventory sidebar 118. The user 70 can choose to delete a composition candidate in the composition candidate inventory 413 by clicking and highlighting a desired composition candidate 457 to be deleted. The inventory sidebar 118 provides a convenient representation and method to select a composition candidate for deletion. Alternatively, the user 70 could choose to select a composition candidate for deletion by choosing the "Composition/Delete" feature from the menu bar 110. Other methods may be provided by the modeling tool 50 via the user-interface 100. In response, the SOA modeling tool 50 may perform a delete composition candidate process, such as exemplified by the process illustrated in FIG. 38, to allow the user 70 to delete an existing service candidate in the composition candidate inventory 413.

Figure 38:
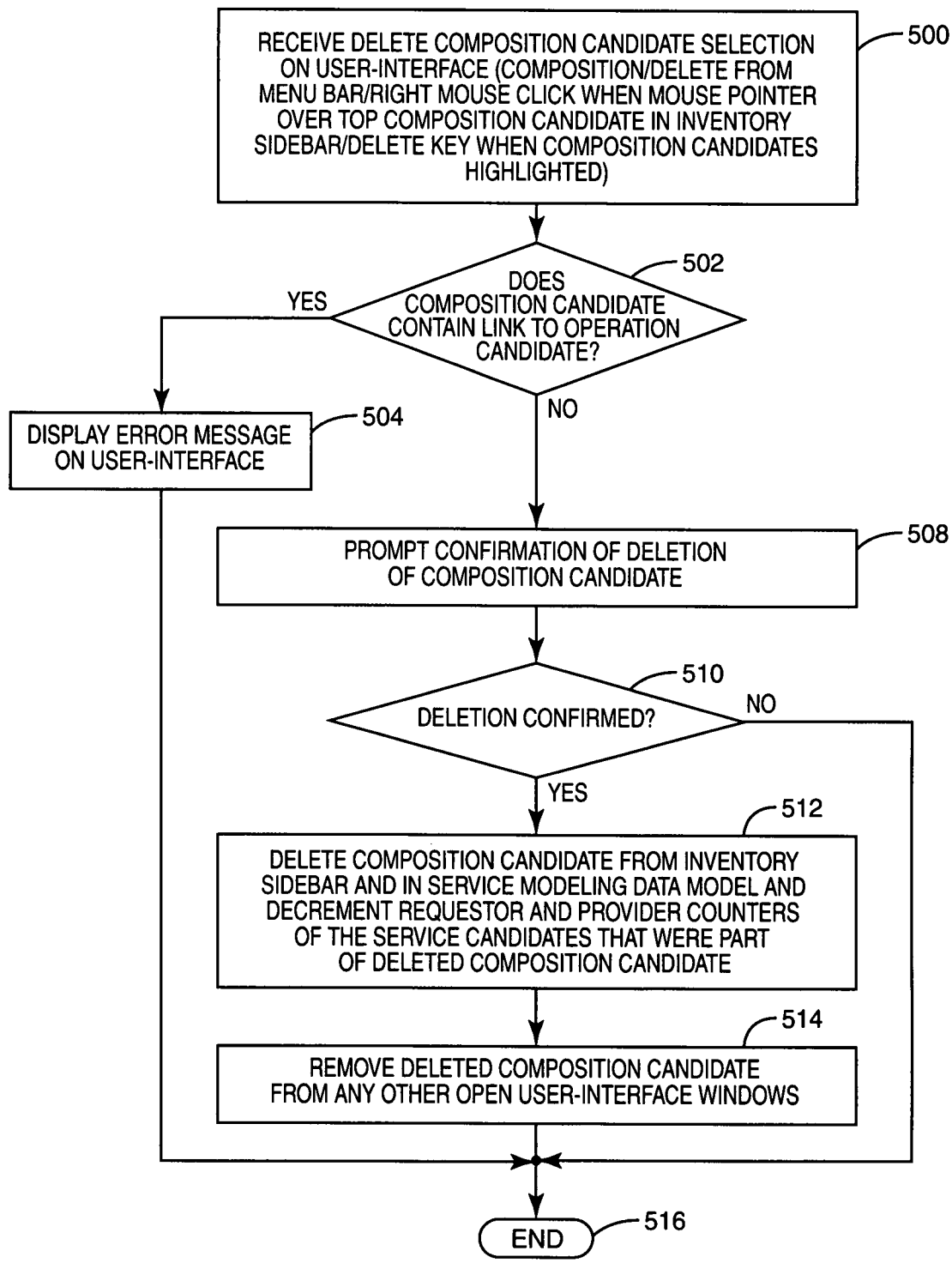
FIG. 38 illustrates a delete composition candidate process that may be performed by the SOA modeling tool according to one embodiment of the invention.
Figure 39:
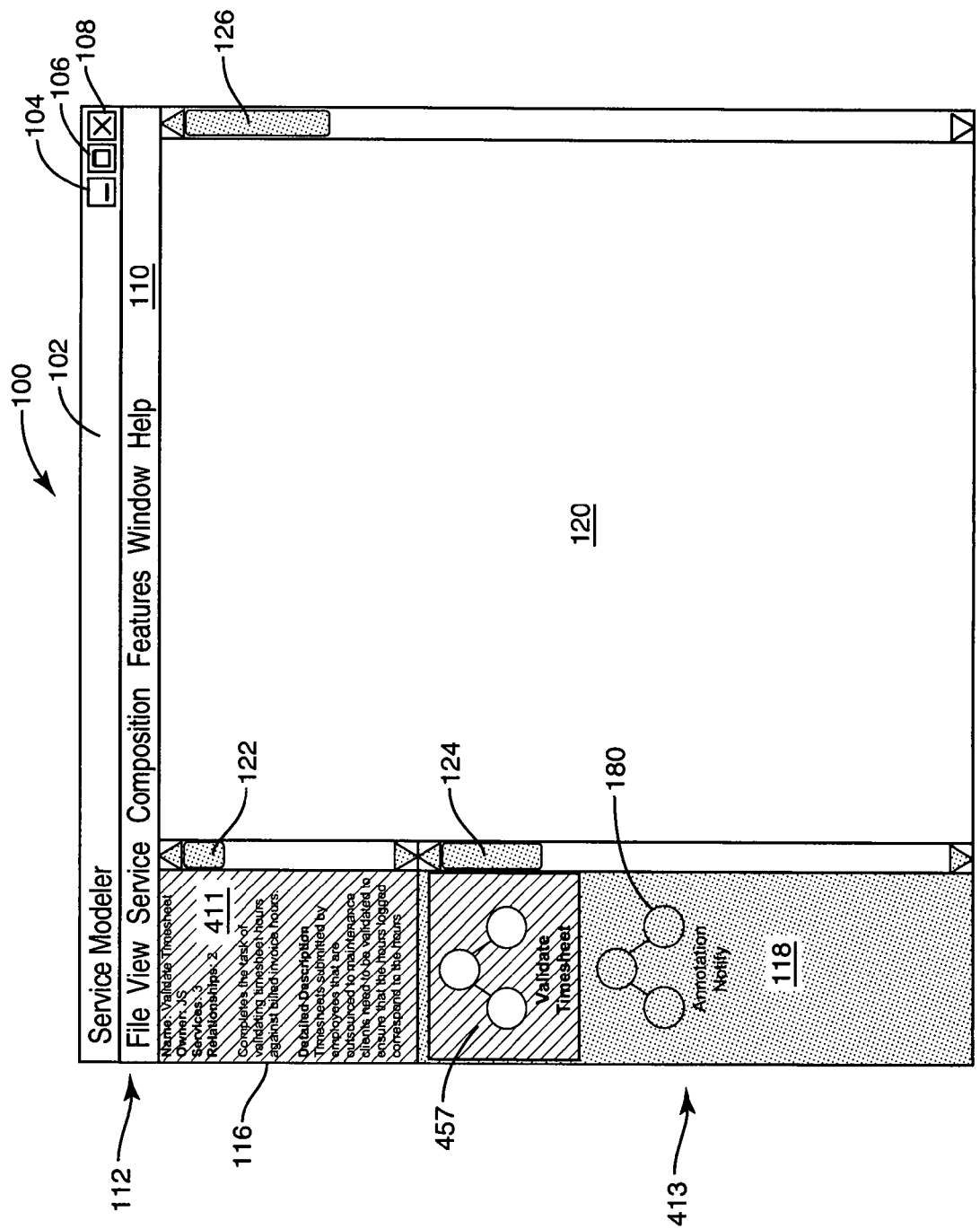
FIG. 39 is an exemplary user-interface illustrating a selected composition candidate selected for deletion according to one embodiment of the SOA modeling tool.

FIG. 38 illustrates an exemplary delete composition candidate process 216 (see FIG. 9) that includes some of the possible functions that may be performed, via the modeling tool 50, by the composition candidate manager 58 (see FIG. 4) to delete a composition candidate in a composition candidate inventory. As illustrated in FIG. 38, the modeling tool 50 receives a selection to delete a composition candidate, such as from the inventory sidebar 118 (e.g. "delete" key or "delete" menu item from pop-up menu from right mouse click) or the menu bar 110, such as a "Composition/Delete" menu item selection (step 500). For example, the user-interface 100 illustrated FIG. 39 shows the "Validate Timesheet" composition candidate 457 selected for deletion. In response, the modeling tool 50 determines if the selected composition candidate 128 to be deleted is linked as being encapsulated by an operation candidate (decision 502). If so, the modeling tool 50 generates an error message to the user 70, via the user-interface 100, since SOA principles require that relationships between composition and operation candidates be enforced to preserve the integrity of the SOA service model. An exemplary error message displayed may be: "The [NAME] operation candidate is currently linked to the composition candidate. The composition candidate can therefore not be deleted." The composition candidate cannot be deleted until the link to the operation candidate is first removed (edited). The composition candidate manager 58 may call upon the service/composition candidate relationship manager 62 (see FIG. 4) to provide this functionality and enforcement.

Figure 40:
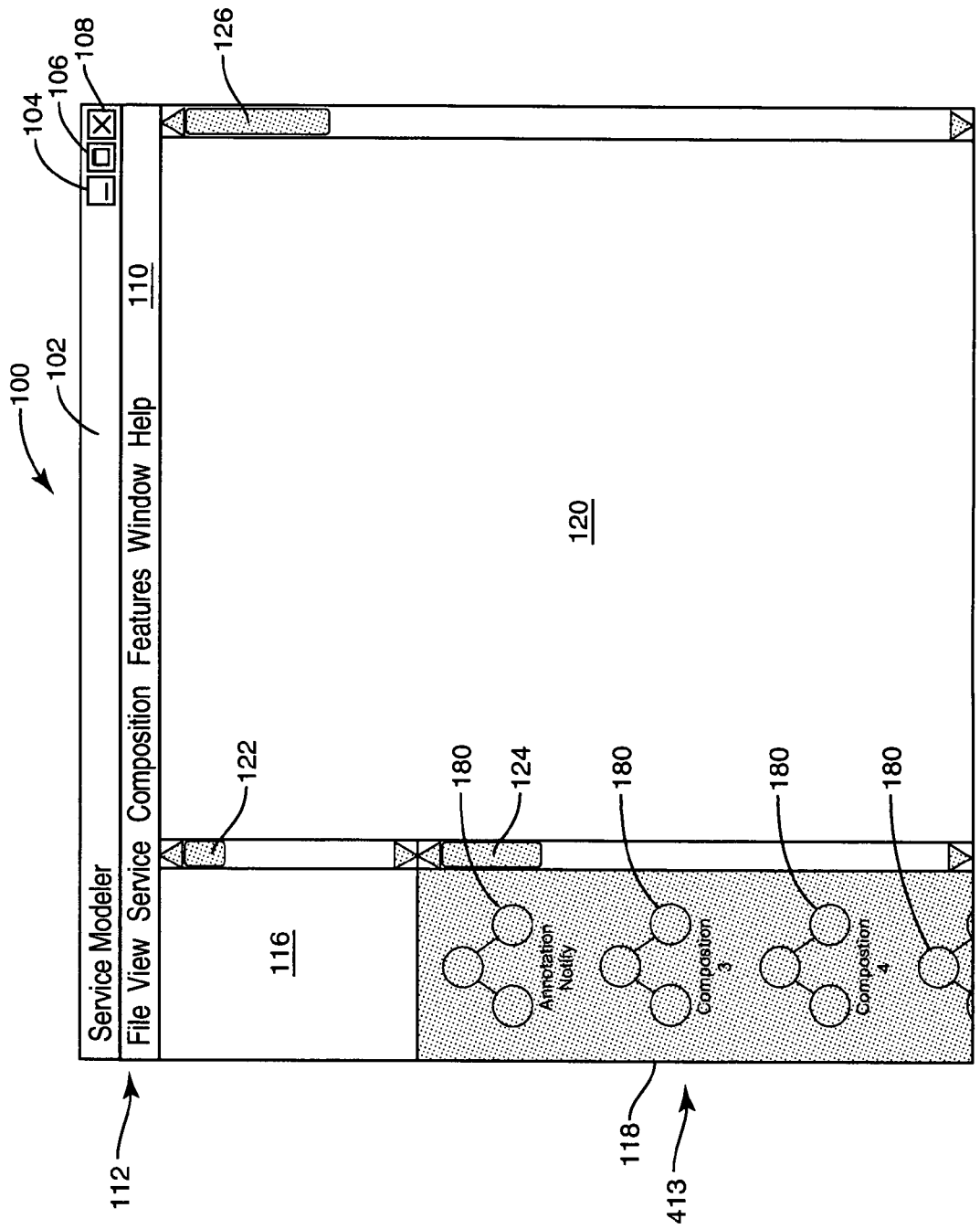
FIG. 40 is an exemplary user-interface illustrating the composition candidate inventory after the selected composition candidate in the user-interface of FIG. 39 has been deleted according to one embodiment of the delete service candidate process.

If the composition candidate to be deleted does not contain a link to an operation candidate, the deletion will be allowed. The modeling tool 50 may prompt the user 70, via the user-interface 100, to confirm the deletion request (step 508). If confirmed (decision 510), the modeling tool 50 deletes the selected composition candidate 128 for deletion from the composition candidate inventory in the SOA service model database 54 (step 512). The modeling tool 50 updates the inventory sidebar 118 to remove the deleted composition candidate from the displayed service candidate inventory 413 (step 512). This is illustrated by example in the user-interface 100 in FIG. 40, where the "Validate Timesheet" composition candidate previously appearing in the composition candidate inventory 413 in the user-interface 100 of FIG. 37, no longer appears in the inventory sidebar 118. The "Requestors" and "Providers" counters of the service candidate that were part of the deleted composition candidate can also be decremented (step 512). The modeling tool 50 also removes the deleted composition candidate from any other open user-interface windows opened (step 514).

Figure 41:
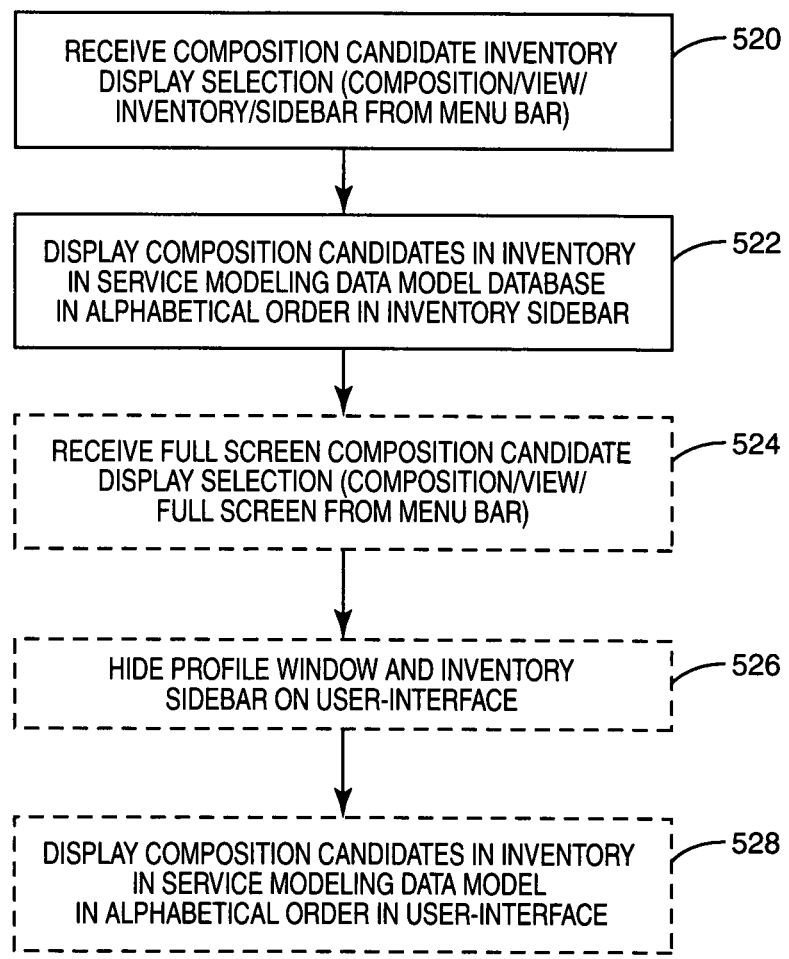
FIG. 41 illustrates a display composition candidate inventory process that may be performed by the SOA modeling tool according to one embodiment of the invention.
Figure 42:
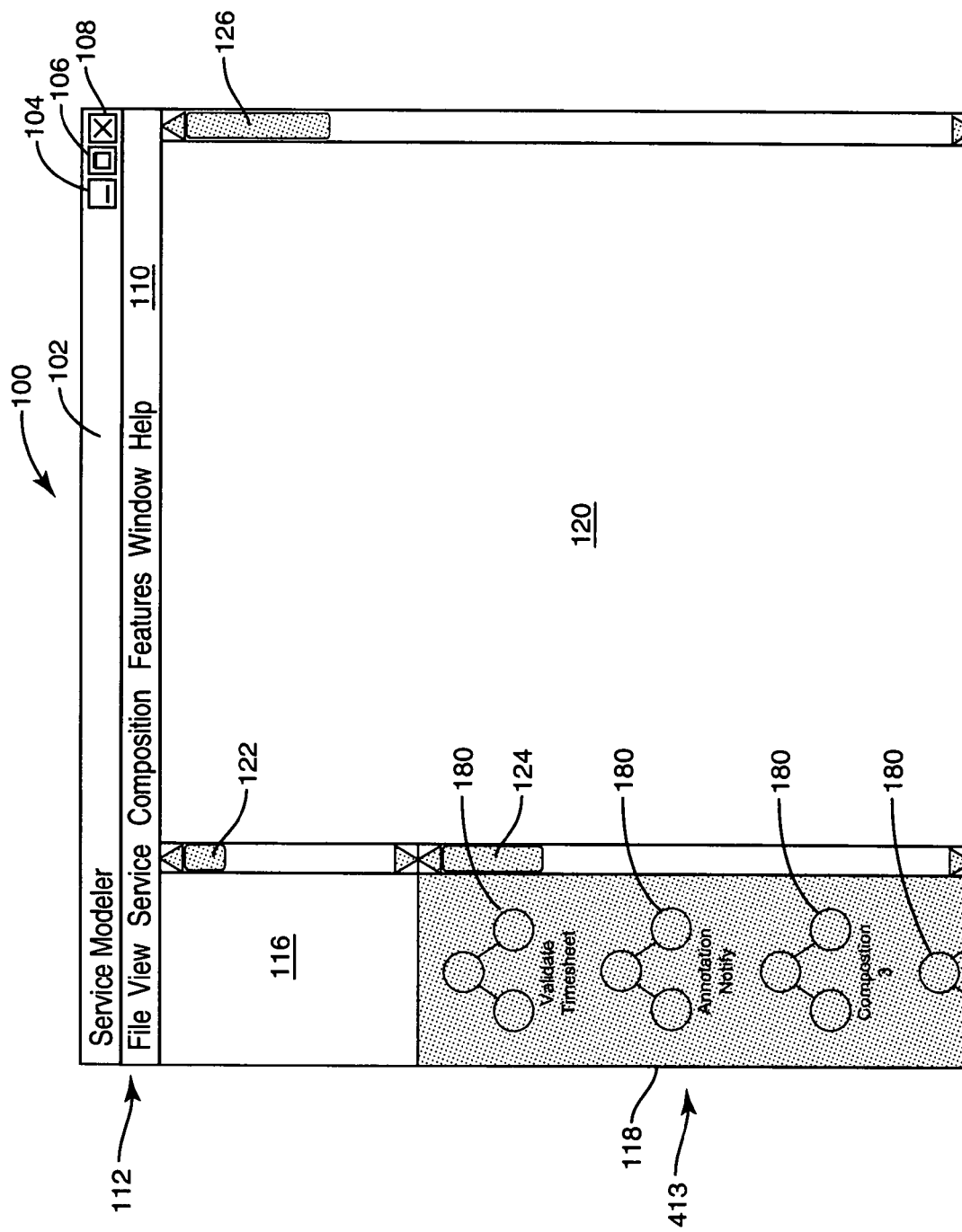
FIG. 42 is an exemplary user-interface illustrating the displayed composition candidate inventory according to one embodiment of the display composition candidate inventory process.
Figure 43:
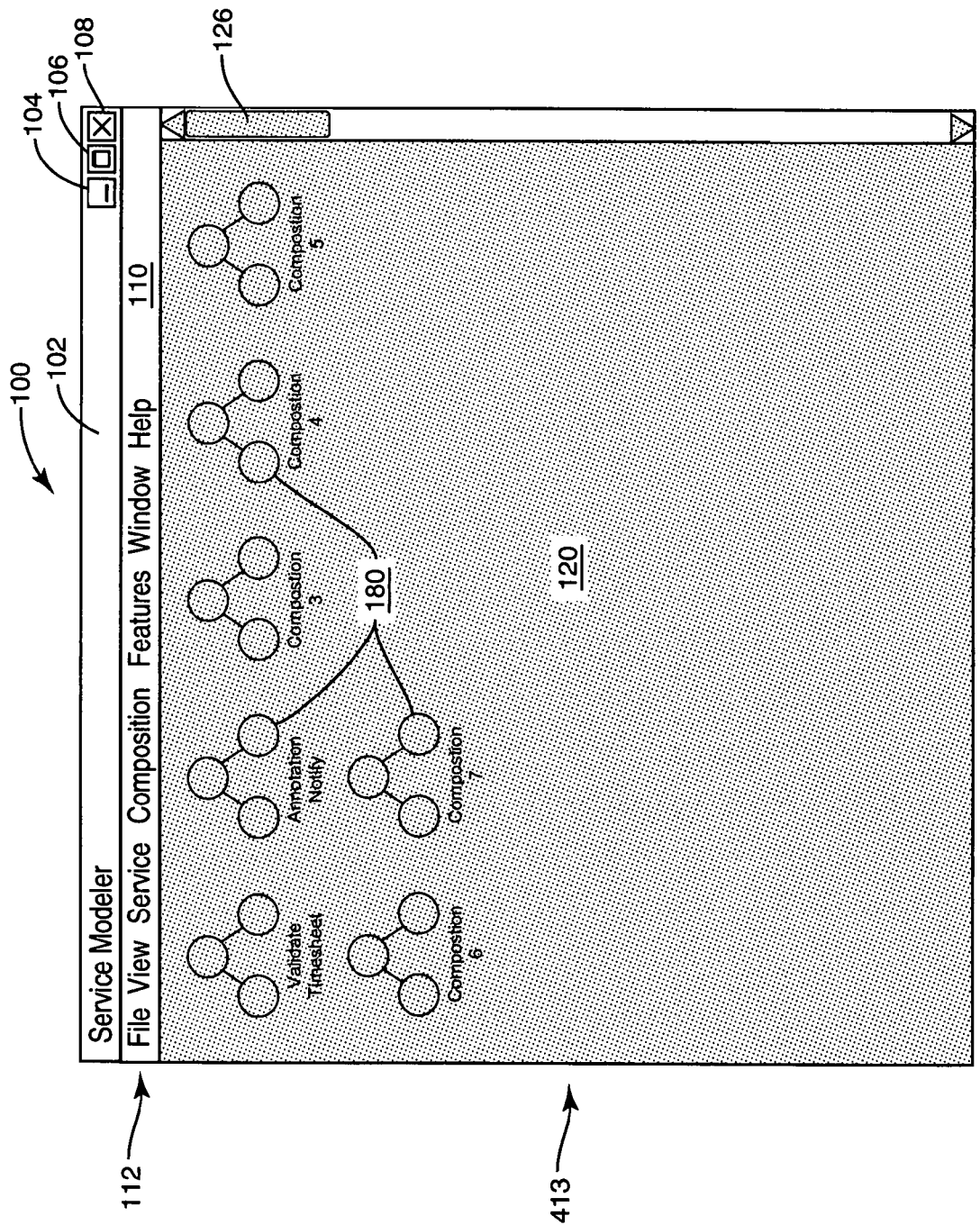
FIG. 43 is an exemplary user-interface illustrating the composition candidate inventory displayed in full view according to one embodiment of the display composition candidate inventory process.
Figure 44:
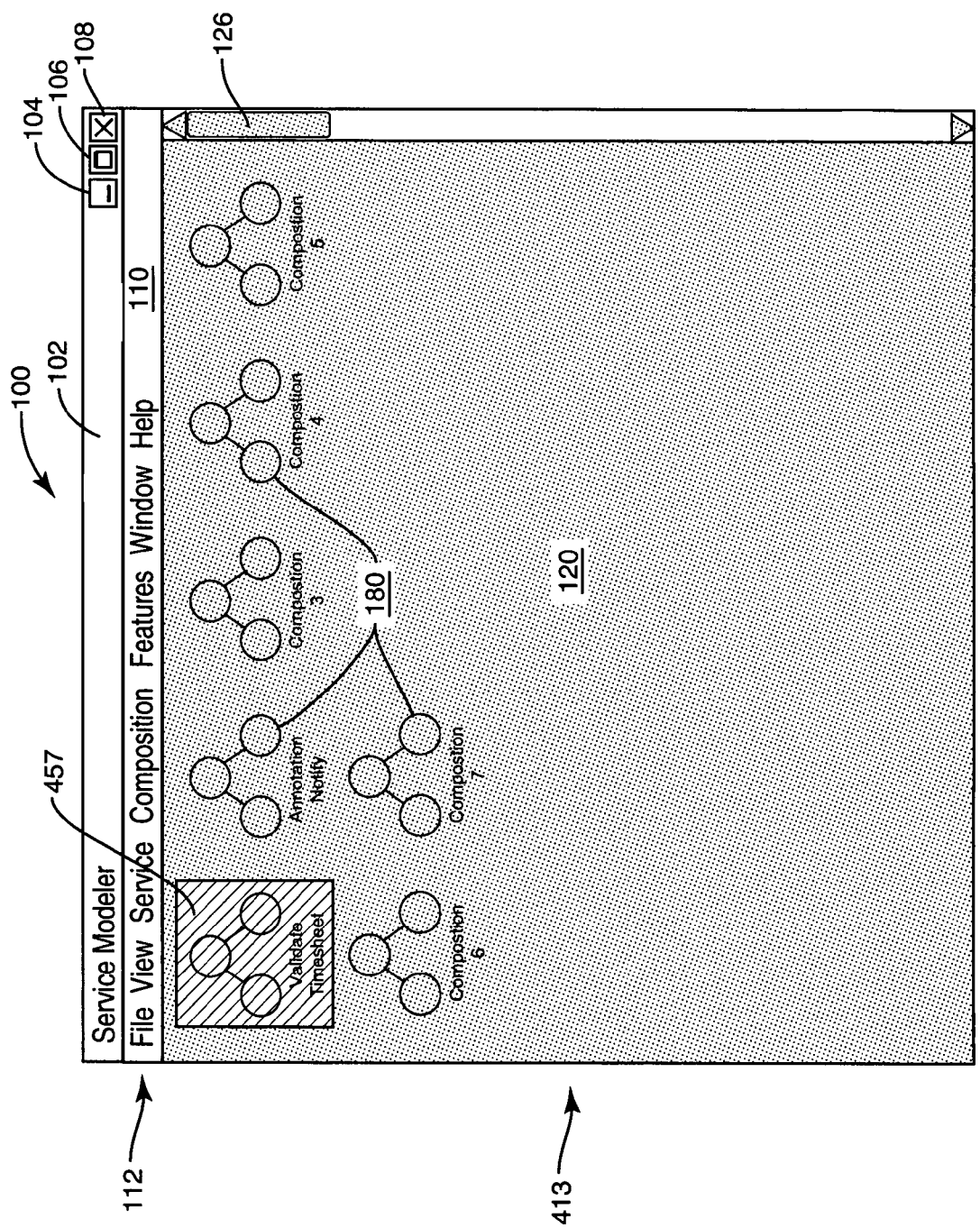
FIG. 44 is an exemplary user-interface illustrating a selected composition candidate among the composition candidate inventory displayed in full view in the user-interface of FIG. 43 according to one embodiment of the SOA modeling tool.

The user 70 can choose to display a composition candidate inventory stored in the SOA service model database 54 to view and choose composition candidates for editing and other functions associated with building a composition candidate inventory. FIG. 41 illustrates an exemplary display composition candidate process 218 (see FIG. 9) that includes some of the possible functions that may be performed, via the modeling tool 50, by the composition candidate inventory display manager 60 (see FIG. 4) to display composition candidate inventories stored in the SOA service model database 54. FIGS. 42-44 illustrate exemplary display views of the composition candidate inventory on the user-interface 100 when displaying a composition candidate inventory. FIGS. 41-44 will be discussed with reference to each other.

As illustrated in FIG. 41, the modeling tool 50 receives a selection to display a composition candidate inventory, such as from the inventory sidebar 118, or by selection from menu bar 110, such as by a "Composition/View/Inventory" menu item selection (step 520). In response, the modeling tool 50 displays the composition candidate inventory 413 in the inventory sidebar 118, as illustrated by example in the user-interface 100 in FIG. 42 (decision 522). The default display setting may be to display the composition candidate inventory 413 in alphabetical order by composition candidate name 182 in the inventory sidebar 118, as illustrated in FIG. 42. The user 70 is then free to select any composition candidate among the composition candidate inventory 413 to display, edit, or delete, as desired. The inventory sidebar 118 provides a convenient and easy to use method of displaying and viewing the composition candidate inventory and making selections in the same regard without affecting the main workspace 120.

If the user 70 desires to display more composition candidates from the composition candidate inventory 413 than can be shown at any given time in the inventory sidebar 118, the modeling tool 50 may provide for the ability of the composition candidate inventory 413 to be displayed in full screen view. In this regard, the user 70, via a selection made to the user-interface 100, would request the modeling tool 50 to display the composition candidate inventory 413 in full screen or view (step 524). This selection may be made from a selection on the menu bar 110, such as a "Composition/View/Full Screen" menu item selection (step 524). Alternatively, a pop-up menu (not shown) may provide this option when the user selects a non-occupied part of the inventory sidebar 118 with their selection device (e.g. mouse). Other methods may be provided to allow the user to select the full view display option for the composition candidate inventory 413.

In response to full view selection, the modeling tool 50 hides the profile window 116 and inventory sidebar 118 on the user-interface 100 to provide for a larger main workspace 120 to display the composition candidate inventory 413 (step 526). The modeling tool 50 then displays the composition candidate inventory 413 in the main workspace 120, as illustrated in the user-interface 100 in FIG. 43 (step 528). Again, the default is to display the composition candidate inventory 413 in alphabetical order by composition candidate name 182. As illustrated in FIG. 44, the user 70 can then select, such as by clicking on, the desired composition candidate 457 from the displayed composition candidate inventory 413 to perform the desired action, such as displaying, editing, and deleting the selected composition candidate 457 for example.

Figure 45:
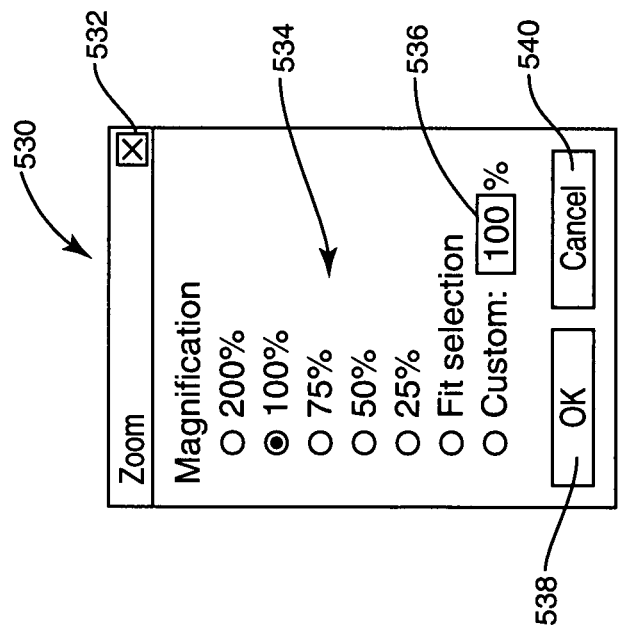
FIG. 45 is an exemplary zoom selection menu for the exemplary user-interface according to one embodiment of the SOA modeling tool.

Other display features may be provided by the modeling tool 50 for the user-interface 100, including the main workspace 120, to facilitate the display and view of composition candidates. For example, the modeling tool 50 may allow the display of the main workspace 120 to be zoomed to provide either a larger or smaller view of service-oriented components. In this regard, FIG. 45 illustrates a zoom menu 530 that may be provided by the modeling tool 50. The zoom menu 530 may be accessed via the user-interface 100 from a "View/Zoom" menu item selection from the menu bar 110, for example. In response, the modeling tool 50 displays the zoom menu 530 on the user-interface 100. The user 70 can close the zoom menu 530 by clicking on the close icon 532 without any changed zoom settings made, if any, taking effect. The magnification of the main workspace 120 can be chosen by selecting one of a number of predefined magnification settings using radio buttons 534. Alternatively, a custom magnification can be made by entering a numerical value of the desired magnification in the custom magnification box 536. The user 70 selects the "OK" button 538 when done to request the modeling tool 50 to update the display of the main workspace 120 using the set magnification. The user 70 can also cancel the zoom request by selecting the "Cancel" button 540, which will also close the zoom menu 530 without any changed zoom settings, if any, taking effect.

Figure 46:
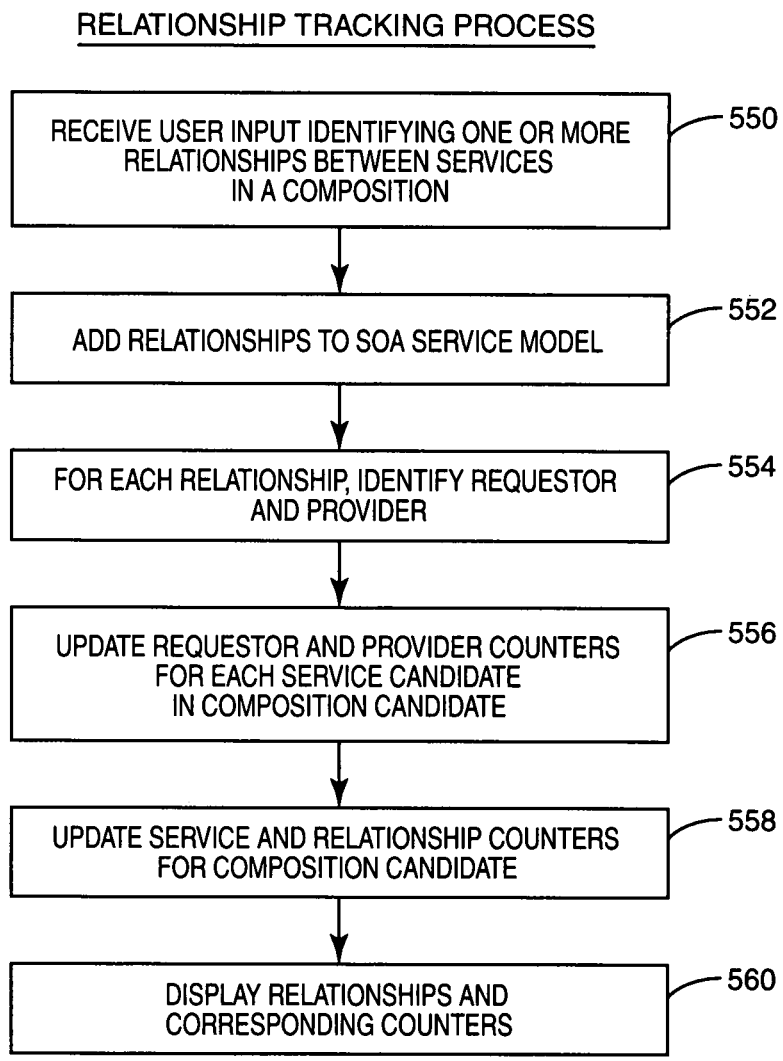
FIG. 46 is a SOA service-oriented component relationship tracking process that may be performed according to one embodiment of the invention.

Embodiments of the present invention can also include the tracking and integrity enforcement of relationships between service-oriented candidates according to SOA principles and paradigms. Relationships between service-oriented candidates in a SOA should ideally be tracked and enforced to ensure the integrity of the SOA design. Some of these tracked relationships and enforcements have been previously discussed in the context of creating, managing, and displaying service and composition candidates. The tracking and enforcement of these relationships can be provided in response to selections made through the user-interface 100 and carried out as part of the SOA modeling tool 50. FIG. 46 illustrates an example of the relationship management process 220 (see FIG. 9) that includes some of the possible functions that may be carried out by the SOA modeling tool 50 to track the relationships in a SOA service model, according to one embodiment of the invention. The relationship management process 220 may be carried out by the service/composition relationship manager 62 (see FIG. 4) in response to selections made by the user on the user-interface 100, or in the background not in response to selections on the user-interface 100. In particular, upon receiving user input identifying relationships between service-oriented candidates of the SOA service model, process 200 updates the SOA service model based on the user input. Subsequently, when process 200 receives a user request pertaining to at least one service-oriented candidate, process 200 determines one or more relationships associated with this candidate based on the SOA service model, and displays the relationships to a user.

The above relationships may include, for example, relationships between an operation candidate and a service candidate, relationships between two operation candidates from different service candidates, relationships between two service candidates, relationships between a service candidate and a composition candidate, relationships between an operation candidate and a composition candidate, relationships between a service candidate and a service candidate inventory, relationships between a composition candidate and a composition candidate inventory, or relationships between different service-oriented candidates across different inventories.

In one embodiment illustrated in FIG. 46, as part of the SOA modeling process, the modeling tool 50 receives input from the user 70, via the user-interface 100, identifying one or more operation relationships between service candidates in a composition candidate (step 550). The modeling tool 50 adds the operation relationships to the SOA service model if the operation relationships are in compliance with SOA principles (step 552). For each operation relationship added, SOA modeling tool 50 identifies the operation relationship requestor and provider in the involved service candidates (step 554). The modeling tool 50 updates the "Requestors" and "Providers" counters for each service candidate in the composition candidate (step 556). The SOA modeling tool 50 is also adapted to update the "Services" and "Relationships" counters for the composition candidate in the composition candidate inventory (step 558). The "Services" counter is the number of service candidates added to a composition candidate. The "Relationships" counter is the number of relationships between service operation candidates in a composition candidate. The modeling tool 50 can also facilitate the display of the relationship counters 173, 411 (e.g. "Providers," "Requestors," "Services," and "Relationships" counters) on the user-interface 100, as exemplified previously, depending on which function has been selected by the user 70 on the user-interface 100. The "Requestor" and "Provider" counters 173 are displayed for service candidates. The "Services" and "Relationships" counters 411 are displayed for composition candidates.

Figure 47:
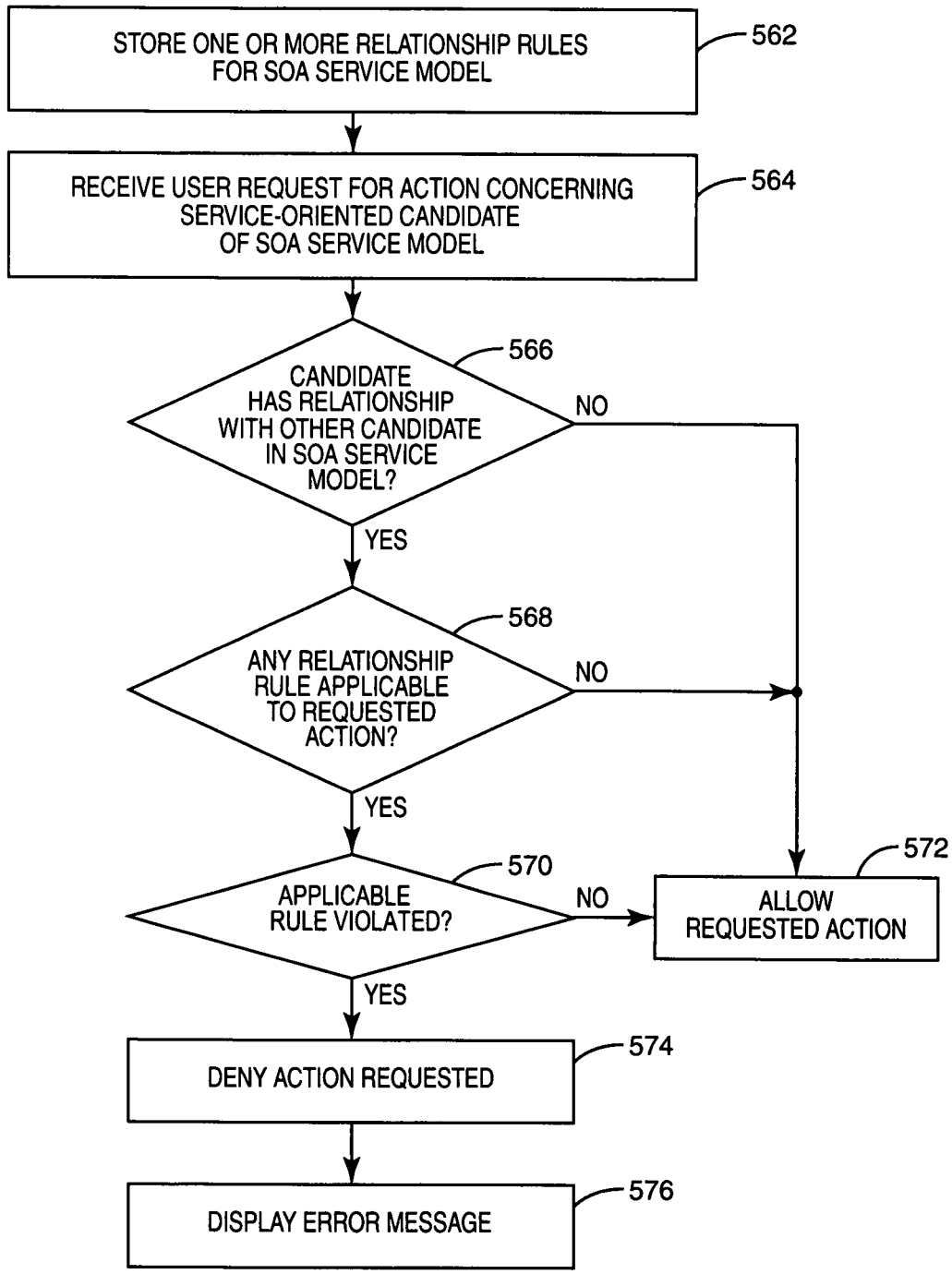
FIG. 47 is a SOA relationship integrity enforcement process that may be performed according to one embodiment of the invention.

Because of the tracking of relationships between service-oriented candidates, the SOA modeling tool 50 is also able to enforce the relationships created in a SOA service model according to SOA principles. As previously discussed, enforcing the integrity of relationships in a SOA service model ensures the integrity of the SOA service model and any resulting SOA implementation based on the SOA service model. FIG. 47 illustrates an example of the rule enforcement process 222 (see FIG. 9) that includes some of the possible functions that may be carried out by the SOA modeling tool 50 to enforce the relationships in a SOA service model. The rule enforcement process 222 may be carried out by the service/composition relationship manager 62 (see FIG. 4) in response to selections on the user-interface 100 or in the background, not in response to selections on the user-interface 100.

As illustrated in FIG. 47, one or more relationship rules for a SOA service model are established and stored (step 562). The modeling tool 50 receives a request from the user 70, via the user-interface 100, for an action concerning a service-oriented candidate in a SOA service model (step 564). The SOA modeling tool 50 determines if the service-oriented candidate has a relationship with any other service-oriented component in the SOA service model (decision 566). If so, it is determined if there is any relationship rule applicable to the requested action (decision 568). If so, and the applicable relationship rule would not be violated by performing the requested action (decision 570), the requested action is allowed (step 572). If not, the action requested is denied since it would violate an application relationship rule (step 574). An error message may be displayed on the user-interface 100 in response to a denied request (step 576).

For example, if the requested action is a request to delete an operation candidate associated with a first service candidate, and an applicable relationship rule prevents deletion of an operation candidate having a relationship with at least one operation candidate from a different service candidate, the modeling tool 50 may determine whether the operation candidate associated with the first service candidate has a relationship with an operation candidate associated with a second service candidate. If not, the modeling tool 50 may delete the operation candidate associated with the second service candidate. If so, the modeling tool 50 may inform the user that the requested action is denied.

In another example, if the requested action is a request to delete a service candidate, and an applicable relationship rule prevents deletion of a service candidate having at least one operation candidate in a relationship with an operation candidate from another service candidate, the modeling tool 50 may determine whether the service candidate has an operation relationship with another service. If not, the modeling tool 50 may delete the service candidate. If so, the modeling tool 50 may inform the user that the requested action is denied.

In yet another example, if the requested action is a request to delete a composition candidate, and an applicable relationship rule prevents deletion of a composition candidate encapsulated by an operation candidate, the modeling tool 50 may determine whether the composition candidate is encapsulated by any operation candidate. If not, the modeling tool 50 may delete the composition candidate. If so, the modeling tool 50 may inform the user that the requested action is denied.

Those skilled in the art will recognize improvements and modifications to the preferred embodiments of the present invention. All such improvements and modifications are considered within the scope of the concepts disclosed herein and the claims that follow.

APPENDIX

Menu Reference Bar

The following tables document the possible, exemplary functions of menu items that may be provided by the SOA modeling tool 50 in the SOA modeling tool menu bar 110.

| File Menu Item | Action |
|---|---|
| New | Creates a new inventory file with a *.inv extension. |
| Open | Opens an existing inventory file. |
| Close | Closes the current inventory file. If any active content has been edited, the user will be prompted to save the changes. |
| Save | Saves the record displayed in the current user-interface (e.g. main workspace window). |
| Save All | Saves the records of all open user-interface (e.g. main workspace windows). |
| Save As | Allows the currently opened inventory file to be saved under a different file name. |
| Print | Prints out whatever resides in the user-interface (e.g. main workspace), including content that is hidden and can only be viewed by vertically or horizontally scrolling. |

| View Menu Item | Action |
|---|---|
| Profile Window (116) | Toggles the visibility of the profile window. When displayed, a checkmark is located next to the menu item (as with the View/Rule menu item in MS Word). The default setting is for the profile window to be visible. When the profile window is hidden, the inventory sidebar extends vertically to the menu bar. |
| Inventory Sidebar (118) | Toggles the visibility of the inventory sidebar. When displayed, a checkmark is located next to the menu item (as with the View/Rule menu item in MS Word). The default setting is for the inventory sidebar to be visible. When the inventory sidebar is hidden, the profile window remains unchanged. |
| Zoom | Displays a zoom dialog box like the one used in MS Excel. This menu item is only enabled when the user-interface (e.g. main workspace) is being used for composition candidate modeling. |

| Service Menu Item | Action |
|---|---|
| New | Displays the Add Service Candidate area (e.g. form) in the Main Workspace. |
| Edit | Displays the Edit Service Candidate area (e.g. form) in the Main Workspace. This menu item is disabled unless a service candidate is selected. |
| Delete | Deletes a service candidate record. This menu item is disabled unless a service candidate is selected. |
| View Inventory | This menu item has two sub-menu items. |
| → Sidebar | This is a sub-menu item of the View Inventory menu item. It forces the display of service candidates within the inventory sidebar. |
| → Full Screen | This is a sub-menu item of the View Inventory menu item. It hides the inventory sidebar and profile window and displays all service candidates in the user-interface (e.g. main workspace). |

| Composition Menu Item | Action |
|---|---|
| New | Displays the Add Composition Candidate area (e.g. form) in the user-interface (e.g. main workspace). |
| Edit | Displays the Edit Composition Candidate area (e.g. form) in the user-interface (e.g. main workspace). This menu item is disabled unless a composition candidate is selected. |
| Delete | Deletes a Composition Candidate record. This menu item is disabled unless a composition candidate is selected. |
| View Inventory | This menu item has two sub-menu items. |
| → Sidebar | This is a sub-menu item of the View Inventory menu item. It forces the display of composition candidates within the inventory sidebar. |
| → Full Screen | This is a sub-menu item of the View Inventory menu item. It hides the inventory sidebar and Profile Window and displays all composition candidates in the user-interface (e.g. main workspace). |

| Features Menu Item | |
|---|---|
| Learn About Upcoming Features | Launches a browser and points it to a web link (e.g. http://www.servicemodeler.com). |

| Window Menu Item | Action |
|---|---|
| Arrange All | Performs the standard Windows arrangement of all open user-interface (e.g. main workspace) windows. |
| 1, 2, 3 . . . | Allows the user to choose from one of several open user-interface (e.g. main workspace) windows. |

| Help Menu Item | Action |
| --- | --- |
| Contents | Launches a browser and points it to a web link (e.g. http://www.servicemodeler.com/help/). |
| About | Displays a dialog box with the product copyright, patent, and company contact information. |

What is claimed is:

1. A method comprising:
receiving, by a processing device, a user request for an inventory of service-oriented candidates in a service-oriented architecture (SOA) service model, the SOA service model representing a collection of data defining an SOA design project;
identifying service candidates in view of the collection of data defining an SOA design project, wherein each of the service candidates comprise an operation candidate;
generating composition candidates in view of the service candidates when a specific number of the service candidates are identified;
assigning each of the service candidates to a plurality of the composition candidates;
providing a user interface displaying the service-oriented candidate inventory; wherein the service-oriented candidate inventory comprising the service candidates includes the operation candidate and the composition candidates; and
allowing user access to individual service candidates in the service-oriented candidate inventory via the user interface.

2. The method of claim 1, wherein the user interface displays the service-oriented candidate inventory in alphabetical order.

3. The method of claim 1, wherein the graphical user interface comprises:
a main workspace; and
an inventory sidebar located adjacent the main workspace.

4. The method of claim 3, wherein the service-oriented candidate inventory is displayed in the inventory sidebar.

5. The method of claim 3, wherein:
the user request indicates a full screen display for the service-oriented candidate inventory; and
providing the user interface comprises displaying the service-oriented candidate inventory in full screen.

6. The method of claim 5, wherein displaying the service-oriented candidate inventory in full screen comprises:
hiding the inventory sidebar;
expanding the main workspace to occupy a full screen; and
displaying the service-oriented candidate inventory in the main workspace occupying the full screen.

7. The method of claim 5, wherein displaying the service-oriented candidate inventory in full screen comprises:
hiding the main workspace; and
expanding the inventory sidebar to occupy a full screen.

8. The method of claim 1, wherein allowing user access to individual service candidates comprises:
receiving a user selection of a service candidate in the service-oriented candidate inventory displayed in the user interface; and
highlighting the selected service candidate in the service-oriented candidate inventory displayed in the user interface.

9. The method of claim 8, wherein the use interface further comprising a profile window to display profile information for the selected service candidate.

10. The method of claim 8, further comprising:
receiving a delete request from the user;
deleting the selected service candidate from the SOA service model; and
displaying an updated service-oriented candidate inventory to the user.

11. The method of claim 10, wherein the delete request is submitted via any one of a delete menu selection, a delete command via a pointing device, and a delete command via a keyboard.

12. The method of claim 9, further comprising disallowing the delete request if the selected service candidate includes at least one operation candidate that has a relationship with an operation candidate from another service candidate in the SOA service model.

13. The method of claim 8, further comprising:
receiving an edit request from the user;
displaying data defining the selected service candidate in the SOA service model;
receiving user modification of the selected service candidate; and
saving the modified service candidate in the SOA service model.

14. The method of claim 13, wherein the edit request is submitted via any one of an edit menu selection, or a double-click of the selected service.

15. A non-transitory computer-readable medium having executable instructions to cause a processing device to perform operations comprising:
receiving, by the processing device, a user request for an inventory of service-oriented candidates in a service-oriented architecture (SOA) service model, the SOA service model representing a collection of data defining an SOA design project;
identifying service candidates in view of the collection of data defining an SOA design project, wherein each of the service candidates comprise an operation candidate;
generating composition candidates in view of the service candidates when a specific number of the service candidates are identified;
assigning each of the service candidates to a plurality of the composition candidates;
providing a user interface displaying the service-oriented candidate inventory; wherein the service-oriented candidate inventory comprising the service candidates includes the operation candidate and the composition candidates; and
allowing user access to individual service candidates in the service-oriented candidate inventory via the user interface.

16. The non-transitory computer-readable medium of claim 15, wherein the graphical user interface comprises:
a main workspace; and
an inventory sidebar located adjacent the main workspace.

17. The non-transitory computer-readable medium of claim 16, wherein the service-oriented candidate inventory is displayed in the inventory sidebar or the main window.

18. The non-transitory computer-readable medium of claim 15, wherein allowing user access to individual service candidates comprises:
receiving a user selection of a service candidate in the service-oriented candidate inventory displayed in the user interface; and
highlighting the selected service candidate in the service-oriented candidate inventory displayed in the use interface.

19. An apparatus comprising:

a memory; and a processing device, coupled to the memory to:

receive a user request for an inventory of service-oriented candidates in a service-oriented architecture (SOA) service model, the SOA service model representing a collection of data defining an SOA design project, identify service candidates in view of the collection of data defining an SOA design project, wherein each of the service candidates comprise an operation candidate;

generate composition candidates in view of the service candidates when a specific number of the service candidates are identified;

assign each of the service candidates to a plurality of the composition candidates;

provide a user interface displaying the service-oriented candidate inventory; wherein the service-oriented candidate inventory comprising the service candidates includes the operation candidate and the composition candidates and allow user access to individual service candidates in the service-oriented candidate inventory via the user interface.

20. The apparatus of claim 19, wherein the user interface comprises:

a main workspace; and an inventory sidebar located adjacent the main workspace.

21. The apparatus of claim 20, wherein the service-oriented candidate inventory is displayed in the inventory sidebar or the main workspace expanded to occupy a full screen.

22. The apparatus of claim 19, wherein the user interface receives a user selection of a service candidate in the displayed service-oriented candidate inventory, and highlights the selected service candidate.

23. The apparatus of claim 22, wherein the user interface further comprises a profile window to display profile information for the selected service candidate.

24. The apparatus of claim 22, wherein the service-oriented candidate inventory display manager is further to receive a delete request from the user, delete the selected service candidate from the SOA service model, and display an updated service-oriented candidate inventory to the user.

25. The apparatus of claim 22, wherein the service-oriented candidate inventory display manager is further to receive an edit request from the user, retrieve data defining the selected service candidate from the SOA service model, receive user modification of the selected service candidate, and save the modified service candidate in the SOA service model.

* * * * *